United States Patent
Kitaru et al.

(10) Patent No.: US 8,359,628 B2
(45) Date of Patent: Jan. 22, 2013

(54) DISPLAY DEVICE AND TRANSMITTING DEVICE

(75) Inventors: Katsunori Kitaru, Chiba (JP); Yasuhisa Nakajima, Kanagawa (JP)

(73) Assignee: Sony Corporation (JP)

( * ) Notice: Subject to any disclaimer, the term of this patent is extended or adjusted under 35 U.S.C. 154(b) by 957 days.

(21) Appl. No.: 12/286,815

(22) Filed: Oct. 2, 2008

(65) Prior Publication Data
US 2009/0091656 A1 Apr. 9, 2009

(30) Foreign Application Priority Data

Oct. 5, 2007 (JP) ............................. P2007-261609

(51) Int. Cl.
*H04N 7/16* (2011.01)
*H04N 7/173* (2011.01)
*H04N 7/00* (2011.01)
(52) U.S. Cl. .................. 725/153; 348/552; 725/109
(58) Field of Classification Search .................. None
See application file for complete search history.

(56) References Cited

U.S. PATENT DOCUMENTS

| 4,286,289 | A * | 8/1981 | Ottesen et al. ............... 348/169 |
| 7,221,358 | B2 * | 5/2007 | Sasaki ......................... 345/173 |
| 2004/0117788 | A1 * | 6/2004 | Karaoguz et al. .............. 717/177 |

FOREIGN PATENT DOCUMENTS

| JP | 2002-044536 A | 2/2002 |
| JP | 2004-304220 A | 10/2004 |
| JP | 2007-036906 A | 2/2007 |
| JP | 2007-174193 A | 7/2007 |
| JP | 2007-240741 A | 9/2007 |
| JP | 2007-257142 A | 10/2007 |

OTHER PUBLICATIONS

"High-Definition Multimedia Interface", Specification Version 1.1, May 20, 2004.*

* cited by examiner

*Primary Examiner* — Kristine Kincaid
*Assistant Examiner* — James Marandi
(74) *Attorney, Agent, or Firm* — Lerner, David, Littenberg, Krumholz & Mentlik, LLP

(57) ABSTRACT

A display device includes a signal receiving unit, an image display unit, a communicating unit, a position designating unit, and an information transmitting unit. The signal receiving unit receives a video signal by a differential signal through a plurality of channels from an external apparatus via a transmission path. The image display unit processes the vide signal received in the signal receiving unit to display an image. The communicating unit performs a bi-directional communication by using a predetermined line which constitutes the transmission path. The position designating unit designates a position on a display screen of the image display unit. The information transmitting unit transmits, by the communicating unit, coordinate information on the position designated by the position designating unit to the external apparatus.

16 Claims, 25 Drawing Sheets

FIG. 7

HDMI PIN ARRAY (TYPE-A)

| PIN | SIGNAL ASSIGNMENT | PIN | SIGNAL ASSIGNMENT |
|---|---|---|---|
| 1 | TMDS DATA2+ | 2 | TMDS DATA2 SHIELD |
| 3 | TMDS DATA2- | 4 | TMDS DATA1+ |
| 5 | TMDS DATA1 SHIELD | 6 | TMDS DATA1- |
| 7 | TMDS DATA0+ | 8 | TMDS DATA0 SHIELD |
| 9 | TMDS DATA0- | 10 | TMDS CLOCK+ |
| 11 | TMDS CLOCK SHIELD | 12 | TMDS CLOCK- |
| 13 | CEC | 14 | RESERVED (N.C. ON DEVICE) |
| 15 | SCL | 16 | SDA |
| 17 | DDC/CEC GROUND | 18 | +5V POWER |
| 19 | HOT PLUG DETECT | | |

DISPLAY SCREEN EXAMPLE OF TELEVISION RECEIVER (WEB PAGE)

E-EDID DATA STRUCTURE

FIG. 16

STRUCTURE OF E-EDID VENDOR SPECIFIC DATA BLOCK

| BYTE# | 7 | 6 | 5 | 4 | 3 | 2 | 1 | 0 |
|---|---|---|---|---|---|---|---|---|
| 0 | VENDOR-SPECIFIC TAG CODE (=3) | | | | LENGTH (=N) | | | |
| 1...3 | 24BIT IEEE REGISTRATION IDENTIFIER (0X000C03) LBS FIRST | | | | | | | |
| 4 | A | | | | B | | | |
| 5 | C | | | | D | | | |
| 6 | SUPPORTS-AI | DC_48BIT | DC_36BIT | DC_30BIT | DC_Y444 | RESERVED (0) | RESERVED (0) | DVI-DUAL |
| 7 | MAX_TMDS_CLOCK | | | | | | | |
| 8 | LATENCY | | FULL DUPLEX | HALF DUPLEX | RESERVED (0) | | | |
| 9 | VIDEO LATENCY | | | | | | | |
| 10 | AUDIO LATENCY | | | | | | | |
| 11 | INTER LACED VIDEO LATENCY | | | | | | | |
| 12 | INTER LACED AUDIO LATENCY | | | | | | | |
| 13...N | RESERVED (0) | | | | | | | |

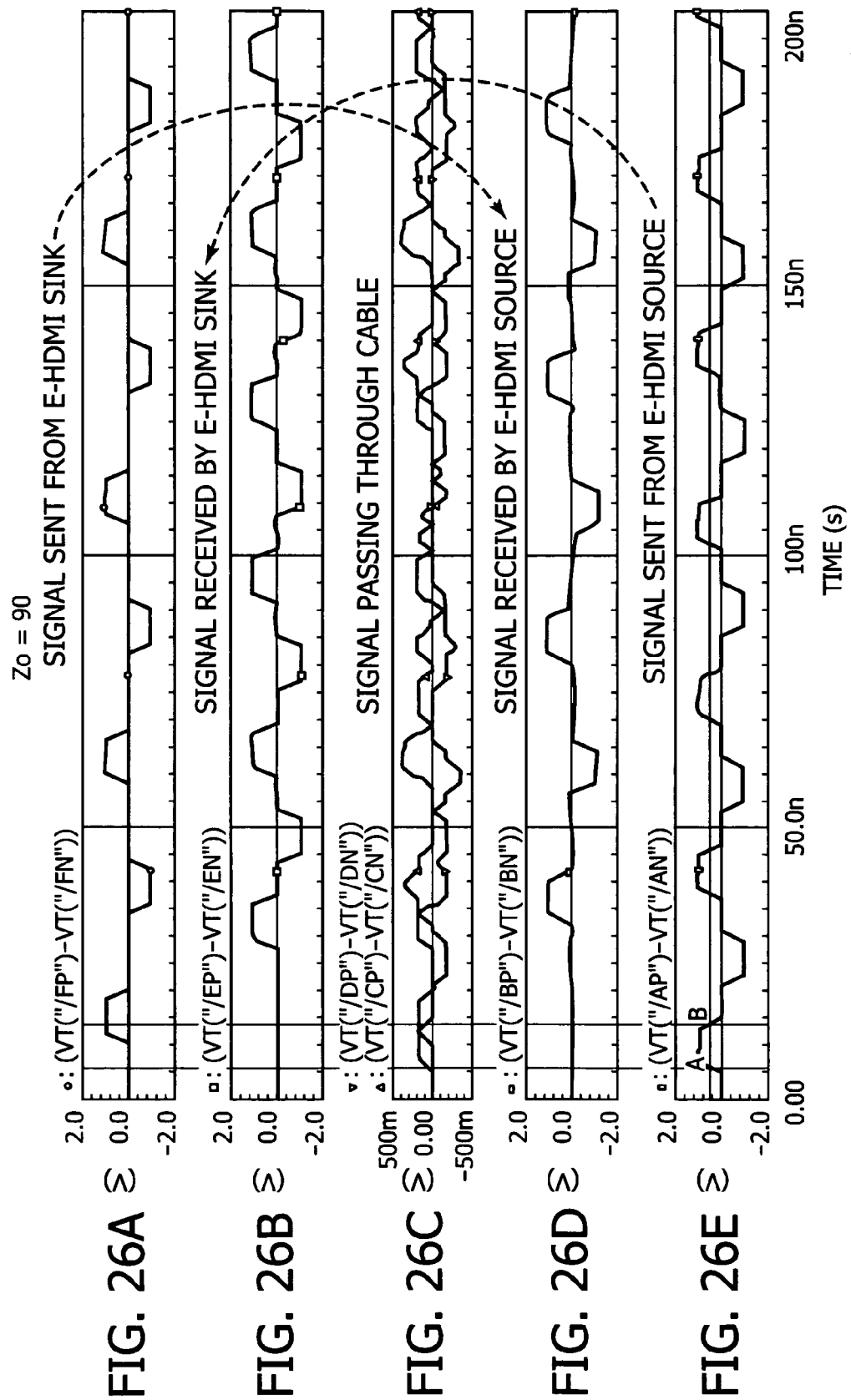

DISPLAY DEVICE AND TRANSMITTING DEVICE

CROSS-REFERENCE TO RELATED APPLICATIONS

The present application claims benefit of priority of Japanese patent Application No. 2007-261609 filed in the Japanese Patent Office on Oct. 5, 2007, the entire disclosure of which is incorporated herein by reference.

BACKGROUND OF THE INVENTION

1. Field of the Invention

The present invention relates to a display device and a transmitting device.

2. Description of Related Art

To configure an interactive system in which user input to a television receiver (TV) is sending to a personal computer (PC), there has been a need of using a plurality of cables: such as a cable for sending a video signal from the personal computer to the television receiver (for example, DVI, and VGA); a cable for sending an audio signal from the personal computer to the television receiver (an RCA cable, a stereo mini cable, etc.); and a cable for sending the user input into the television receiver to the personal computer (for example, USB, RS232C). Thus, the configuration using a plurality of cables is not suitable for a miniaturization and cost reduction of an apparatus, and not favorable for a user convenience. As a result, there is a need of a system with miniaturized and low-cost that may be simply configured.

Further, a plurality of apparatuses, i.e., the television receiver, the personal computer, etc., independently use their own remote control transmitters (commanders), and there has been a need of selectively using the remote control transmitter to be compatible with the apparatus used. Thus, it is not favorable for a user convenience. This calls for a system in which one remote control transmitter may be shared among a plurality of peripheral apparatuses connected to the television receiver to improve the convenience.

Recently, a High Definition Multimedia Interface (HDMI) has gradually become widely used as a communication interface for transmitting, at high speed, a digital video signal, i.e., a non-compressed (baseband) video signal (hereinafter, referred to as "image data") and a digital audio signal (hereinafter, referred to as "audio data") accompanying the video signal from a Digital Versatile Disc (DVD) recorder, a set top box, and other Audio Visual (AV) sources, for example, to a television receiver, a projector, and other displays. For example, there is a detailed description of an HDMI standard in WO publication 2002/078336.

SUMMARY OF THE INVENTION

As described above, connection between the television receiver and the personal computer by a plurality of cables, for example, inhibits the miniaturization and the reduction in cost of an apparatus. For example, when a plurality of apparatuses, such as the television receiver, the personal computer, and the like, individually use remote control transmitters, it is not favorable for a user convenience.

Accordingly, it is desirable to achieve a downsizing and a cost reduction of an apparatus. In addition, it is also desirable to enhance the user convenience.

In accordance with one aspect of the present invention, there is a display device which includes a signal receiving unit, an image display unit, a communicating unit, a position designating unit, and an information transmitting unit. The signal receiving unit receives a video signal by a differential signal through a plurality of channels from an external apparatus via a transmission path. The image display unit processes the vide signal received in the signal receiving unit to display an image. The communicating unit performs a bi-directional communication by using a predetermined line which constitutes the transmission path. The position designating unit designates a position on a display screen of the image display unit. The information transmitting unit transmits, by the communicating unit, coordinate information on the position designated by the position designating unit to the external apparatus.

In accordance with another aspect of the present invention, there is a transmitting device which includes a signal transmitting unit, a communicating unit, a video signal obtaining unit, an information receiving unit, and a controller. The signal transmitting unit transmits a video signal by a differential signal through a plurality of channels to an external apparatus via a transmission path. The communicating unit performs a bi-directional communication by using a predetermined line which constitutes the transmission path. The video signal obtaining unit receives, by the communicating unit, coordinate information about a screen position wherein the coordinate information is transmitted from the external apparatus. The controller controls the video signal obtained by the video signal obtaining unit on the basis of the coordinate information about the screen position wherein the coordinate information is received in the information receiving unit.

In one embodiment of the present invention, the display device receives the video signal via the transmission path from the external apparatus (transmitting device), and displays the received image. To control a displayed image, for example, a user may designate the position (a button display portion corresponding to a control content, for example) on the display screen by the position designating unit. The position designating unit may include a touch panel placed on the display screen. The position designating unit may be configured by using a remote control transmitter and receiver.

In addition, the display device includes a communicating unit configured to perform a bi-directional communication by using a predetermined line which constitutes the transmission path. The coordinate information on the designated position is transmitted to the external apparatus by the communicating unit.

In one embodiment of the present invention, the transmitting device transmits the video signal via the transmission path to the external apparatus (display device). The transmitting device includes a communicating unit configured to perform a bi-directional communication by using a predetermined line which constitutes the transmission path. The transmitting device controls the video signal transmitted to the external apparatus on the basis of the coordinate information about the screen position received through the communicating unit.

For example, when the video signal transmitted to the external apparatus is obtained in the video signal reproducing unit for reproducing the video signal from a recording medium, the reproducing operation of the video signal reproducing unit is controlled on the basis of the coordinate information on the screen position. Thus, start, stop, fast forward, rewind, and the like, of the image display on a side of the display device are performed.

Furthermore, for example, when the video signal transmitted to the external apparatus is obtained in a Web browser for obtaining an image file from the Internet to generate a video signal for displaying a Web page, the Web browser is controlled on the basis of the coordinate information about the screen position to update the Web page. Thus, updating the Web page on a side of the display device is performed.

For example, the video signal obtained in the video signal obtaining unit is transmitted to another device via a network. In this case, the video signal obtained in the video signal obtaining unit is combined with a display signal for displaying a mark on the screen position indicated by the coordinate information about the screen position, and as a result, the resultant video signal is a video signal transmitted to another device. In this case, on a side of another device, the mark is displayed on the screen. Thus, for example, a position indicated by a presenter on a side of a partner's device on an information material screen may be easily known.

In this way, the transmission path through which the video signal is transmitted from the transmitting device to the display device is used also for transmitting the coordinate information from the display device to the transmitting device. Therefore, a connection between the transmitting device and the display device can be performed by only a single HDMI cable, for example, and thus, miniaturization and reduction in cost of the display device and the transmitting device can be implemented.

In accordance with a further aspect of the present invention, there is provided a display device which includes a signal receiving unit, an image displaying unit, a communicating unit, an imaging unit, and a signal transmitting unit. The signal receiving unit receives a video signal by a differential signal through a plurality of channels from an external apparatus via a transmission path. The image display unit processes the video signal received in the signal receiving unit to display an image. The communicating unit performs a bi-directional communication by using a predetermined line which constitutes the transmission path. The imaging unit captures an object to obtain a video signal corresponding to the object. The signal transmitting unit transmits, by the communicating unit, the video signal obtained in the imaging unit to the external apparatus.

In accordance with yet another aspect of the present invention, there is a transmitting device which includes a signal transmitting unit, a communicating unit, a video signal obtaining unit, and a signal processing unit. The signal transmitting unit transmits a video signal by a differential signal through a plurality of channels to an external apparatus via a transmission path. The communicating unit performs a bi-directional communication by using a predetermined line which constitutes the transmission path. The video signal obtaining unit obtains the video signal transmitted by the signal transmitting unit. The signal processing unit combines a video signal received by the communicating unit from the external apparatus, with the video signal obtained by the video signal obtaining unit, to generate the video signal transmitted by the signal transmitting unit.

In one embodiment of the present invention, the display device receives the video signal received via the transmission path from the external apparatus (transmitting device), and displays the received image. The video signal (captured video signal) corresponding to the object is obtained from the imaging unit. The display device includes a communicating unit configured to perform a bi-directional communication by using a predetermined line which constitutes the transmission path. The captured video signal is transmitted to the external apparatus by the communicating unit. The transmission of such a captured video signal is performed when a transmission request command is transmitted from either a control data line constituting the transmission path or the communicating unit from the external apparatus, for example.

In one embodiment of the present invention, the transmitting device transmits the video signal via the transmission path to the external apparatus (display device). The transmitting device includes a communicating unit for performing a bi-directional communication using a predetermined line constituting the transmission path. In the transmitting device, the video signal received by the communicating unit is combined with the video signal obtained by the video signal obtaining unit, so that the video signal transmitted to the external apparatus is generated.

For example, the video signal obtaining unit is a video signal reproducing unit for reproducing a video signal from a recording medium, and the video signal from this video signal reproducing unit is combined with the imaged video signal transmitted from the external apparatus. Thus, on a side of the display device, a combined image in which the reproduced image and the captured image are combined is displayed.

The video signal obtaining unit may be a Web browser for obtaining an image file from Internet to generate a video signal for displaying a Web page. The video signal from the Web browser is combined with the captured video signal transmitted from the external apparatus. Thus, on a side of the display device, a combined image in which the Web page and the captured image are combined is displayed.

The video signal obtaining unit may be a signal receiving unit for receiving a video signal transmitted via a network from another device. The video signal from this signal receiving unit is combined with the imaged video signal transmitted from the external apparatus. Thus, on a side of the display device, a combined image in which an image on the side of another device (for example, the captured image) and a captured image of the device itself are combined is displayed.

In this way, the transmission path through which the video signal is received from the transmitting device to the display device is used also for transmitting the imaged video signal from the display device to the transmitting device. Therefore, a connection between the transmitting device and the display device can be performed by only a single HDMI cable, for example, and thus, miniaturization and reduction in cost of the display device and the transmitting device may be implemented.

In accordance with a still another aspect of the present invention, there is provided a display device including a signal receiving unit, an image displaying unit, a communicating unit, a remote control receiving unit, and a signal transmitting unit. The signal receiving unit receives a video signal by differential signal through a plurality of channels from an external apparatus via a transmission path. The image display unit processes the vide signal received in the signal receiving unit to display an image. The communicating unit performs a bi-directional communication by using a predetermined line which constitutes the transmission path. The remote control receiving unit receives a remote control signal. The signal transmitting unit transmits, by the communicating unit, the remote control signal received in the remote control receiving unit to the external apparatus.

In accordance a still another aspect of the present invention, there is provided a transmitting device including a signal transmitting unit, a communicating unit, a video signal obtaining unit, a signal receiving unit, and a controller. The signal transmitting unit transmits a video signal by a differential signal through a plurality of channels to an external apparatus via a transmission path. The communicating unit performs a bi-directional communication by using a predetermined line which constitutes the transmission path. The video signal obtaining unit obtains the video signal transmitted by the signal transmitting unit. The signal receiving unit receives, by the communicating unit, a remote control signal transmitted from the external apparatus. The controller controls an operation of the video signal obtaining unit on the basis of the remote control signal received in the signal receiving unit.

In one embodiment of the present invention, the display device receives the video signal via the transmission path from the external apparatus (transmitting device), and displays the received image. The remote control receiving unit receives the remote control signal. The display device includes a communicating unit for performing a bi-directional communication by using a predetermined line which constitutes the transmission path. The remote control signal received in the remote control receiving unit is transmitted to the external apparatus by this communicating unit.

In one embodiment of the present invention, the transmitting device transmits the video signal via the transmission path to the external apparatus (display device). The transmitting device includes a communicating unit for performing a bi-directional communication by using a predetermined line which constitutes the transmission path. The transmitting device controls an operation of the video signal obtaining unit on the basis of the remote control signal received through the communicating unit.

The transmitting device may include a table indicating a corresponding relationship between each remote control signal received in the communicating unit and a control content, for each type of the video signal (for each application). The controller may recognize the control content indicated by the remote control signal received by the communicating unit, by using the table corresponding to the type of the video signal obtained by the video signal obtaining unit and control the control content indicated by the remote control the operation of the video signal received by the communicating unit. Herein, the type of the video signal means types of a reproduced video signal, a video signal for displaying a Web page, a video signal transmitted via a network from another device, etc. When the table for each type of the video signal is thus prepared, an operation corresponding to types of a plurality of video signals may be enabled with a single remote control transmitter.

In this way, the transmission path through which the video signal is received from the transmitting device to the display device is used also for transmitting the remote control signal from the display device to the transmitting device. Therefore, a connection between the transmitting device and the display device can be performed by only a single HDMI cable, for example, and thus, miniaturization and reduction in cost of the display device and the transmitting device can be implemented.

According to embodiments of the present invention, in a display device which receives a video signal from an external apparatus via a transmission path and displays an image, a communicating unit for performing, a bi-directional communication is used to transmit coordinate information about a screen position, a captured video signal, or a remote control signal, to the external apparatus, by using a predetermined line constituting a transmission path, so that miniaturization and reduction in cost can be implemented.

Further, according to embodiments of the present invention, in a transmitting device for transmitting a video signal to an external apparatus via a transmission path, the transmitting device receives coordinate information about a screen position, an imaged video signal, and a remote control signal from the external apparatus, by a communicating unit for performing a bi-directional communication by using a predetermined line constituting a transmission path, so that miniaturization and reduction in cost can be implemented.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

FIG. 7 is a table showing a pin array (type A) of an HDMI terminal;

FIG. 16 is a diagram showing a structure of E-EDID Vender Specific Data Block;

FIG. 26 is a diagram showing waveforms of a bi-directional communication.

DETAILED DESCRIPTION OF EMBODIMENTS

Figure 1:
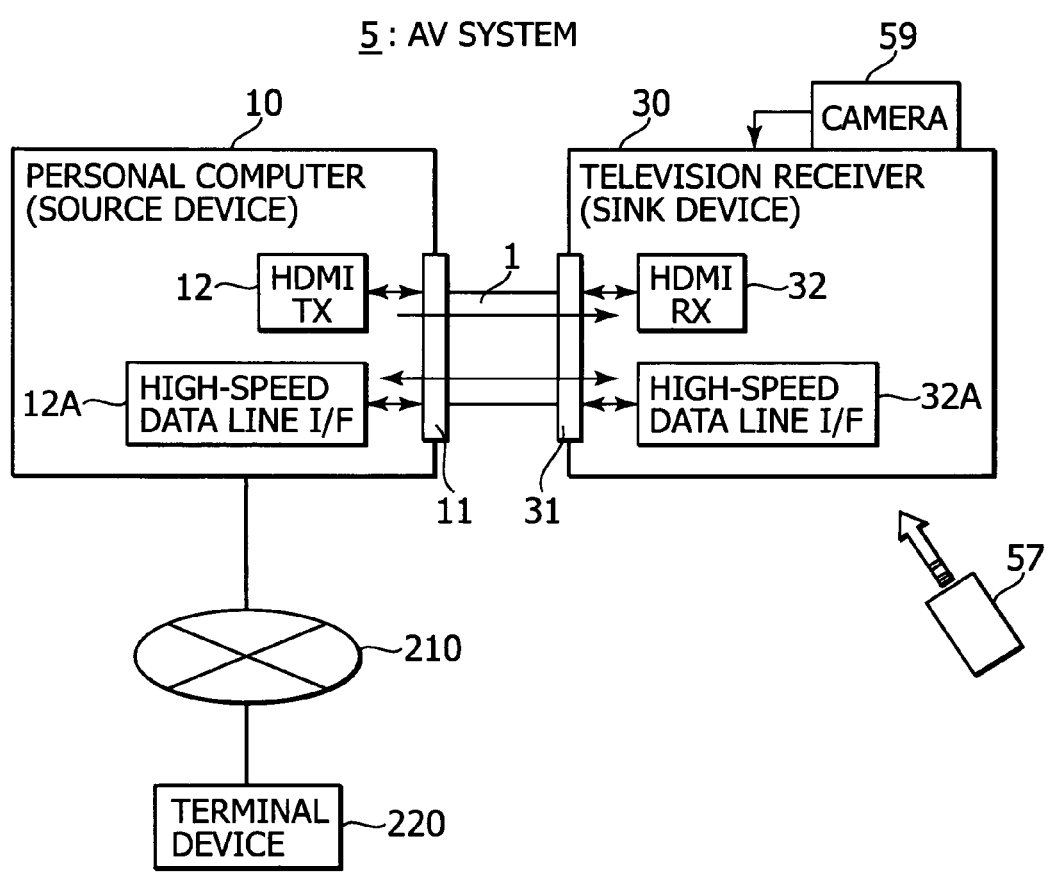
FIG. 1 is a block diagram showing a configuration example of an AV system as an embodiment of the present invention.

With reference to drawings, an embodiment of the present invention will be described below. FIG. 1 shows a configuration example of an AV (Audio Visual) system 5 as an embodiment.

The AV system 5 includes a personal computer (PC) 10 as a source device and a television receiver 30 as a sink device. The personal computer 10 and the television receiver 30 are connected via an HDMI cable 1.

The personal computer 10 is provided with an HDMI terminal 11 connected with an HDMI transmitting unit (HDMITX) 12 and a high-speed data line interface 12A. The television receiver 30 is provided with an HDMI terminal 31 connected with an HDMI receiving unit (HDMI RX) 32 and a high-speed data line interface 32A. One end of the HDMI cable 1 is connected to the HDMI terminal 11 of the personal computer 10, and the other end of the HDMI cable 1 is connected to the HDMI terminal 31 of the television receiver 30.

The personal computer 10 is connected to a terminal device 220 via a network 210 such as the Internet. Although a detailed description is omitted, the terminal device 220 is configured similarly to the personal computer 10. The personal computer 10 is provided with a videoconference function, whereby transmission and reception of image and audio data are enabled between the personal computer 10 and the terminal device 220. The television receiver 30 includes a camera 59 as an imaging unit for capturing an object.

Figure 2:
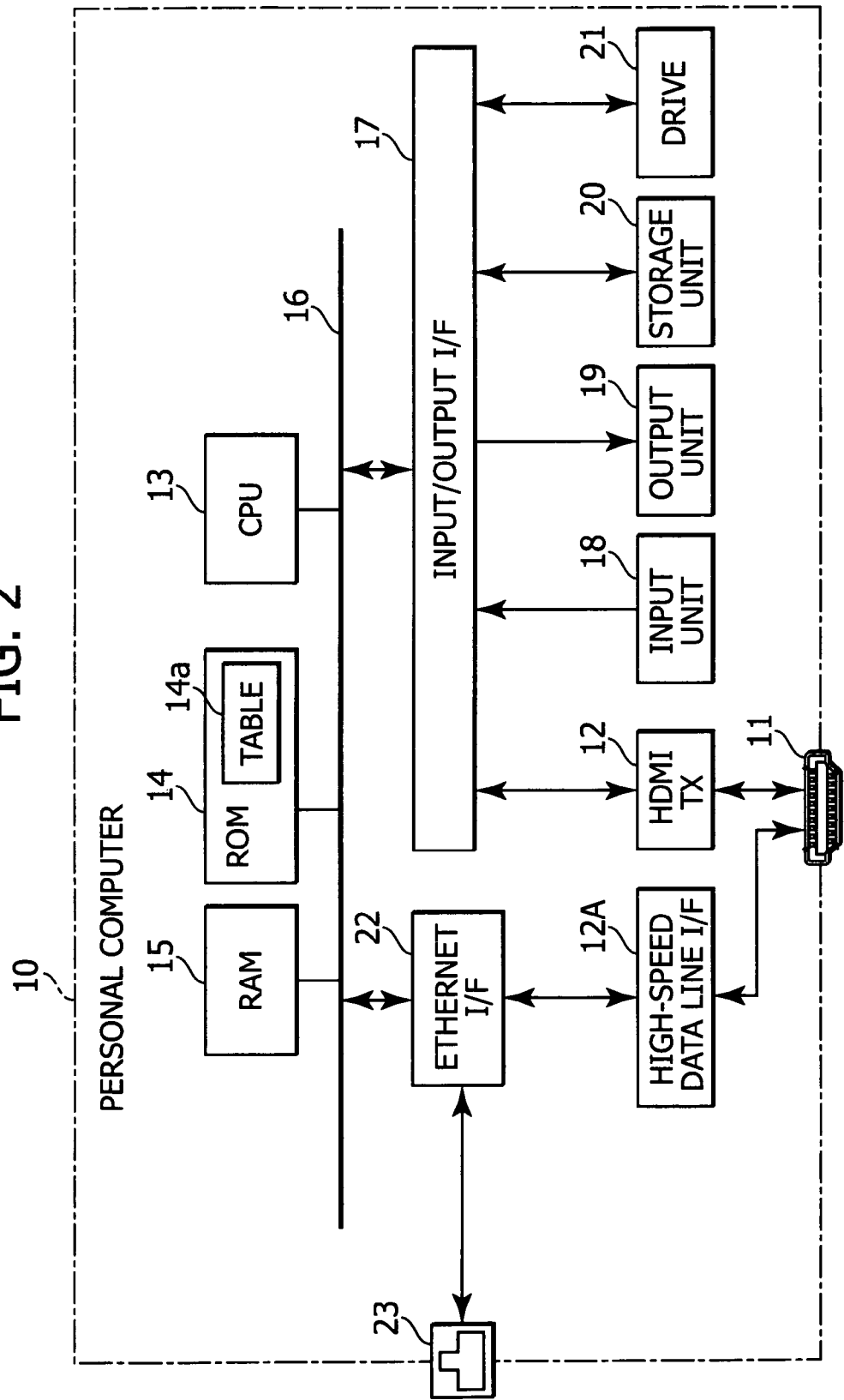
FIG. 2 is a block diagram showing a configuration example of a personal computer (source device) constituting the AV system.

FIG. 2 shows a configuration example of the personal computer 10.

The personal computer 10 includes: an HDMI terminal 11; an HDMI transmitting unit 12; the high-speed data line interface 12A; a central processing unit (CPU) 13; a read only memory (ROM) 14; a random access memory (RAM) 15; a bus 16; an input/output interface 17; an input unit 18; an output unit 19; a storage unit 20; a drive 21; an Ethernet interface (Ethernet I/F, "Ethernet" is a registered trademark) 22; and a network terminal 23.

In the personal computer 10, the CPU 13, the ROM 14, and the RAM 15 are connected to one another by the bus 16. The bus 16 is further connected with the input/output interface 17. The input/output interface 17 is connected with the input unit 18, the output unit 19, the storage unit 20, the drive 21, and the HDMI transmitting unit (HDMI TX) 12.

The input unit 18 includes a keyboard, a mouse, a microphone, and the like. The output unit 19 includes a display, a speaker, and the like. The storage unit 20 includes a hard disk drive (HDD), a non-volatile memory, and the like. The drive 21 drives removable media such as a magnetic disk, an optical disc, a magneto-optical disc, a memory card, or the like.

The bus 16 is further connected with the Ethernet interface 22. The Ethernet interface 22 is connected with the network terminal 23 and the high-speed data line interface 12A. The high-speed data line interface 12A is a bi-directional communication interface by using predetermined lines (in this embodiment, a reserve line and an HPD line) constituting the HDMI cable 1. A detail of the high-speed data line interface 12A is described later.

In the personal computer 10 configured as shown in FIG. 2, when the CPU 13 loads a program stored in the storage unit 20 into the RAM 15 via the input/output interface 17 and the bus 16, and then, executes the program, thereby performing a series of processes described later.

Figure 3:
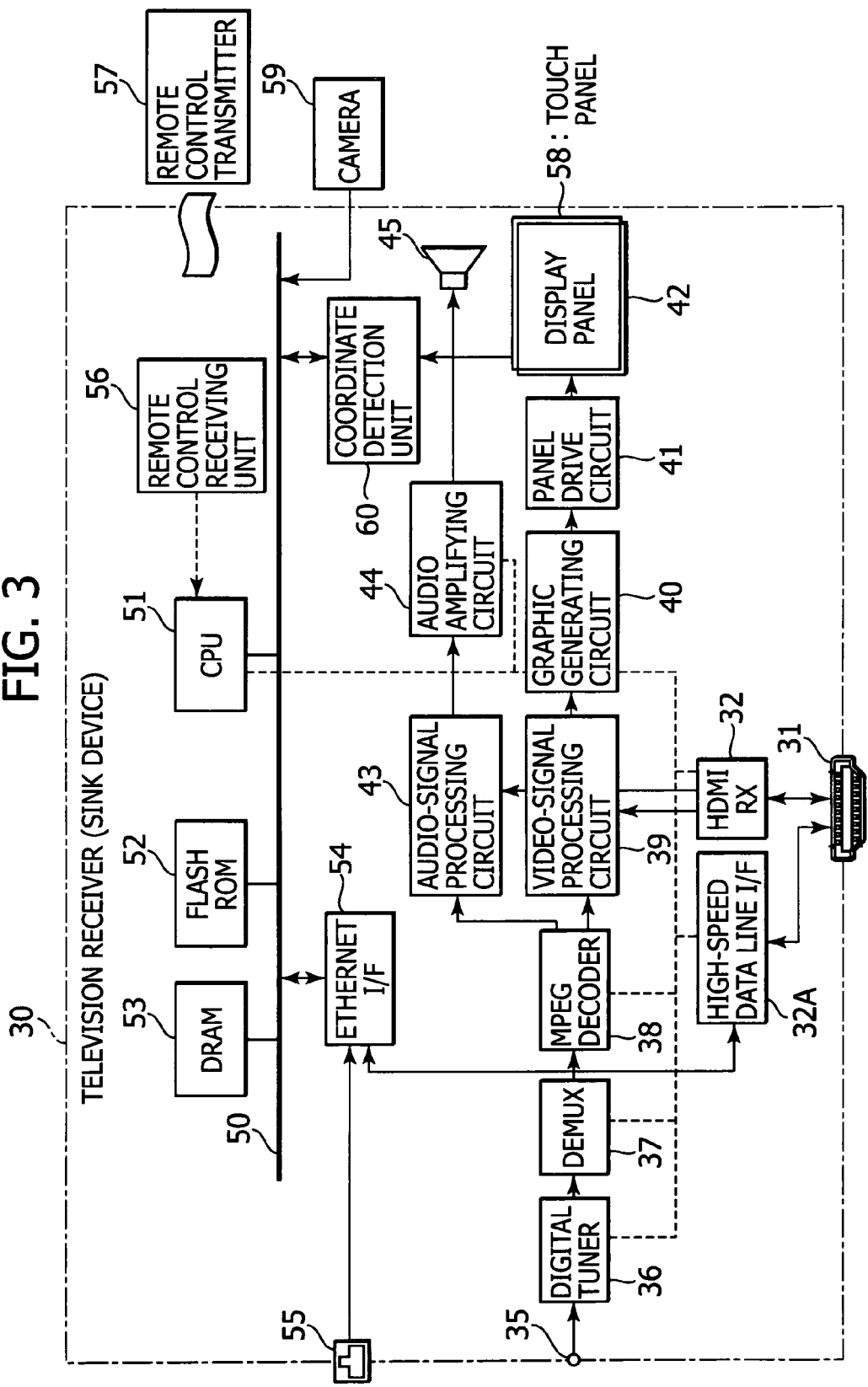
FIG. 3 is a block diagram showing a configuration example of a television receiver (sink device) constituting an AV system.

FIG. 3 shows a configuration example of the television receiver 30. The television receiver 30 includes: an HDMI terminal 31; an HDMI receiving unit 32; a high-speed data line interface 32A; an antenna terminal 35; a digital tuner 36; a demultiplexer 37; a moving picture expert group (MPEG) decoder 38; a video-signal processing circuit 39; a graphic generating circuit 40; a panel driving circuit 41; a display panel 42; an audio-signal processing circuit 43; an audio amplifying circuit 44; a speaker 45; an internal bus 50; a CPU 51; a flash ROM 52; a dynamic random access memory (DRAM) 53; an Ethernet interface (I/F) 54; a network terminal 55; a remote control receiving unit 56; a remote control transmitter 57; a touch panel 58; a camera 59; and a coordinate detecting unit 60.

The antenna terminal 35 is a terminal for inputting a television broadcast signal received by a receiving antenna (not shown). The digital tuner 36 processes the television broadcast signal inputted to the antenna terminal 35 to output a predetermined transport stream corresponding to a user's selected channel. The demultiplexer 37 extracts, from the transport stream obtained by the digital tuner 36, a partial TS (Transport Stream) (a TS packet of video data and a TS packet of audio data) corresponding to the user's selected channel.

The demultiplexer 37 further extracts Program Specific Information/Service Information (PSI/SI) from the transport stream obtained by the digital tuner 36, to output the extracted PSI/SI to the CPU 51. In the transport stream obtained by the digital tuner 36, a plurality of channels are multiplexed. A process for extracting the partial TS of an arbitrary channel from the transport stream in the demultiplexer 37 is enabled by obtaining information on a packet ID (PID) of the arbitrary channel from the PSI/SI (PAT/PMT).

The MPEG decoder 38 performs a decoding process to a video PES (Packetized Elementary Stream) packet configured by the TS packet of the video data obtained by the demultiplexer 37 to obtain the video data. The MPEG decoder 38 performs a decoding process to an audio PES packet configured by the TS packet of the audio data obtained by the demultiplexer 37 to obtain the audio data.

The video-signal processing circuit 39 and the graphic generating circuit 40 perform, as needed, a multiple screen process, a superimposing process of graphics data, and the like, to the video data obtained by the MPEG decoder 38. The panel driving circuit 41 drives the display panel 42 on the basis of the video data outputted from the graphic generating circuit 40. The display panel 42 includes a liquid crystal display (LCD), a plasma display panel (PDP), or the like. The audio-signal processing circuit 43 performs a necessary process, such as a D/A conversion, etc., to the audio data obtained by the MPEG decoder 38. The audio amplifying circuit 44 amplifies the audio signal outputted from the audio-signal processing circuit 43 to supply the amplified audio signal to the speaker 45.

The CPU 51 controls an operation of each component of the television receiver 30. The flash ROM 52 stores control software and retains data. The DRAM 53 configures a work area of the CPU 51. The CPU 51 expands the software and the data read from the flash ROM 52 onto the DRAM 53 to cause the software to be started, and controls each component of the television receiver 30.

The remote control receiving unit 56 receives a remote control signal (remote control code) transmitted from the remote control transmitter 57, and supplies the received signal to the CPU 51. The CPU 51 controls each component of the television receiver 30 on the basis of the remote control code. The network terminal 55 is a terminal for connecting to the network, and is connected to the Ethernet interface 54. The CPU 51, the flash ROM 52, the DRAM 53, and the Ethernet interface 54 are connected to the internal bus 50.

The camera 59 serves to capture an object to obtain the captured video signal corresponding to the object. The camera 59 is connected to the internal bus 50. The touch panel 58 constitutes a position designating unit for designating a position on a screen of the display panel 42, and is placed on the screen of the display panel 42. The touch panel 58 is connected to the internal bus 50 via the coordinate detecting unit 60. A user is able to directly touch with a finger or touch with a pen the touch panel 58 to designate the position on the screen.

The position on the screen of the display panel may be designated by operating the remote control transmitter 57, instead of using the touch panel 58. In this case, a cursor is displayed on the display screen, and the remote control signal for moving the cursor is transmitted from the remote control transmitter 57 to move a position of the cursor, thereby designating the position on the screen. In this case, the remote control transmitter 57 and the remote control receiving unit 56 constitute the position designating unit.

The HDMI receiving unit (HDMI sink) 32 receives data of the baseband video (image) and audio supplied to the HDMI terminal 31 via the HDMI cable 1 by communication in conformity with the HDMI. A detail of the HDMI receiving unit 32 is described later.

The high-speed data line interface 32A is a bi-directional communication interface by using predetermined lines (in this embodiment, a reserve line and an HPD line) which constitute the HDMI cable 1. The high-speed data line interface 32A is inserted between the Ethernet interface 54 and the HDMI terminal 31.

An operation of the television receiver 30 shown in FIG. 3 is briefly described.

The television broadcast signal inputted to the antenna terminal 35 is supplied to the digital tuner 36. In the digital tuner 36, the television broadcast signal is processed to output a predetermined transport stream corresponding to the user's selected channel, and the predetermined transport stream is supplied to the demultiplexer 37. In the demultiplexer 37, a partial TS (a TS packet of the video data, and a TS packet of the audio data) corresponding to the user's selected channel is extracted from the transport stream to supply the partial TS to the MPEG decoder 38.

The MPEG decoder 38 performs a decoding process to the video PES packet configured by the TS packet of the video data, to obtain the video data. The video data is processed for a multiple screen process, a superimposing process of graphics data, and the like, as needed, in the video-signal processing circuit 39 and the graphic generating circuit 40, and thereafter, the resultant data is supplied to the panel driving circuit 41. As a result, an image corresponding to the user's selected channel is displayed on the display panel 42.

In the MPEG decoder 38, a decoding process is performed to the audio PES packet configured by the TS packet of the audio data, to obtain the audio data. The audio data is subjected to a necessary process, such as a D/A conversion and the like, in the audio-signal processing circuit 43, and after being amplified in the audio amplifying circuit 44, the amplified audio data is supplied to the speaker 45. As a result, an audio sound corresponding to the user's selected channel is outputted from the speaker 45.

The HDMI receiving unit 32 obtains video (image) data and audio data transmitted from a video camera recorder 10 connected via the HDMI cable 1 to the HDMI terminal 31. The video data and the audio data are supplied to the video-signal processing circuit 39 and the audio-signal processing circuit 43, respectively. From this point onward, operations similar to those when receiving the television broadcast signal are performed follow, and the image is displayed on the display panel 42 and the audio sound is outputted from the speaker 45.

As described above, the HDMI cable 1 connected to the HDMI terminal 31, besides the transmission line (transmission path) of the video data, also prepares a transmission line (transmission path) of control data. The transmission line of the control data is configured to perform therein a two-way data transmission. Accordingly, the HDMI receiving unit 32 has a function of transmitting and receiving the control data, in addition to the function of receiving the video signal. The control data received in the HDMI receiving unit 32 is supplied to the CPU 51. The control data to be transmitted by the HDMI receiving unit 32 is supplied from the CPU 51.

The high-speed data line interface 32A transmits transmission data supplied from the CPU 51 to an apparatus of another party via the HDMI cable 1 from the HDMI terminal 31. The high-speed data line interface 32A supplies received data received from the apparatus of the other party via the HDMI terminal 31 from the HDMI cable 1 to the CPU 51.

In this embodiment, examples of the data transmitted via the high-speed data line interface 32A to the apparatus of the other party, i.e., the personal computer 10, include: the coordinate information indicating a position on the display screen designated by the touch panel 58, etc.; the captured video signal obtained from the camera 59; the remote control signal (remote control code) received by the remote control receiving unit 56, etc.

Figure 4:
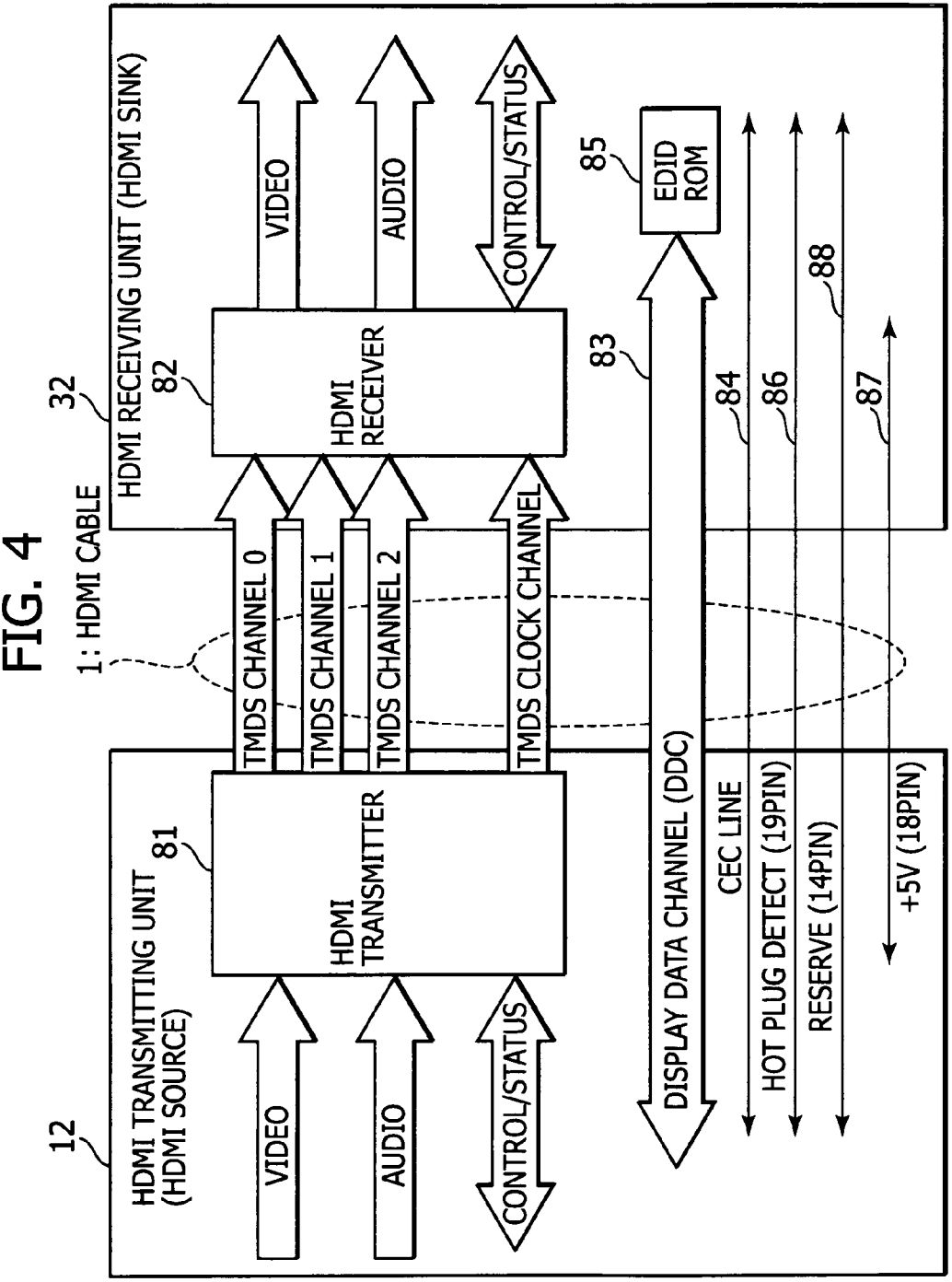
FIG. 4 is a block diagram showing a configuration example of an HDMI transmitting unit (HDMI source) and an HDMI receiving unit (HDMI sink)

FIG. 4 shows a configuration example of the HDMI transmitting unit (HDMI source) 12 of the personal computer 10 and the HDMI receiving unit (HDMI sink) 32 of the television receiver 30, in the AV system 5 in FIG. 1.

The HDMI source 12 transmits a differential signal corresponding to pixel data of a non-compressed 1-screen image unidirectionally to the HDMI sink 32 through a plurality of channels in an effective image period (hereinafter, appropriately referred to as an active video period), i.e., a period obtained by removing a horizontal blanking period and a vertical blanking period from a period between one vertical synchronizing signal and a subsequent vertical synchronizing signal. The HDMI source 12 further transmits differential signals corresponding to the audio data and the control data which accompany at least the image, other auxiliary data, etc., unidirectionally to the HDMI sink 32 through a plurality of channels in one of the horizontal blanking period and the vertical blanking period.

That is, the HDMI source 12 includes a transmitter 81. The transmitter 81 converts, for example, the pixel data of the non-compressed image into a corresponding differential signal, and performs an unidirectional serial-transmission of the converted signal to the HDMI sink 32 connected via the HDMI cable 1 through a plurality of channels, i.e., three TMDS channels #0, #1, and #2.

The transmitter 81 further converts the audio data accompanying the non-compressed image, necessary control data, other auxiliary data, etc., into a corresponding differential signal, and performs an unidirectional serial-transmission of the converted signal to the HDMI sink 32 connected via the HDMI cable 1 through the three TMDS channels #0, #1, and #2.

The transmitter 81 also transmits a pixel clock synchronized with the pixel data transmitted through the three TMDS channels #0, #1, and #2 to the HDMI sink 32 connected via the HDMI cable 1 through a TMDS clock channel. In this case, in one TMDS channel #i (i=0, 1, 2), 10-bit pixel data is transmitted during one clock of the pixel clock.

In the active video period, the HDMI sink 32 receives the differential signal which is transmitted unidirectionally from the HDMI source 12 through a plurality of channels and which corresponds to the pixel data. In the horizontal blanking period or the vertical blanking period, the HDMI sink 32 receives the differential signal which is transmitted unidirectionally from the HDMI source 12 through a plurality of channels and which corresponds to the audio data and the control data.

That is, the HDMI sink 32 includes a receiver 82. The receiver 82 receives the differential signal corresponding to the pixel data and the differential signal corresponding to the audio data and the control data, which are transmitted unidirectionally from the HDMI source 12 connected via the HDMI cable 1 through the TMDS channels #0, #1, and #2, in synchronization with the pixel clock similarly transmitted through TMDS clock channel from HDMI source 12.

A transmission channel of the HDMI system configured by the HDMI source 12 and the HDMI sink 32 includes: the three TMDS channels #0 to #2 which are transmission channels for serially transmitting unidirectionally the pixel data and the audio data in synchronization with the pixel clock from the HDMI source 12 to the HDMI sink 32; the TMDS clock channel which is a transmission channel for transmitting the pixel clock; and a transmission channel called a Display Data Channel (DDC) 83 and a CEC line 84.

The DDC 83 is formed of two signal lines (not shown) included in the HDMI cable 1, and the HDMI source 12 is used for reading an enhanced extended display identification Data (E-EDID) from the HDMI sink 32 connected via the HDMI cable 1.

That is, the HDMI sink 32 includes, in addition to the HDMI receiver 81, an EDID ROM (Read Only Memory) 85 stored with the E-EDID, which is capability information on its own capability (configuration/capability). The HDMI source 12 reads out the E-EDID of the HDMI sink 32 via the DDC 83 from the HDMI sink 32 connected via the HDMI cable 1. Based on the E-EDID, the HDMI receiver 81 recognizes a setting of a capability of the HDMI sink 32, i.e., an image format (profile) with which an electronic apparatus having the HDMI sink 32 is compatible. Examples of the image format include RGB, YCbCr 4:4:4, and YCbCr 4:2:2.

The CEC line 84 is formed of one signal line (not shown) included in the HDMI cable 1, and is used for performing a bi-directional communication of data for control between the HDMI source 12 and the HDMI sink 32.

The HDMI cable 1 also includes a line 86 connected to a pin called a hot plug detect (HPD). The source device may utilize the line 86 to detect a connection of the sink device. The HDMI cable 1 further includes a line 87 used for supplying power to the sink device from the source device. The HDMI cable 1 also includes a reserve line 88.

Figure 5:
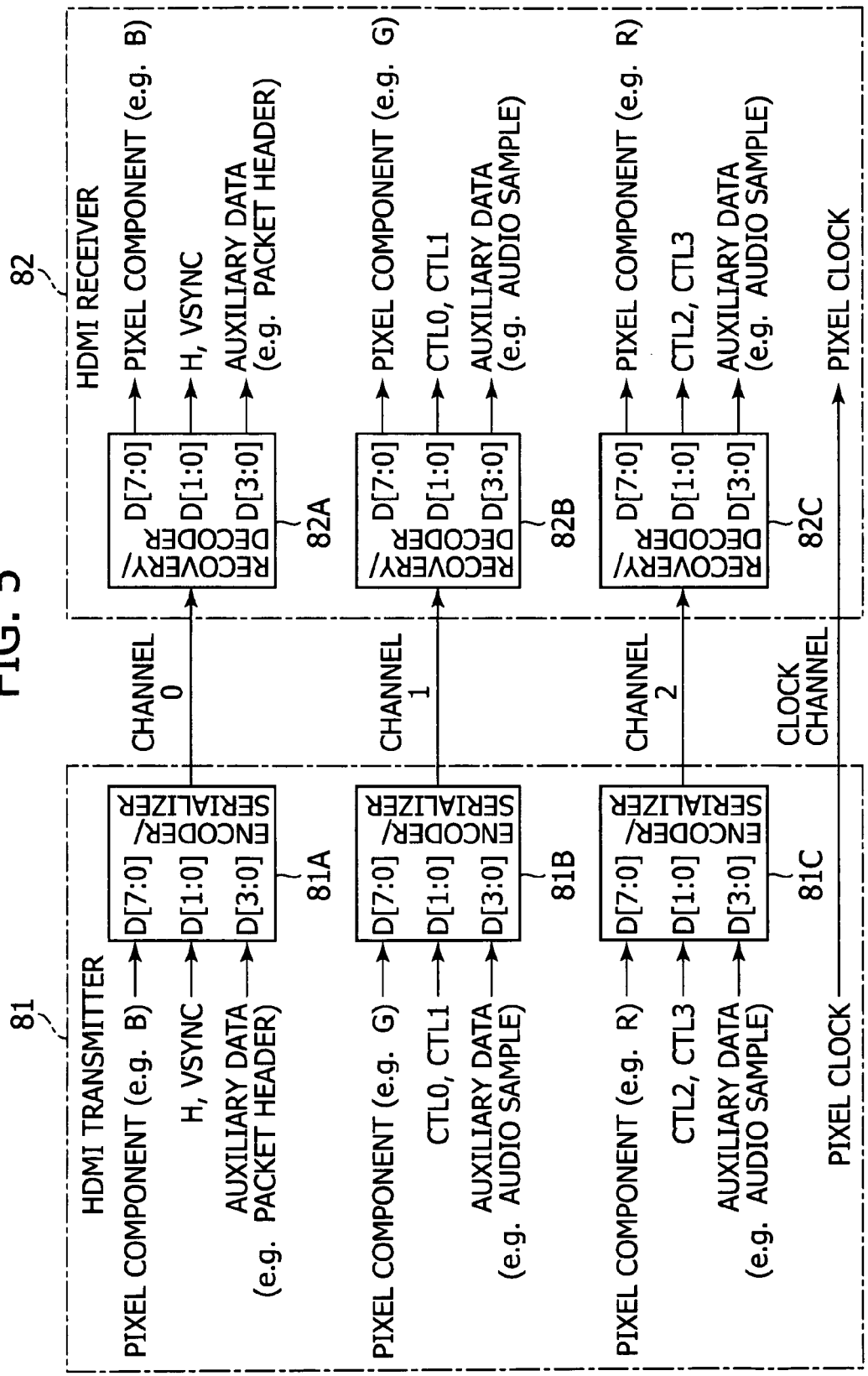
FIG. 5 is a block diagram showing a configuration example of an HDMI transmitter and an HDMI receiver.

FIG. 5 shows a configuration example of the HDMI transmitter 81 and the HDMI receiver 82 in FIG. 4.

The HDMI transmitter 81 includes three encoders/serializers 81A, 81B, and 81C, each of which corresponds to the three TMDS channels #0, #1, and #2. Each of the encoders/serializers 81A, 81B, and 81C encodes the image data, the auxiliary data, and the control data supplied thereto, converts the encoded data from parallel data to serial data, and transmits the converted data by the differential signal. When the image data has three components, for example, red (R), green (G), and blue (B), a B component is supplied to the encoder/serializer 81A, a G component is supplied to the encoder/serializer 81B, and an R component is supplied to the encoder/serializer 81C.

Examples of the auxiliary data include audio data and a control packet. The control packet is supplied to the encoder/serializer 81A, and the audio data is supplied to the encoders/serializers 81B and 81C, for example.

Examples of the control data include a 1-bit vertical synchronizing signal (VSYNC), a 1-bit horizontal synchronizing signal (HSYNC), and control bits CLT0, CTL1, CTL2, and CTL3, each of which is one bit. The vertical synchronizing signal and the horizontal synchronizing signal are supplied to the encoder/serializer 81A. The control bits CLT0 and CLT1 are supplied to the encoder/serializer 81B, and the control bits CTL2 and CTL3 are supplied to the encoder/serializer 81C.

The encoder/serializer 81A transmits, in a time division manner, the B component of the image data, the vertical synchronizing signal and the horizontal synchronizing signal, and the auxiliary data, each of which is supplied to the encoder/serializer 81A. That is, the encoder/serializer 81A converts the B component of the image data supplied to the encoder/serializer 81A into parallel data of an 8-bit unit which is a fixed bit number. Then, the encoder/serializer 81A encodes the parallel data, converts the encoded data into serial data, and transmits the converted data through the TMDS channel #0.

The encoder/serializer 81A encodes 2-bit parallel data of the vertical synchronizing signal and the horizontal synchronizing signal supplied to the encoder/serializer 81A, converts the encoded data into serial data, and transmits the converted data through the TMDS channel #0. The encoder/serializer 81A further converts the auxiliary data supplied thereto into 4-bit-unit parallel data. The encoder/serializer 81A encodes the parallel data, converts the encoded data into serial data, and transmits the converted data through the TMDS channel #0.

The encoder/serializer 81B transmits, in a time division manner, the G component of the image data, the control bits CLT0 and CTL1, and the auxiliary data, each of which is supplied to the encoder/serializer 81B. That is, the encoder/serializer 81B converts the G component of the image data supplied to the encoder/serializer 81B into parallel data of an 8-bit unit, which is a fixed bit number. The encoder/serializer 81B further encodes the parallel data, converts the encoded data into serial data, and transmits the converted data through the TMDS channel #1.

The encoder/serializer 81B encodes the 2-bit parallel data of the control bits CLT0 and CTL1 supplied to the encoder/serializer 81B, converts the encoded data into serial data, and transmits the serial data through the TMDS channel #1. The encoder/serializer 81B further converts the auxiliary data supplied thereto into 4-bit-unit parallel data. The encoder/serializer 81B encodes the parallel data, converts the encoded data into serial data, and transmits the converted data through the TMDS channel #1.

The encoder/serializer 81C transmits, in a time division manner, the R component of the image data, the control bits CTL2 and CTL3, and the auxiliary data, each of which is supplied to the encoder/serializer 81C. That is, the encoder/serializer 81C converts the R component of the image data supplied to the encoder/serializer 81C into parallel data of an 8-bit unit, which is a fixed bit number. The encoder/serializer 81C encodes the parallel data, converts the encoded data into serial data, and transmits the converted data through the TMDS channel #2.

The encoder/serializer 81C encodes the 2-bit parallel data of the control bits CTL2 and CTL3 supplied to the encoder/serializer 81C, converts the encoded data into serial data, and transmits the serial data through the TMDS channel #2. The encoder/serializer 81C converts the auxiliary data supplied thereto into parallel data of a 4-bit unit. The encoder/serializer 81C encodes the parallel data, converts the encoded data into serial data, and transmits the serial data through the TMDS channel #2.

The receiver 82 includes three recovery/decoders 82A, 82B, and 82C, which correspond to the three TMDS channels #0, #1, and #2, respectively. Each of the recovery/decoders 82A, 82B, and 82C receives the image data, the auxiliary data, and the control data transmitted by the differential signal through the TMDS channels #0, #1, and #2. Each of the recovery/decoders 82A, 82B, and 82C converts the image data, the auxiliary data, and the control data from the serial data into the parallel data, decodes the converted data, and outputs the decoded data.

That is, the recovery/decoder 82A receives the B component of the image data, the vertical synchronizing signal and horizontal synchronizing signal, and the auxiliary data transmitted by the differential signal through the TMDS channel #0. The recovery/decoder 82A converts the B component of the image data, the vertical synchronizing signal and the horizontal synchronizing signal, and the auxiliary data from the serial data into the parallel data, decodes the converted data, and outputs the decoded data.

The recovery/decoder 82B receives the G component of the image data, the control bits CLT0 and CTL1, and the auxiliary data which are transmitted by the differential signal through the TMDS channel #1. The recovery/decoder 82B converts the G component of the image data, the control bits CLT0 and CTL1, and the auxiliary data, from the serial data into the parallel data, decodes the converted data, and outputs the decoded data.

The recovery/decoder 82C receives the R component of the image data, the control bits CTL2 and CTL3, and the auxiliary data which are transmitted by the differential signal through the TMDS channel #2. The recovery/decoder 82C converts the R component of the image data, the control bits CTL2 and CTL3, and the auxiliary data, from the serial data into the parallel data, decodes the converted data, and outputs the decoded data.

Figure 6:
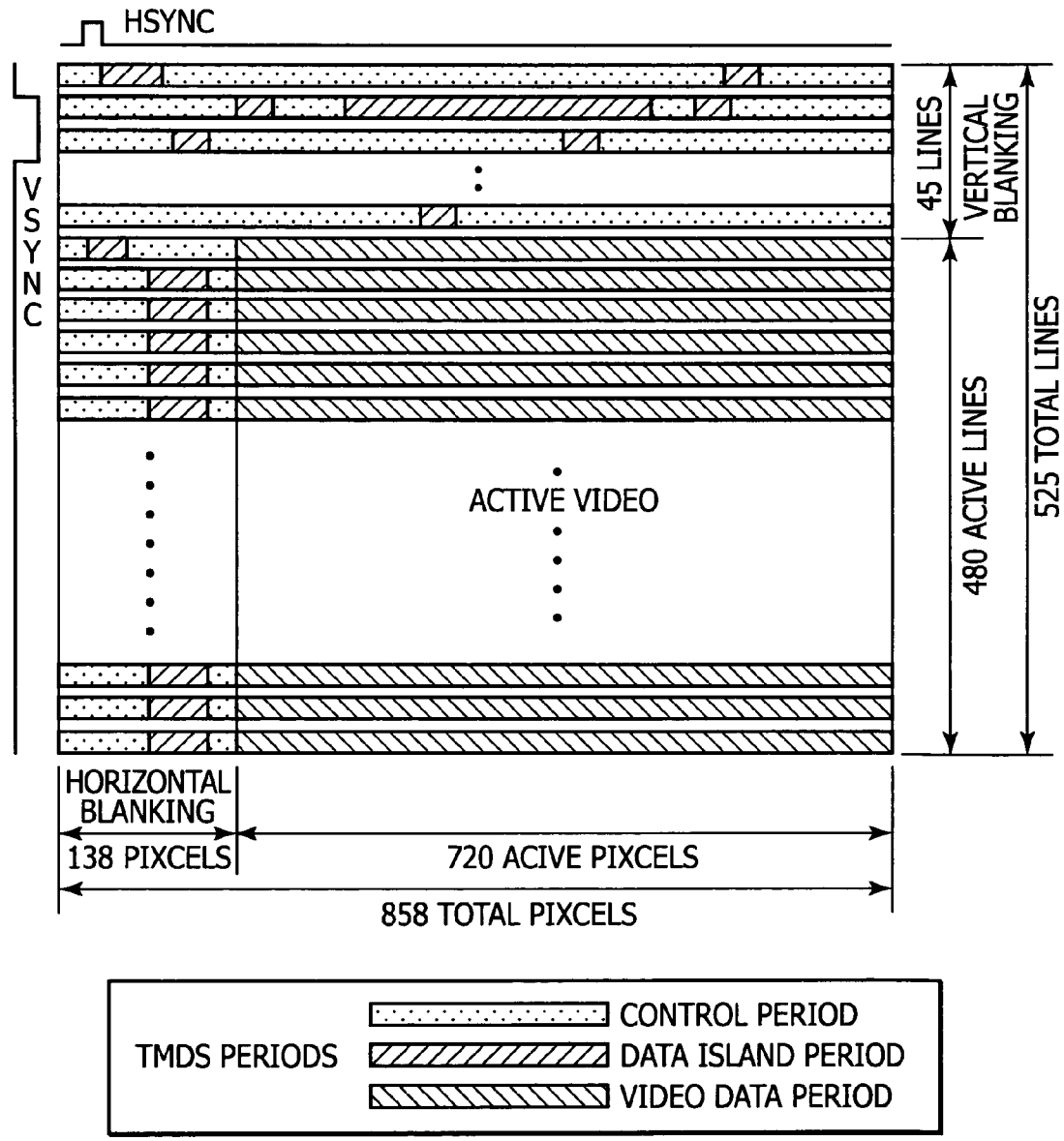
FIG. 6 is a diagram showing a structure of TMDS transmission data.

FIG. 6 shows an example of a transmission period in which various transmission data are transmitted through the three TMDS channels #0, #1, and #2 of the HDMI. FIG. 6 shows periods of the various transmission data when a progressive image which is composed of 720 pixels horizontally and 480 pixels vertically is transmitted through the TMDS channels #0, #1, and #2.

In video field in which the transmission data are transmitted through the three TMDS channels #0, #1, and #2 of the HDMI, there exist three types of periods, i.e., a video data period, a data island period, and a control period, depending on types of the transmission data.

In this case, the video field period is a period from an active edge of a certain vertical synchronizing signal to an active edge of a subsequent vertical synchronizing signal, and is divided into: the horizontal blanking period; the vertical blanking period; and the active video period obtained by removing the horizontal blanking period and the vertical blanking period from the video field period.

The video data period is allocated to the active video period. In this video data period, data of an active pixel composed of 720 pixels×480 lines which form uncompressed 1-screen image data is transmitted.

The data island period and the control period are allocated to the horizontal blanking period and the vertical blanking period. In the data island period and the control period, the auxiliary data is transmitted.

That is, the data island period is allocated to a part of the horizontal blanking period and the vertical blanking period. In the data island period, a packet, etc., of data which form part of the auxiliary data and which are not related to the control are transmitted. Examples of such data include audio data.

The control period is allocated to other parts of the horizontal blanking period and the vertical blanking period. In the control period, data which forms part of the auxiliary data and which is related to the control, for example the vertical synchronizing signal and horizontal synchronizing signal, the control packet, etc., are transmitted.

According to the current HDMI, a frequency of the pixel clock transmitted through a TMDS clock channel is 165 MHz, for example. In this case, a transmission rate of the data island period is about 500 Mbps.

FIG. 7 shows a pin array of the HDMI terminals 11 and 31. This pin array is called a type-A.

Two lines, i.e., differential lines through which TMDS Data#i+ and TMDS Data#i− which are differential signals of the TMDS channel #i are transmitted, are connected to pins (of which the pin numbers are 1, 4, and 7) to which TMDS Data#i+ is allocated and pins (of which the pin numbers are 3, 6, and 9) to which TMDS Data#i− is allocated.

The CEC line 84 through which the CEC signal, i.e., data for the control, is transmitted is connected to the pin of which the pin number is 13, and the pin of which the pin number is 14 is a reserved pin. A line through which an SDA (Serial Data) signal such as the E-EDID is transmitted is connected to the pin of which the pin number is 16, and a line through which an SCL (Serial Clock) signal, i.e., a clock signal used for synchronizing at the time of transmitting and receiving the SDA signal, is transmitted is connected to the pin of which the pin number is 15. The DDC 83 is configured by the line through which the SDA signal is transmitted and through which the SCL signal is transmitted.

As described above, the line 86 used by the source device to detect the connection of the sink device is connected to the pin of which the pin number is 19. As described above, the line 87 for supplying the power supply is connected to the pin of which the pin number is 18.

Figure 8:
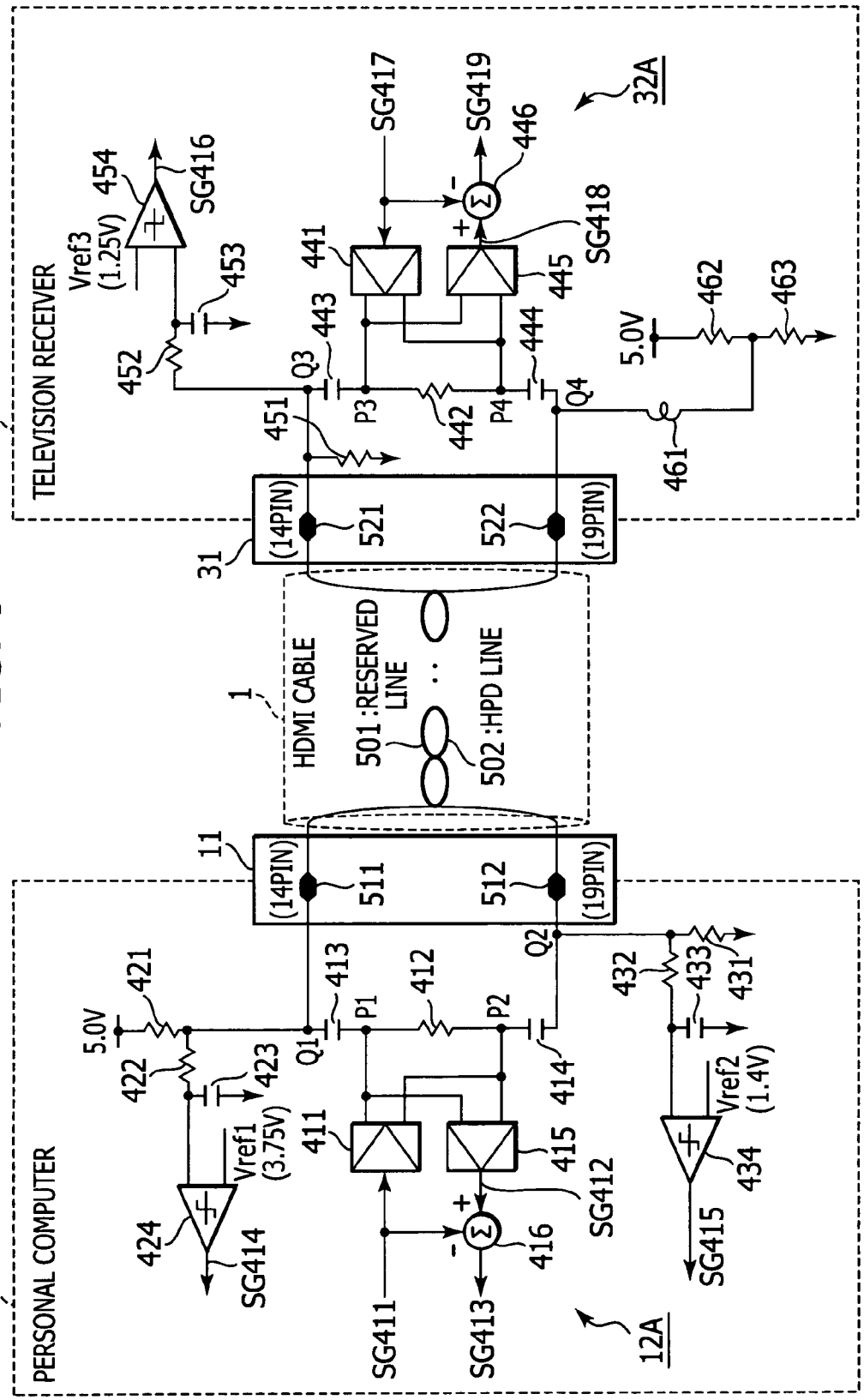
FIG. 8 is a connection diagram showing a configuration example of a high-speed data line interface between a personal computer and a television receiver.

FIG. 8 shows a configuration example of the high-speed data line interface 12A of the personal computer 10 and the high-speed data line interface 32A of the television receiver 30, in the AV system 5 in FIG. 1. These interfaces 12A and 32A constitute a communicating unit for performing a LAN (Local Area Network) communication. The communicating unit uses, out of a plurality of lines which form the HDMI cable 1, a pair of differential lines, i.e., in this embodiment, the reserve line (Ether-line) corresponding to the reserve pin (14th pin) and the HPD line (Ether+line) corresponding to the HPD pin (19th pin) line, thereby communication is performed.

The personal computer 10 includes: a LAN signal transmitting circuit 411; a terminal resistance 412; AC-coupling capacitances 413 and 414; a LAN signal receiving circuit 415; a subtracting circuit 416; a pull-up resistance 421; a low-pass filter composed of a resistance 422 and a capacitance 423; a comparator 424; a pull-down resistance 431; a resistance 432 and a capacitance 433 forming a low-pass filter; and a comparator 434. Herein, the high-speed data line interface 12A is configured by: the LAN signal transmitting circuit 411; the terminal resistance 412; the AC-coupling capacitances 413 and 414; the LAN signal receiving circuit 415; and the subtracting circuit 416.

Between a power supply line (+5.0 V) and a grounding line, a series circuit is connected. The series circuit includes: the pull-up resistance 421; the AC-coupling capacitance 413; the terminal resistance 412; the AC-coupling capacitance 414; and the pull-down resistance 431. A connection point P1 connecting the AC-coupling capacitance 413 and the terminal resistance 412 is connected to a positive output side of the LAN signal transmitting circuit 411, and connected to a positive input side of the LAN signal receiving circuit 415. A connection point P2 connecting the AC-coupling capacitance 414 and the terminal resistance 412 is connected to a negative output side of the LAN signal transmitting circuit 411, and is connected to a negative input side of the LAN signal receiving circuit 415. An input side of the LAN signal transmitting circuit 411 is supplied with a transmission signal (transmission data) SG411.

A positive-side terminal of the subtracting circuit 416 is supplied with an output signal SG412 of the LAN signal receiving circuit 415. A negative-side terminal of the subtracting circuit 416 is supplied with the transmission signal (transmission data) SG411. In the subtracting circuit 416, the transmission signal SG411 is subtracted from the output signal SG412 of the LAN signal receiving circuit 415, so that a reception signal (reception data) SG413 is obtained.

A connection point Q1 connecting the pull-up resistance 421 and the AC-coupling capacitance 413 is connected to a grounding line via the series circuit of the resistance 422 and the capacitance 423. An output signal of the low-pass filter obtained at the connection point connecting the resistance 422 and the capacitance 423 is supplied to one input terminal of the comparator 424. In the comparator 424, the output signal of the low-pass filter is compared with a reference voltage Vref1 (+3.75 V) supplied to the other input terminal. An output signal SG414 of the comparator 424 is supplied to the CPU 13.

A connection point Q2 connecting the AC-coupling capacitance 414 and the pull-down resistance 431 is connected to a grounding line via the series circuit of the resistance 432 and the capacitance 433. An output signal of the low-pass filter obtained at the connection point connecting the resistance 432 and the capacitance 433 is supplied to one input terminal of the comparator 434. In the comparator 434, the output signal of the low-pass filter is compared with a reference voltage Vref2 (+1.4 V) supplied to the other input terminal. An output signal SG415 of the comparator 434 is supplied to the CPU 13.

The television receiver 30 includes: a LAN signal transmitting circuit 441; a terminal resistance 442; AC-coupling capacitances 443 and 444; a LAN signal receiving circuit 445; a subtracting circuit 446; a pull-down resistance 451; a low-pass filter composed of a resistance 452 and a capacitance 453; a comparator 454; a choke coil 461; a resistance 462; and a resistance 463. Herein, the high-speed data line interface 32A is configured by: the LAN signal transmitting circuit 441; the terminal resistance 442; the AC-coupling capacitances 443 and 444; the LAN signal receiving circuit 445; and the subtracting circuit 446.

Between a power supply line (+5.0 V) and a grounding line, a series circuit of the resistance 462 and the resistance 463 is connected. Between a connection point connecting the resistance 462 and the resistance 463, and the grounding line, there is connected a series circuit formed of the choke coil 461; the AC-coupling capacitance 444; the terminal resistance 442; the AC-coupling capacitance 443; and the pull-down resistance 451.

A connection point P3 connecting the AC-coupling capacitance 443 and the terminal resistance 442 is connected to a positive output side of the LAN signal transmitting circuit 441, and is connected to a positive input side of the LAN signal receiving circuit 445. A connection point P4 connecting the AC-coupling capacitance 444 and the terminal resistance 442 is connected to a negative output side of the LAN signal transmitting circuit 441, and is connected to a negative input side of the LAN signal receiving circuit 445. An input side of the LAN signal transmitting circuit 441 is supplied with a transmission signal (transmission data) SG417.

A positive-side terminal of the subtracting circuit 446 is supplied with an output signal SG418 of the LAN signal receiving circuit 445. A negative-side terminal of the subtracting circuit 446 is supplied with the transmission signal SG417. In the subtracting circuit 446, the transmission signal SG417 is subtracted from the output signal SG418 of the LAN signal receiving circuit 445, so that a reception signal (reception data) SG419 is obtained.

A connection point Q3 connecting the pull-down resistance 451 and the AC-coupling capacitance 443 is connected to a grounding line via the series circuit of the resistance 452 and the capacitance 453. An output signal of the low-pass filter obtained at the connection point connecting the resistance 452 and the capacitance 453 is supplied to one input terminal of the comparator 454. In the comparator 454, the output signal of the low-pass filter is compared with a reference voltage Vref3 (+1.25 V) supplied to the other input terminal. An output signal SG416 of the comparator 454 is supplied to the CPU 51.

A reserve line 501 and an HPD line 502 included in the HDMI cable 1 constitute a differential twisted pair. A source-side end 511 of the reserve line 501 is connected to the 14th pin of the HDMI terminal 11, and a sink-side end 521 of the reserve line 501 is connected to the 14th pin of the HDMI terminal 31. A source-side end 512 of the HPD line 502 is connected to the 19th pin of the HDMI terminal 11, and a sink-side end 522 of the HPD line 502 is connected to the 19th pin of the HDMI terminal 31.

In the personal computer 10, the connection point Q1 connecting the pull-up resistance 421 and the AC-coupling capacitance 413 is connected to the 14th pin of the HDMI terminal 11, and the connection point Q2 connecting the pull-down resistance 431 and the AC-coupling capacitance 414 is connected to the 19th pin of the HDMI terminal 11. On the other hand, in the television receiver 30, the connection point Q3 connecting the pull-down resistance 451 and the AC-coupling capacitance 443 is connected to the 14th pin of the HDMI terminal 31, and the connection point Q4 connecting the choke coil 461 and the AC-coupling capacitance 444 is connected to the 19th pin of the HDMI terminal 31.

Subsequently, an operation of the LAN communication by the high-speed data line interfaces 12A and 32A thus configured is described.

In the personal computer 10, the transmission signal (transmission data) SG411 is supplied to the input side of the LAN signal transmitting circuit 411, and differential signals (a positive-output signal and a negative-output signal) corresponding to the transmission signal SG411 are outputted from the LAN signal transmitting circuit 411. The differential signals outputted from the LAN signal transmitting circuit 411 are supplied to the connection points P1 and P2, and transmitted to the television receiver 30 through a pair of lines (the reserve line 501 and the HPD line 502) of the HDMI cable 1.

In the television receiver 30, the transmission signal (transmission data) SG417 is supplied to the input side of the LAN signal transmitting circuit 441, and differential signals (a positive-output signal and a negative-output signal) corresponding to the transmission signal SG417 are outputted from the LAN signal transmitting circuit 441. The differential signals outputted from the LAN signal transmitting circuit 441 are supplied to the connection points P3 and P4, and transmitted to the personal computer 10 through a pair of lines (the reserve line 501 and the HPD line 502) of the HDMI cable 1.

In the personal computer 10, the input side of the LAN signal receiving circuit 415 is connected to the connection points P1 and P2. Thus, as the output signal SG412 of the LAN signal receiving circuit 415, an added signal in which the transmission signal corresponding to the differential signal (a current signal) outputted from the LAN signal transmitting circuit 411 and the reception signal corresponding to the differential signal thus transmitted from the television receiver 30 are added is obtained. In the subtracting circuit 416, the transmission signal SG411 is subtracted from the output signal SG412 of the LAN signal receiving circuit 415. Thus, the output signal SG413 of the subtracting circuit 416 corresponds to the transmission signal (transmission data) SG417 of the television receiver 30.

In the television receiver 30, the input side of the LAN signal receiving circuit 445 is connected to the connection points P3 and P4. Thus, as the output signal SG418 of the LAN signal receiving circuit 445, an added signal in which the transmission signal corresponding to the differential signal (a current signal) outputted from the LAN signal transmitting circuit 441 and the reception signal corresponding to the differential signal thus transmitted from the personal computer 10 are added is obtained. In the subtracting circuit 446, the transmission signal SG417 is subtracted from the output signal SG418 of the LAN signal receiving circuit 445. Thus, the output signal SG419 of the subtracting circuit 446 corresponds to the transmission signal (transmission data) SG411 of the personal computer 10.

Thus, the two-way LAN communication can be performed between the high-speed data line interface 12A of the personal computer 10 and the high-speed data line interface 32A of the television receiver 30.

According to a configuration example shown in FIG. 8, in the interface for performing, by a single HDMI cable 1, a video-and-audio data transmission, an exchange and authentication of connection apparatus information, a communication of apparatus control data, and a LAN communication, the LAN communication is performed by a bi-directional communication via a pair of differential transmission paths and a connection state of the interface is notified by at least one DC bias potential of the transmission paths. Thus, a spatial separation in which the SCL line and the SDA line are not physically used for the LAN communication can be enabled. As a result, this separation can make it possible to form a circuit for the LAN communication irrespective of an electrical specification regulated regarding DDC, whereby a stabled and ensured LAN communication can be achieved at low cost.

In FIG. 8, the HPD line 502 notifies the personal computer 10 of a connection of the HDMI cable 1 to the television receiver 30 at a DC bias level, besides the above-described LAN communication. That is, when the HDMI cable is connected to the television receiver 30, the resistances 462 and 463 and the choke coil 461 within the television receiver 30 bias the HPD line 502 at about 4V via the 19th pin of the HDMI terminal 31. The personal computer 10 extracts the DC bias of the HPD line 502 by the low-pass filter composed of the resistance 432 and the capacitance 433, and causes the comparator 434 to compare the extracted DC bias with the reference voltage Vref2 (for example, 1.4 V).

If the HDMI cable 1 is not connected to the television receiver 30, voltage of the 19th pin of the HDMI terminal 11 is lower than the reference voltage Vref2 because of the existence of the pull-down resistance 431. In contrary, when the HDMI cable 1 is connected to the television receiver 30, the voltage of the 19th pin is higher than the reference voltage Vref2. Therefore, the output signal SG415 of the comparator 434 is at a high level when the HDMI cable 1 is connected to the television receiver 30, and otherwise, at a low level. Thus, based on the output signal SG415 of the comparator 434, the CPU 13 of the personal computer 10 can recognize whether the HDMI cable 1 is connected to the television receiver 30.

In FIG. 8, there are provided functions of mutually recognizing by the DC bias potential of the reserve line 501 whether apparatuses connected to both ends of the HDMI cable 1 are those capable of performing the LAN communication (hereinafter, called an "e-HDMI compatible apparatus") or those not capable of performing the LAN communication (hereinafter, called an "e-HDMI non-compatible apparatus").

As described above, the personal computer 10 pulls up (+5V) the reserve line 501 by the resistance 421, and the television receiver 30 pulls down the reserve line 501 by the resistance 451. The resistances 421 and 451 do not exist in the e-HDMI non-compatible apparatus.

The personal computer 10 compares, in the comparator 424, the DC potential of the reserve line 501, passing through the low-pass filter formed of the resistance 422 and the capacitance 423, with the reference voltage Vref1, as described above. When the television receiver 30 is the e-HDMI compatible apparatus and the pull-down resistance 451 exists, the voltage of the reserve line 501 becomes 2.5V. However, when the television receiver 30 is the e-HDMI non-compatible apparatus and the pull-down resistance 451 does not exist, the voltage of the reserve line 501 becomes 5V because of the existence of the pull-up resistance 421.

Thus, when the reference voltage Vref1 is rendered 3.75V, for example, the output signal SG414 of the comparator 424 is at a low level when the television receiver 30 is the e-HDMI compatible apparatus, and otherwise, at a high level. Consequently, the CPU 13 of the personal computer 10 recognizes whether the television receiver 30 is the e-HDMI compatible apparatus on the basis of the output signal SG414 of the comparator 424.

Similarly, the television receiver 30 compares, in the comparator 454, the DC potential of the reserve line 501, passing through the low-pass filter formed of the resistance 452 and the capacitance 453, with the reference voltage Vref3, as described above. When the personal computer 10 is the e-HDMI compatible apparatus and the pull-up resistance 421 exists, the voltage of the reserve line 501 becomes 2.5V. However, when the personal computer 10 is the e-HDMI non-compatible apparatus and the pull-up resistance 421 does not exist, the voltage of the reserve line 501 becomes 0V because of the existence of the pull-down resistance 451.

Thus, when the reference voltage Vref3 is rendered 1.25V, for example, the output signal SG416 of the comparator 454 is at a high level when the personal computer 10 is the e-HDMI compatible apparatus, and otherwise, at a low level. Consequently, the CPU 51 of the television receiver 30 recognizes whether the personal computer 10 is the e-HDMI compatible apparatus based on the output signal SG416 of the comparator 454.

Subsequently, an operation of the AV system 5 shown in FIG. 1 is described.

As described above, the personal computer 10 includes the drive 21 for driving a removable medium such as a magnetic disk, an optical disc, a magneto-optical disc, and a memory card. When reproducing the video signal, the CPU 13 of the personal computer 10 transmits the video signal reproduced from the recording medium in the drive 21 to the television receiver 30 through the TMDS channel of the HDMI, and causes an image by the video signal to be displayed on the display panel 42 of the television receiver 30.

In this case, on a display screen of the display panel 42, operation buttons such as start playback, stop playback, temporary stop, fast forward, rewind, and the like are displayed. The display of the operation buttons is performed by superimposing graphic data on the video data in the graphic generating circuit 40, for example. On the display screen, the touch panel 58 is placed, as described above.

A user may directly touch with a finger or touch with a pen the touch panel 58 to designate a position on the display screen. The position designation may also be performed by using the remote control transmitter 57. When the position designation is performed by the remote control transmitter 57, a cursor is displayed on the display screen and a remote control signal for moving the cursor is transmitted from the remote control transmitter 57. This allows the user to designate the position on the display screen.

Thus, coordinate information about the position designated by the touch panel 58 or the remote control transmitter 57 is supplied from the coordinate detecting unit 60 via the internal bus 50 to the CPU 51. The CPU 51 supplies the coordinate information to the high-speed data line interface 32A via the Ethernet interface 54. The high-speed data line interface 32A sends out the coordinate information from the HDMI terminal 31 to the HDMI cable 1, and transmits the coordinate information to the personal computer 10.

The high-speed data line interface 12A of the personal computer 10 receives the coordinate information transmitted via the HDMI cable 1 from the television receiver 30 and supplies the coordinate information to the CPU 13 via the Ethernet interface 22. The CPU 13 is able to know which position on the display screen the user designates on the basis of the coordinate information, and is able to recognize an operation by the user, such as start playback, stop playback, temporary stop, fast forward, rewind, and the like. The CPU 13 controls an operation of the drive 21 on the basis of the recognition result.

Thus, the user can designate the position on the display screen (display position of the operation buttons such as start playback, stop playback, temporary stop, fast forward, rewind, and the like) regarding the playback image displayed on the display panel 42 of the television receiver 30 to operate the playback operation.

When browsing a Web page, the CPU 13 of the personal computer 10 starts a Web browser and accesses a predetermined Web site selected by the user to display the Web page. In this case, based on HTML data, image data, etc., from the Web page, the CPU 13 generates a video signal for displaying the Web page.

Figure 9:
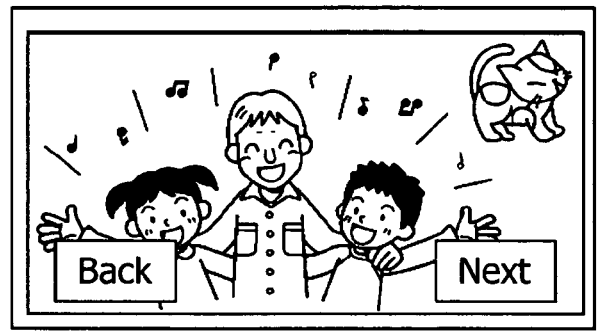
FIG. 9 is a diagram showing an example of a display screen (Web page) of the television receiver.

The CPU 13 of the personal computer 10 transmits the video signal to the television receiver 30 through the TMDS channel of HDMI, and displays the Web page by the video signal on the display panel 42 of the television receiver 30. FIG. 9 shows a display screen example of the Web page. On the display screen, an operation button (Back) to a previous page and an operation button (Next) to a subsequent page are displayed, as shown in the FIG. 9. The display of the operation buttons is performed by superimposing graphic data on the image data in the graphic generating circuit 40, for example.

The user operates the touch panel 58 or the remote control transmitter 57 to designate a position on the display screen. Thus, the coordinate information about the position designated by the touch panel 58 or the remote control transmitter 57 is supplied from the coordinate detecting unit 60 via the internal bus 50 to the CPU 51. The CPU 51 supplies the coordinate information to the high-speed data line interface 32A via the Ethernet interface 54. The high-speed data line interface 32A sends out the coordinate information from the HDMI terminal 31 to the HDMI cable 1, and transmits the coordinate information to the personal computer 10.

The high-speed data line interface 12A of the personal computer 10 receives the coordinate information transmitted via the HDMI cable 1 from the television receiver 30 and supplies the coordinate information to the CPU 13 via the Ethernet interface 22. The CPU 13 is able to know what position of the display screen the user designates on the basis of the coordinate information, and thus, is able to recognize an operation such as to the previous page and to the subsequent page by the user. The CPU 13 updates the Web page on the basis of the recognition result.

As described above, the user may designate the position (the Back button, the Next button of the display position) on the display screen regarding the Web page displayed on the display panel 42 of the television receiver 30 to operate updating the Web page.

Figure 10:
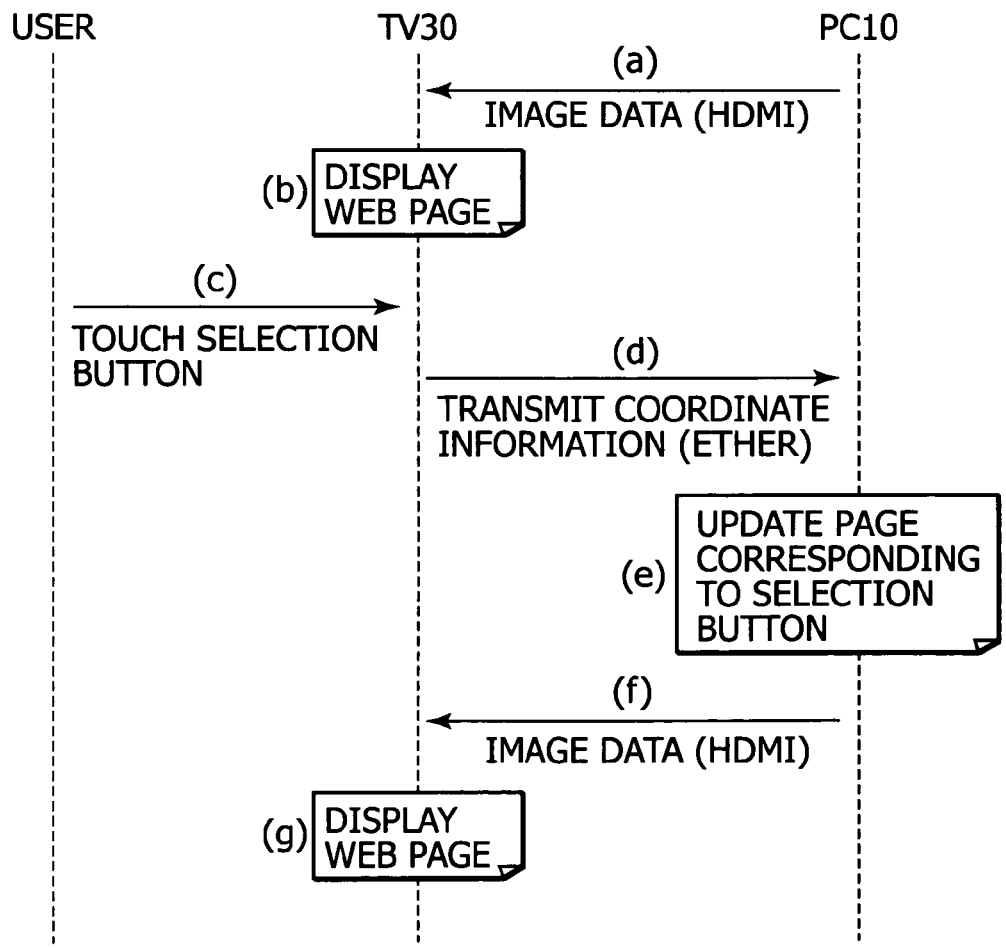
FIG. 10 is a chart showing one example of an operation sequence in which coordinate information about a screen position is sent from the television receiver to the personal computer.

FIG. 10 shows one example of an operation sequence in which the coordinate information about the screen position is sent from the television receiver 30 to the personal computer 10.

(a) The personal computer 10 uses the TMDS channel of HDMI to transmit to the television receiver 30 the image data for displaying a certain Web page. (b) The television receiver 30 displays the Web page on the basis of the image data transmitted from the personal computer 10. It is assumed that on the Web page, the Back button and the Next button are displayed (see FIG. 9).

(c) In this state, if the user touches any button position on the touch panel 58, (d) the television receiver 30 transmits to the personal computer 10 the coordinate information indicating the touch position by using the high-speed data line (Ether). (e) In response thereto, the personal computer 10 updates the Web page according to a content of the button selected by the user.

(f) The personal computer 10 transmits the image data for displaying the updated Web page to the television receiver 30 by using the TMDS channel of HDMI. (g) The television receiver 30 displays the Web page based on the image data transmitted from the personal computer 10. Hereinafter, at each time the user selects one of the Back button and the Next button displayed on the screen of the touch panel 58, etc., the personal computer 10 updates the displayed Web page to the previous page or the subsequent page.

In the user operation at the time of the video signal reproduction or the Web page display, the position of the display screen is designated by the touch panel 58 or the remote control transmitter 57. However, this operation may also be performed by depressing a certain button of the remote control transmitter 57.

In this case, the CPU 51 of the television receiver 30 supplies the remote control signal (remote control code)

received in the remote control receiving unit 56 to the high-speed data line interface 32A via the Ethernet interface 54. The high-speed data line interface 32A sends out the coordinate information from the HDMI terminal 31 to the HDMI cable 1, and transmits the coordinate information to the personal computer 10.

The high-speed data line interface 12A of the personal computer 10 receives the remote control signal transmitted via the HDMI cable 1 from the television receiver 30 and supplies the remote control signal to the CPU 13 via the Ethernet interface 22. For example, the ROM 14 holds a table 14a on which to indicate a corresponding relationship between each remote control signal (remote control code) and a control content, for each type of the video signal. Herein, the type of the video signal means types of a reproduced video signal, a video signal for displaying the Web page, a video signal transmitted via a network from another device, etc.

The CPU 13 of the personal computer 10 recognizes the control content indicated by the remote control signal thus transmitted from the television receiver 30 by using the table corresponding to the type of the video signal transmitted from the TMDS channel of HDMI to the television receiver 30. The CPU 13 performs control on the basis of the recognized control content.

When the video signal transmitted to the television receiver 30 is the reproduced video signal, the playback operation is controlled, for example. When the video signal transmitted to the television receiver 30 is the video signal for displaying the Web page, the updating operation, etc., of the Web page are controlled, for example.

Thus, the preparation of the table for each type of the video signal is allowed to perform, by a single remote control transmitter 57, the operation corresponding to types of a plurality of video signals. That is, a specific button of the remote control transmitter 57 can be shared for use of a plurality of operations.

In the personal computer 10, a different application is started for each type of the video signal. For example, when the video signal transmitted to the television receiver 30 is the reproduced video signal, a playback application is stared. For example, when the video signal transmitted to the television receiver 30 is the video signal for displaying the Web page, the Web browser is started. Therefore, in other words, "each type of the video signal" may be "each type of a started application".

Figure 11:
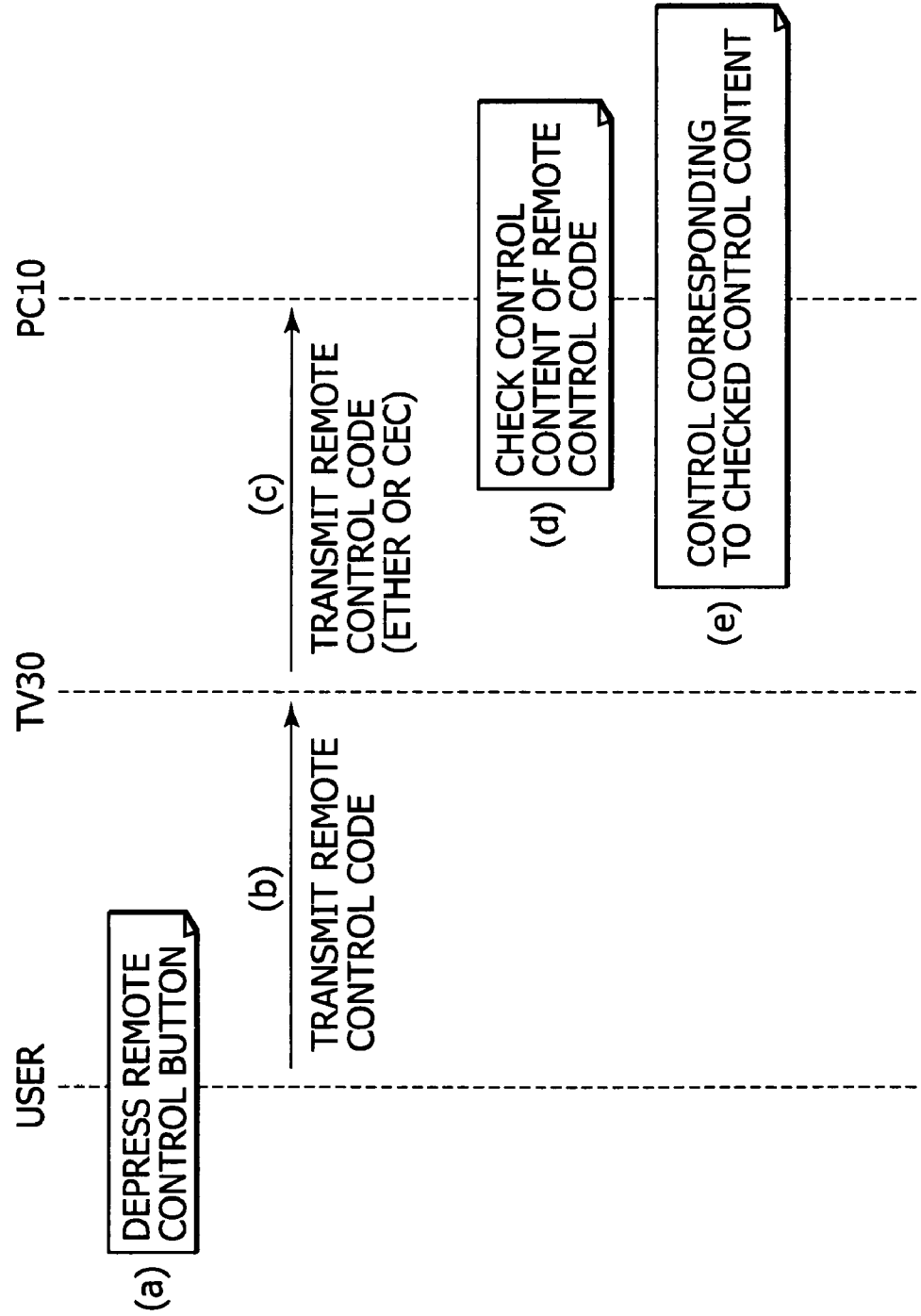
FIG. 11 is a chart showing one example of an operation sequence in which a remote control signal (remote control code) is sent from the television receiver to the personal computer.

FIG. 11 shows one example of an operation sequence in which the remote control signal is sent from the television receiver 30 to the personal computer 10.

(a) When the user depresses a predetermined button of the remote control transmitter 57, (b) a remote control code (remote control signal) is transmitted from the remote control transmitter 57 to the television receiver 30. In transmitting the remote control code from the remote control transmitter 57 to the television receiver 30, an infrared signal or a high-frequency signal, etc., are used.

(c) The television receiver 30 uses the high-speed data line (Ether) or the CEC line to transfer the remote control code received from the remote control transmitter 57 to the personal computer 10. (d) The personal computer 10 uses a table corresponding to the type of the video signal (the type of the started application) transmitted then from the personal computer 10 to the television receiver 30 to recognize the control content indicated by the remote control code received from the television receiver 30. In this case, when the video signal transmitted to the television receiver 30 is the reproduced video signal and the playback application is started, the control content indicated by the remote control code is one which relates to the playback operation, for example. When the video signal transmitted to the television receiver 30 is the video signal for displaying the Web page and when the Web browser is started, the control content indicated by the remote control code is one which relates to the updating operation, etc., of the Web page.

(e) Subsequently, the personal computer 10 controls an operation such as the playback operation and the updating operation of the Web page on the basis of the recognized control content.

At the time of the videoconference, the personal computer 10 transmits to the television receiver 30 captured image data on a side of another party, which is transmitted via the network 210 from the terminal device 220 by using the TMDS channel of HDMI, and displays the image of the other party generated by the video signal on the display panel 42.

At the time of the videoconference, the personal computer 10 transmits the video signal of an information material reproduced from the recording medium by the drive 21 or the video signal corresponding to a predetermined Web page as the reference material, to the television receiver 30 through the TMDS channel of HDMI. Then, the personal computer 10 causes the image by the video signal to be displayed on the display panel 42 of the television receiver 30; and sends this video signal to the terminal device 220 via the network 210, thereby allowing the image by the video signal to be displayed also on the other party.

In such a state, when a conference participant (presenter) designates, to give a participant's explanation, the predetermined position on the display screen of the television receiver 30 by touching and so on the touch panel 58, the coordinate information about the position is supplied from the coordinate detecting unit 60 to the CPU 51 via the internal bus 50. The CPU 51 supplies the coordinate information to the high-speed data line interface 32A via the Ethernet interface 54. The high-speed data line interface 32A sends out the coordinate information from the HDMI terminal 31 to the HDMI cable 1, and transmits the coordinate information to the personal computer 10.

The high-speed data line interface 12A of the personal computer 10 receives the coordinate information transmitted via the HDMI cable 1 from the television receiver 30 and supplies the coordinate information to the CPU 13 via the Ethernet interface 22. Based on the coordinate information, the CPU 13 combines a display signal for displaying a mark on the screen position indicated by the coordinate information, with the video signal that is to be transmitted to the terminal device 220 via the network 210 as described above.

Thus, the video signal in which the display signal for displaying the mark is combined is transmitted to the terminal device 220, so that, on a display screen of a terminal device 220 side, the mark is displayed on the position designated by the conference participant. Consequently, the position pointed by the presenter on the side of the other party's device can be easily known.

The personal computer 10 is able to request to the television receiver 30 the captured video signal of the camera 59. The personal computer 10 uses the high-speed data line or the CEC line to transmit to the television receiver 30 a request command of the imaged video signal. The CPU 51 of the television receiver 30 causes the camera 59 to start in response to the request command from the personal computer 10. The CPU 51 causes the imaged video signal outputted from the camera 59 to be supplied to the high-speed data line interface 32A via the Ethernet interface 54. The high-speed data line interface 32A sends out the imaged video signal from the HDMI terminal 31 to the HDMI cable 1, and transmits the captured video signal to the personal computer 10.

The high-speed data line interface 12A of the personal computer 10 receives the captured video signal transmitted via the HDMI cable 1 from the television receiver 30, and supplies the captured video signal to the CPU 13 via the Ethernet interface 22. The CPU 13 combines the captured video signal with the video signal (the reproduced video signal, the video signal for displaying the Web page, the video signal from the side of the other party's terminal in the teleconference, etc.) transmitted to the television receiver 30. Thus, a reproduced image in which the captured image is inserted, etc., is displayed on the display panel 42 of the television receiver 30.

At the time of the teleconference, the personal computer 10 transmits the captured video signal thus sent from the television receiver 30 to the terminal device 220 on the side of the other party via the network 210.

Figure 12:
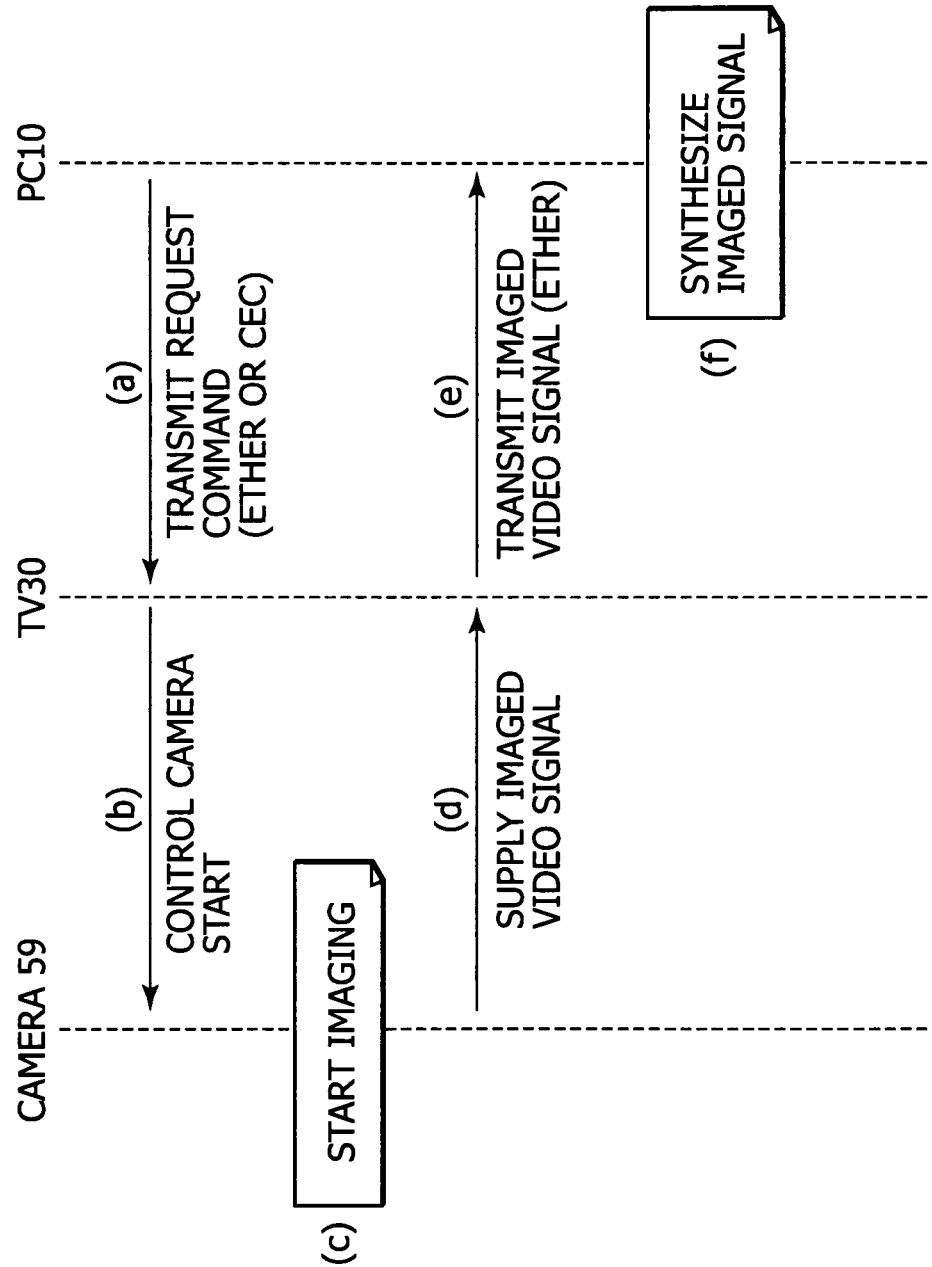
FIG. 12 is a chart showing one example of an operation sequence in which an imaged video signal is sent from the television receiver to the personal computer.

FIG. 12 shows one example of an operation sequence in which the captured video signal is sent from the television receiver 30 to the personal computer 10.

(a) The personal computer 10 uses the high-speed data line (Ether) or the CEC line to transmit the request command of the captured video signal to the television receiver 30. (b) The television receiver 30 controls to start the camera 59 upon receiving the request command of the captured video signal. (c) The camera 59 is started to begin capturing, and supplies the captured video signal to the television receiver 30.

(e) The television receiver 30 uses the high-speed data line to transmit to the personal computer 10 the captured video signal supplied from the camera 59. (f) The personal computer 10 combines the captured video signal received from the television receiver 30 with the reproduced video signal, etc., transmitted from the personal computer 10 to the television receiver 30. The combining process is performed for displaying on a child screen the image by the imaged video signal, for example.

As described above, in the AV system 5 shown in FIG. 1, the TMDS channel of the HDMI cable 1 is used to transmit the video signal from the personal computer 10 to the television receiver 30, and the high-speed data line by using a predetermined line of the HDMI cable 1 is used to transmit the coordinate information about the screen position, the remote control signal (remote control code), and the captured video signal from the television receiver 30 to the personal computer 10. Accordingly, the AV system 5 shown in FIG. 1 may be configured so that the personal computer 10 and the television receiver 30 are connected by a single HDMI cable 1. This eliminates a need for the personal computer 10 and the television receiver 30 to have another redundant terminal for connection. As a result, miniaturization and reduction in cost can be implemented.

In the AV system 5 shown in FIG. 1, the communicating unit for performing a bi-directional communication is configured to use the reserve line (Ether-line) and the HPD line (Ether+line) of the HDMI cable 1 (see FIG. 8). However, the configuration of the communicating unit for performing a bi-directional communication is not limited thereto. Hereinafter, another configuration example is described. In the following example, the personal computer 10 is the source device and the television receiver 30 is the sink device.

Figure 13:
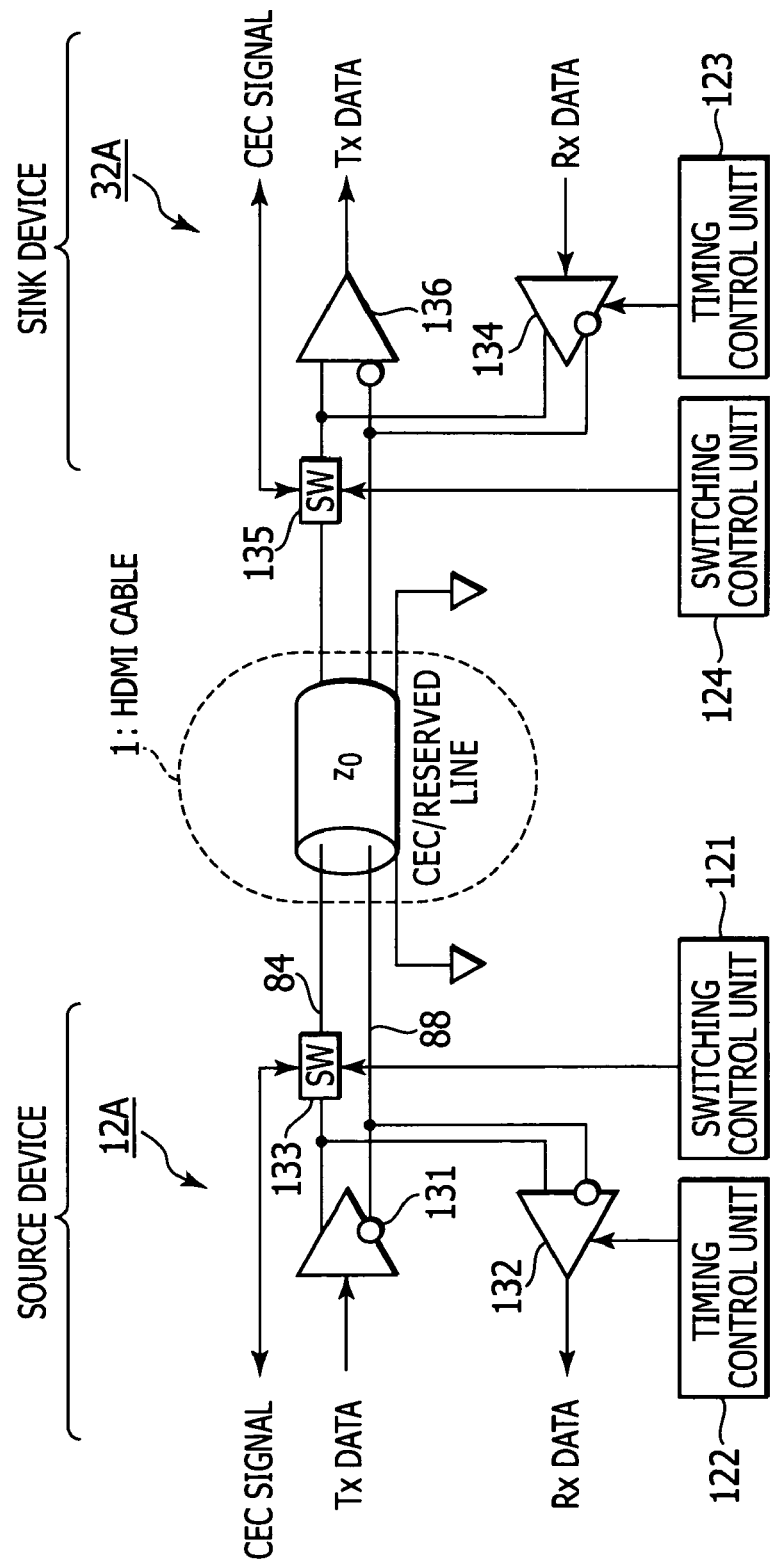
FIG. 13 is a connection diagram showing another configuration example of the high-speed data line interface between the personal computer and the television receiver.

FIG. 13 shows an example in which the CEC line 84 and the reserve line 88 are used to perform an IP communication according to a half duplex mode. Portions in FIG. 13 corresponding to those in FIG. 4 are designated by the same numerals, and the description is omitted, as needed.

The high-speed data line interface 12A in the source device includes: a converting unit 131; a decoding unit 132; a switch 133; a switching control unit 121; and a timing control unit 122. The converting unit 131 is supplied with Tx data, i.e., data transmitted from the source device to the sink device, by a two-way IP communication between the source device and the sink device.

The converting unit 131 is configured by a differential amplifier, for example, and converts the supplied Tx data into a differential signal formed of two partial signals. The converting unit 131 transmits the differential signal obtained by the conversion to the sink device via the CEC line 84 and the reserve line 88. That is, the converting unit 131 supplies one partial signal constituting the differential signal obtained by the conversion to the switch 133 via the CEC line 84, more specifically, a signal line provided in the source device, the signal line being connected to the CEC line 84 of the HDMI cable 1, and supplies the other partial signal constituting the differential signal to the sink device via the reserve line 88, more specifically, a signal line provided in the source device, the signal line being connected to the reserve line 88 of the HDMI cable 1, and the reserve line 88.

The decoding unit 132 is configured by a differential amplifier, for example. Input terminals of the decoding unit 132 are connected to the CEC line 84 and the reserve line 88. Based on control of the timing control unit 122, the decoding unit 132 receives the differential signal transmitted from the sink device via the CEC line 84 and the reserve line 88, i.e., the differential signal composed of the partial signal on the CEC line 84 and the partial signal on the reserve line 88, decodes the received differential signal into Rx data which is the original data, and outputs the resultant data. Herein, the Rx data is data transmitted from the sink device to the source device by the two-way IP communication between the source device and the sink device.

At a timing of data transmission, the switch 133 is supplied with a CEC signal from the control unit (CPU) of the source device or the partial signal constituting the differential signal corresponding to the TX data from the converting unit 131. At a timing of data reception, the switch 133 is supplied with a CEC signal from the sink device or the partial signal constituting the differential signal corresponding to the Rx data from the sink device. Based on control from the switching control unit 121, the switch 133 selects: the CEC signal from the control unit (CPU) or the CEC signal from the sink device, or the partial signal constituting the differential signal corresponding to the Tx data or the partial signal constituting the differential signal corresponding to the Rx data, and outputs the selected signal.

That is, at a timing of transmitting, by the source device, the data to the sink device, the switch 133 selects either the CEC signal supplied from the control unit (CPU) or the partial signal supplied from the converting unit 131. The switch 133 transmits the selected CEC signal or the partial signal to the sink device via the CEC line 84.

At a timing of receiving, by the source device, the data transmitted from the sink device, the switch 133 receives the CEC signal transmitted from the sink device via the CEC line 84 or the partial signal of the differential signal corresponding to the Rx data, and supplies the received CEC signal or partial signal to the control unit (CPU) or the decoding unit 132.

The switching control unit 121 controls the switch 133 so that any of the signals supplied to the switch 133 is selected. The timing control unit 122 controls a receiving timing of the differential signal by the decoding unit 132.

The high-speed data line interface 32A in the sink device includes: a converting unit 134; a decoding unit 136; a switch 135; a switching control unit 124; and a timing control unit 123. The converting unit 134 is configured by a differential amplifier, for example, and the converting unit 134 is supplied with the Rx data. Based on control of the timing control unit 123, the converting unit 134 converts the supplied Rx data into a differential signal formed of two partial signals, and transmits the differential signal obtained by the conversion to the source device via the CEC line 84 and the reserve line 88.

That is, the converting unit 134 supplies one partial signal constituting the differential signal obtained by the conversion to the switch 135 via the CEC line 84, more specifically, a signal line arranged in the sink device, the signal line being connected to the CEC line 84 of the HDMI cable 1, and supplies the other partial signal constituting the differential signal to the source device via the reserve line 88, more specifically, a signal line provided in the sink device, the signal line being connected to the reserve line 88 of the HDMI cable 1, and the reserve line 88.

At a timing of data reception, the switch 135 is supplied with a CEC signal from the source device or the partial signal constituting the differential signal corresponding to the TX data from the source device. At a timing of data transmission, the switch 134 is supplied with the partial signal constituting the differential signal corresponding to the Rx data from the converting unit 134 or a CEC signal from the control unit (CPU) of the sink device. Based on control from the switching control unit 124, the switch 135 selects: the CEC signal from the source device or the CEC signal from the control unit (CPU), or the partial signal constituting the differential signal corresponding to the Tx data or the partial signal constituting the differential signal corresponding to the Rx data, and outputs the selected signal.

That is, at a timing of transmitting, by the sink device, the data to the source device, the switch 135 selects either the CEC signal supplied from the control unit (CPU) of the sink device or the partial signal supplied from the converting unit 134, and transmits the selected CEC signal or the partial signal to the source device via the CEC line 84.

At a timing of receiving, by the sink device, the data transmitted from the source device, the switch 135 receives the CEC signal transmitted from the source device via the CEC line 84 or the partial signal of the differential signal corresponding to the Tx data, and supplies the received CEC signal or partial signal to the control unit (CPU) or the decoding unit 136.

The decoding unit 136 is configured by a differential amplifier, for example, and input terminals of the decoding unit 136 are connected to the CEC line 84 and the reserve line 88. The decoding unit 136 receives the differential signal transmitted from the source device via the CEC line 84 and the reserve line 88, i.e., the differential signal formed of the partial signal on the CEC line 84 and the partial signal on the reserve line 88, decodes the received differential signal into the Tx data which is the original data, and outputs the resultant data.

The switching control unit 124 controls the switch 135 so that any of the signals supplied to the switch 135 is selected. The timing control unit 123 controls a transmitting timing of the differential signal by the converting unit 134.

Figure 14:
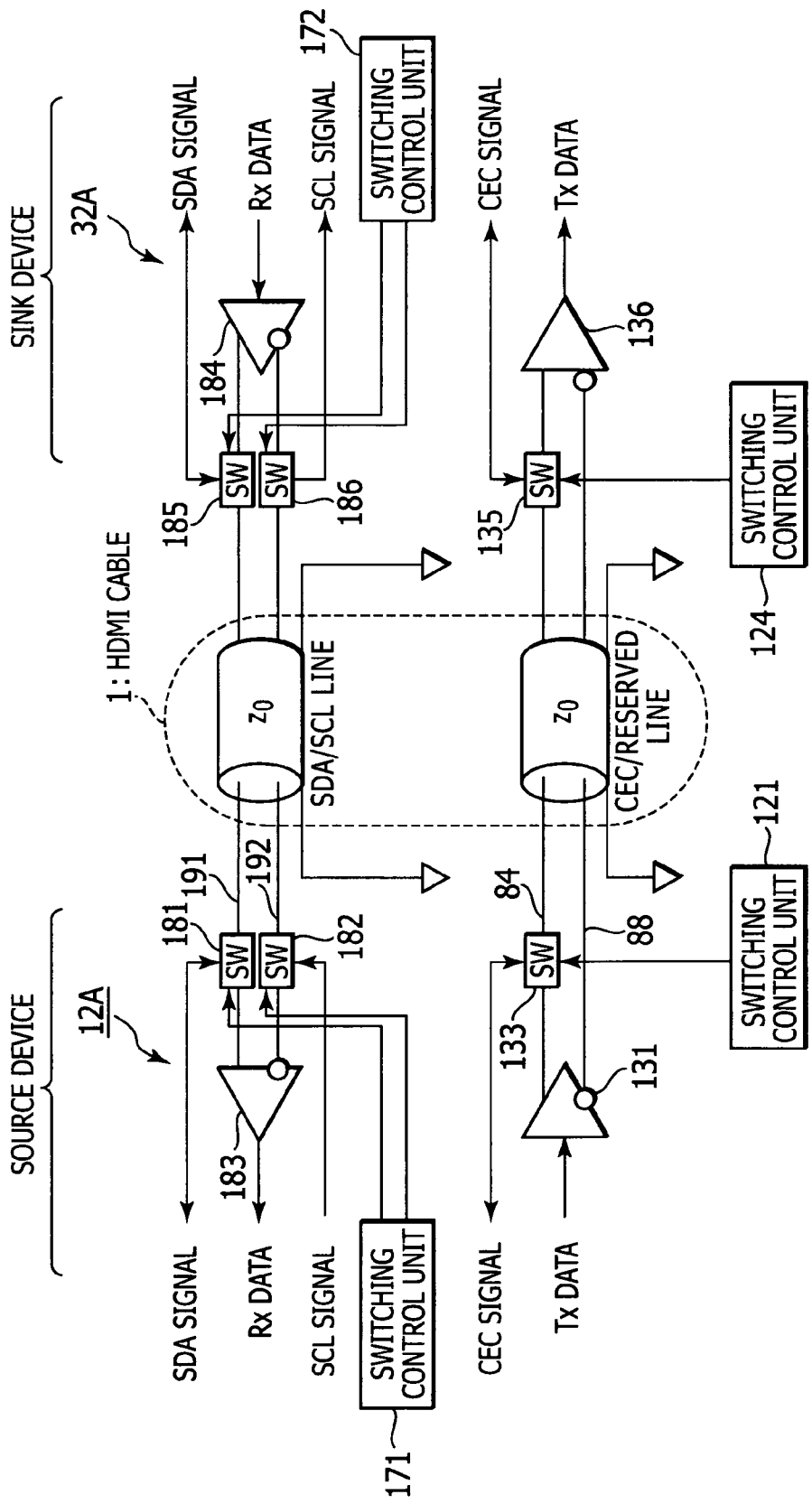
FIG. 14 is a connection diagram showing still another configuration example of the high-speed data line interface between the personal computer and the television receiver.

FIG. 14 is an example in which the CEC line 84 and the reserve line 88, together with a signal line through which an SDA signal is transmitted (SDA line) and a signal line through which an SCL signal is transmitted (SCL line), are used to perform an IP communication according to a full duplex mode. Portions in FIG. 14 corresponding to those in FIG. 13 are designated by the same numerals, and the description is omitted, as needed.

The high-speed data line interface 12A of the source device includes: the converting unit 131; the switch 133; a switch 181; a switch 182; a decoding unit 183; the switching control unit 121; and a switching control unit 171.

At a timing of data transmission, the switch 181 is supplied with the SDA signal from the control unit (CPU) of the source device. At a timing of data reception, the switch 181 is supplied with the SDA signal from the sink device or the partial signal constituting the differential signal corresponding to the Rx data from the sink device. Based on control from the switching control unit 171, the switch 181 selects the SDA signal from the control unit (CPU) or the SDA signal from the sink device, or the partial signal constituting the differential signal corresponding to the Rx data, and outputs the selected signal.

That is, at a timing of receiving, by the source device, the data transmitted from the sink device, the switch 181 selects the SDA signal transmitted from the sink device via the SDA line 191 which is the signal line through which the SDA signal is transmitted, or the partial signal of the differential signal corresponding to the Rx data, and supplies the received SDA signal or partial signal to the control unit (CPU) or the decoding unit 183.

At a timing of transmitting, by the source device, the data to the sink device, the switch 181 transmits the SDA signal supplied from the control unit (CPU) to the sink device via the SDA line 191 or transmits no signal to the sink device.

At a timing of transmitting data, the switch 182 is supplied with the SCL signal from the control unit (CPU) of the source device. At a timing of receiving data, the switch 182 is supplied with the partial signal constituting the differential signal corresponding to the Rx data from the sink device. Based on control from the switching control unit 171, the switch 182 selects any of the SCL signal and the partial signal constituting the differential signal corresponding to the Rx data, and outputs the selected signal.

That is, at a timing of receiving, by the source device, the data transmitted from the sink device, the switch 182 receives the partial signal of the differential signal transmitted from sink device via the SCL line 192 for transmitting SCL signal, to supply the received partial signal to the decoding unit 183, wherein the differential signal corresponds to the Rx data. Alternatively, the switch 182 receives no signal.

At a timing of transmitting, by the source device, the data to the sink device, the switch 182 transmits the SCL signal supplied from the control unit (CPU) of the source device to the sink device via the SCL line 192, or transmits no signal to the sink device.

The decoding unit 183 is configured by a differential amplifier, for example, and input terminals of the decoding unit 183 are connected to the SDA line 191 and the SCL line 192. The decoding unit 183 receives the differential signal transmitted from the sink device via the SDA line 191 and the SCL line 192, i.e., the differential signal composed of the partial signal on the SDA line 191 and the partial signal on the SCL line 192, decodes the received differential signal into Rx data which is the original data, and outputs the resultant data.

The switching control unit 171 controls the switch 181 and the switch 182 to switch the switches 181 and 182 so that any of the supplied signals is selected for each of the switch 181 and the switch 182.

The high-speed data line interface 32A constituting the sink device includes: a converting unit 184; the switch 135; a switch 185; a switch 186; the decoding unit 136; a switching control unit 172; and the switching control unit 124.

The converting unit 184 is configured by a differential amplifier, for example, and the converting unit 184 is supplied with the Rx data. The converting unit 184 converts the supplied Rx data into a differential signal composed of two partial signals, and transmits the differential signal obtained by the conversion to the source device via the SDA line 191 and the SCL line 192. That is, the converting unit 184 transmits one partial signal constituting the differential signal obtained by the conversion to the source device via the switch 185, and transmits the other partial signal constituting the differential signal to the source device via the switch 186.

At a timing of data transmission, the switch 185 is supplied with the partial signal constituting the differential signal corresponding to Rx data from the converting unit 184 or the SDA signal from the control unit (CPU) of the sink device. At a timing of data reception, the switch 185 is supplied with the SDA signal from the source device. Based on control from the switching control unit 172, the switch 185 selects the SDA signal from the control unit (CPU) or the SDA signal from the source device, or the partial signal constituting the differential signal corresponding to the Rx data, and outputs the selected signal.

That is, at a timing of receiving, by the sink device, the data transmitted from the source device, the switch 185 receives the SDA signal transmitted from the source device via the SDA line 191, and supplies the received SDA signal to the control unit (CPU). Alternatively, the switch 185 receives no signal.

At a timing of transmitting, by the sink device, the data to the source device, the switch 185 transmits the SDA signal supplied from the control unit (CPU) or the partial signal supplied from the converting unit 184 to the source device via the SDA line 191.

At a timing of data transmission, the switch 186 is supplied with the partial signal constituting the differential signal which is from the converting unit 184 and which corresponds to the Rx data. At a timing of data reception, the switch 186 is supplied with the SCL signal from the source device. Based on control from the switching control unit 172, the switch 186 selects the partial signal constituting the differential signal corresponding to Rx data or the SCL signal, and outputs the selected signal.

That is, at a timing of receiving, by the sink device, the data transmitted from the source device, the switch 186 receives the SCL signal transmitted from the source device via the SCL line 192, and supplies the received SCL signal to the control unit (CPU). Alternatively, the switch 182 receives no signal.

At a timing of transmitting, by the sink device, the data to the source device, the switch 186 transmits the partial signal supplied from the converting unit 184 to the source device via the SCL line 192. Alternatively, the switch 186 transmits no signal.

The switching control unit 172 controls the switch 185 and the switch 186 to switch any of the supplied signals is selected for each of the switch 185 and the switch 186.

When the source device and the sink device perform the IP communication, whether the half-duplex communication is possible or whether the full-duplex communication is possible is determined by the respective configurations of the source device and the sink device. Therefore, the source device refers to the E-EDID received from the sink device to determine whether to perform one of the half-duplex communication, the full-duplex communication, and the bi-directional communication by exchanging the CEC signal.

Figure 15:
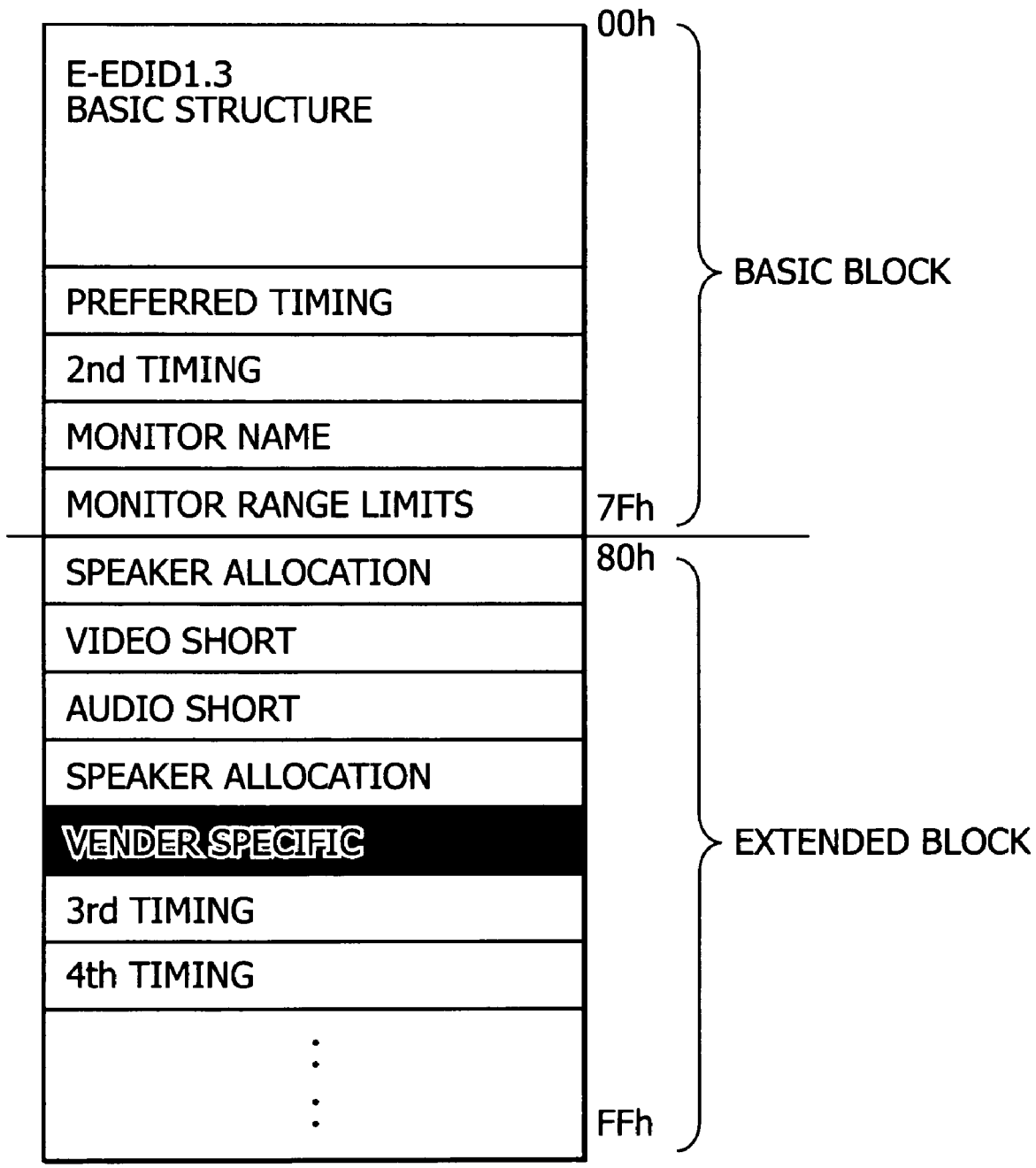
FIG. 15 is a diagram showing a structure of E-EDID received by the source device.

The E-EDID received by the source device is formed of a basic block and an extended block, as shown in FIG. 15, for example.

At a head of the basic block of the E-EDID, data which is represented by "E-EDID 1.3 Basic Structure" and which is defined by an E-EDID 1.3 standard is placed. This is followed by: timing information, represented by "Preferred timing", for maintaining compatibility with an existing EDID; and timing information represented by "2nd timing" (different from "Preferred timing" for maintaining compatibility with the existing EDID) are placed.

In the basic block, following "2nd timing", information that is represented by "Monitor NAME" and indicates a name of the display device, and information, represented by "Monitor Range Limits", indicating a displayable pixel number about a case that aspect ratios are 4:3 and 16:9 are placed in this order.

On the other hand, at a head of the extended block, information, represented by "Speaker Allocation", about right and left speakers is placed. Thereafter, data, represented by "VIDEO SHORT", in which information indicating a displayable image size, a frame rate, whether interlace or progressive, an aspect ratio, etc., are written; data, represented by "AUDIO SHORT", in which information about a reproducible audio codec system, a sampling frequency, a cut-off bandwidth, a codec bit number, etc., is written; and information, represented by "Speaker Allocation" about right and left speakers are placed in order.

In the extended block, following "Speaker Allocation", data, represented by "Vender Specific", defined uniquely for each manufacturer; timing information, represented by "3rd timing", for keeping compatibility with a conventional EDID; and timing information, represented by "4th timing", for keeping compatibility with a conventional EDID are placed.

The data represented by "Vender Specific" has a data structure shown in FIG. 16. That is, in the data represented by "Vender Specific", a 0-th block to an N-th block, each of which is a 1-byte block, are provided.

In the 0-th block placed at a head of the data represented by "Vender Specific", a header, represented by "Vender-Specific tag code (=3), indicating a data region of the data "Vender Specific", and information, represented by "Length (=N), indicating a length of the data "Vender Specific" are placed.

In the first block to the third block, information, represented by "24-bit IEEE Registration Identifier (0x000C03) LSB first", indicating a number "0x000C03" registered for HDMI (R) is placed. In the fourth block and the fifth block, information, each of which is represented by "A", "B", "C", and "D", indicating physical addresses of a 24-bit sink device are placed.

In the sixth block, a flag, represented by "Supports-AI", indicating a function with which the sink device is compatible; pieces of information, each of which is represented by "DC-48 bit", "DC-36 bit", and "DC-30 bit", designating a bit number per each pixel; a flag, represented by "DC-Y444", indicating whether the sink device is compatible with a transmission of an image of YCbCr 4:4:4; and a flag, represented by "DVI-Dual", indicating whether the sink device is compatible with a dual DVI (Digital Visual Interface) are placed.

In the seventh block, information, represented by "Max-TMDS-Clock", indicating a maximum frequency of the pixel clock of TMDS is placed. In the eighth block, a flag, represented by "Latency", indicating presence of delay information on the video and the audio; a full duplex flag, represented by "Full Duplex" indicating whether the full-duplex communication is possible; and a half duplex flag, represented by "Half Duplex", indicating whether the half-duplex communication is possible are placed.

Herein, the set full duplex flag (for example, which is set to "1") indicates that the sink device has a function for performing the full-duplex communication, i.e., the sink device is configured as shown in FIG. 14, and the reset full duplex flag (for example, which is set to "0") indicates that the sink device does not have a function for performing the full-duplex communication.

Similarly, the set half duplex flag (for example, which is set to "1") indicates that the sink device has a function for performing the half-duplex communication, i.e., the sink device is configured as shown in FIG. 13, and the reset half duplex flag (for example, which is set to "0") indicates that the sink device does not have a function for performing the half-duplex communication.

In the ninth block of the data represented by "Vender Specific", delay time data of a progressive video, represented by "Video Latency", is placed. In the tenth block, delay time data of the audio accompanying the progressive video, represented by "Audio Latency", is placed. In the 11th block, delay time data of the interlaced video, represented by "Interlaced Video Latency", is placed. In the 12th block, delay time data of the audio accompanying the interlaced video, represented by "Interlaced Audio Latency" is placed.

The source device determines whether to perform one of the half-duplex communication, the full-duplex communication, and the bi-directional communication by the reception/transmission of the CEC signals, on the basis of the full duplex flag and the half duplex flag included in the E-EDID received from the sink device, and according to the determination result, the source device performs the two-way communication with the sink device.

For example, when the source device is configured as shown in FIG. 13, the source device is able to perform the half-duplex communication with the sink device shown in FIG. 13 but is not able to perform the half-duplex communication with the sink device shown in FIG. 14. Therefore, the source device starts a communication process when a power supply of the source device is turned on, and performs the two-way communication corresponding to the function provided in the sink device connected to the source device.

Figure 17:
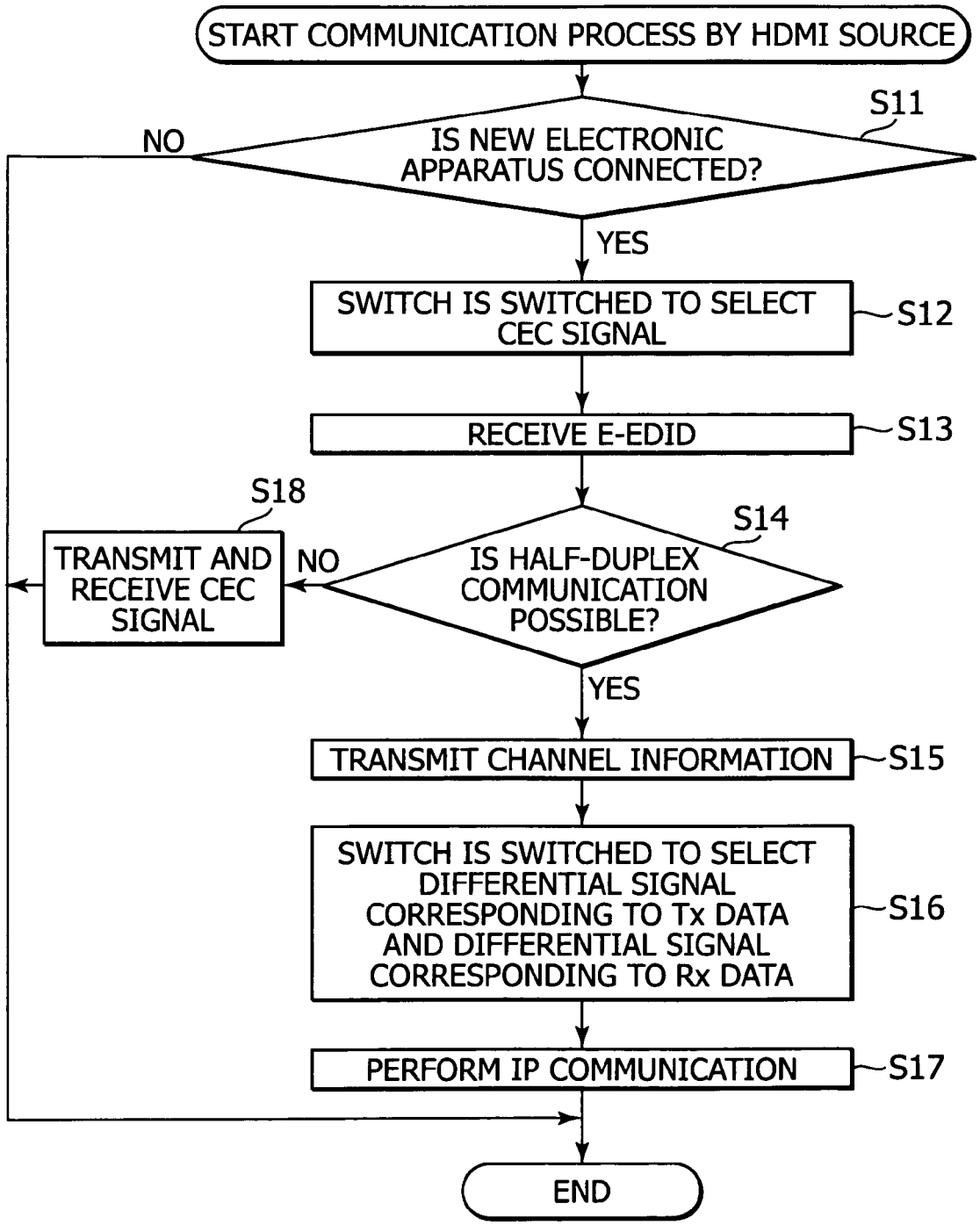
FIG. 17 is a flowchart for describing a communication process by the source device.

Hereinafter, with reference to a flowchart in FIG. 17, the communication process by the source device shown in FIG. 13 is described.

In step S11, the source device determines whether a new electronic apparatus is connected to the source device. For example, on the basis of a magnitude of voltage added to a pin called a "Hot Plug Detect" connected with the HPD line 86, the source device determines whether the new electronic apparatus (sink device) is connected.

In the step S11, if it is determined that the new electronic apparatus is not connected, no communication is performed, and thus, the communication process is ended. On the other hand, when it is determined, in the step S11, that the new electronic apparatus is connected, the switching control unit 121 controls the switch 133, in step S12, to switch the switch 133 so that the CEC signal from the control unit (CPU) of the source device is selected in the data transmission and the CEC signal from the sink device is selected in the data reception.

In step S13, the source device receives the E-EDID transmitted from the sink device via the DDC 83. That is, upon detection of the connection of the source device, the sink device reads out the E-EDID from EDIDROM 85 and transmits the read E-EDID to the source device via the DDC 83, and thus, the source device receives the E-EDID transmitted from the sink device.

In step S14, the source device determines whether the half-duplex communication is possible with the sink device. That is, the source device refers to the E-EDID received from the sink device to determine whether the half duplex flag "Half Duplex" in FIG. 16 is set. When the half duplex flag is set, for example, the source device determines that the two-way IP communication according to the half duplex mode, i.e., the half-duplex communication, is possible.

When it is determined, in the step S14, that the half-duplex communication is possible, the source device transmits, in step S15, as channel information indicating a channel used for the two-way communication, a signal indicating that the IP communication according to the half duplex mode using the CEC line 84 and the reserve line 88 is performed, to the sink device via the switch 133 and the CEC line 84.

That is, when the half duplex flag is set, the source device is able to recognize that the sink device is configured as shown in FIG. 13 and the half-duplex communication using the CEC line 84 and the reserve line 88 is possible, and thus, the source device transmits the channel information to the sink device to notify that the half-duplex communication is performed.

In step S16, the switching control unit 121 controls the switch 133 so that the differential signal corresponding to the Tx data from the converting unit 131 is selected at a data transmission and the differential signal corresponding to the Rx data from the sink device is selected at a data reception.

In step S17, each component of the source device performs the two-way IP communication with the sink device according to the half duplex mode, and thus, the communication process is ended. That is, in the data transmission, the converting unit 131 converts the Tx data supplied from the control unit (CPU) into the differential signal, supplies the switch 133 with one partial signal constituting the differential signal obtained by the conversion, and transmits the other partial signal to the sink device via the reserve line 88. The switch 133 transmits the partial signal supplied from the converting unit 133 to the sink device via the CEC line 84. Thus, the differential signal corresponding to the Tx data is transmitted from the source device to the sink device.

In a data reception, the decoding unit 132 receives the differential signal corresponding to the Rx data transmitted from the sink device. That is, the switch 133 receives the partial signal of the differential signal which is transmitted from the sink device via the CEC line 84 and which corresponds to the Rx data, and supplies the received partial signal to the decoding unit 132. The decoding unit 132 decodes, on the basis of the control of the timing control unit 122, the differential signal formed of the partial signal supplied from the switch 133 and the partial signal supplied from the sink device via the reserve line 88 into the RX data which is the original data, and outputs the Rx data to the control unit (CPU).

Thus, the source device transmits/receives various data such as the control data, the pixel data, and the audio data to/from the sink device.

In the step S14, if it is determined that the half-duplex communication is not possible, the source device transmits and receives the CEC signal in step S18 to perform the two-way communication with the sink device, and then, the communication process is ended.

That is, in a data transmission, the source device transmits the CEC signal to the sink device via the switch 133 and the CEC line 84. In a data reception, the source device receives the CEC signal transmitted from the sink device via the switch 133 and the CEC line 84 to transmit/receive the control data to/from the sink device.

In this way, the source device refers to the half duplex flag to perform the half-duplex communication by using the CEC line 84 and the reserve line 88, with the sink device capable of performing the half-duplex communication.

Thus, the switch 133 is switched to select the transmitted data and the received data, and thereby performing the half-duplex communication by using the CEC line 84 and the reserve line 88, i.e., the IP communication according to the half duplex mode, with the sink device. In this way, a high-speed bi-directional communication can be performed while maintaining compatibility with the existing HDMI.

Similar to the source device, when the power supply is turned on, the sink device also starts the communication process to perform the two-way communication with the source device.

Figure 18:
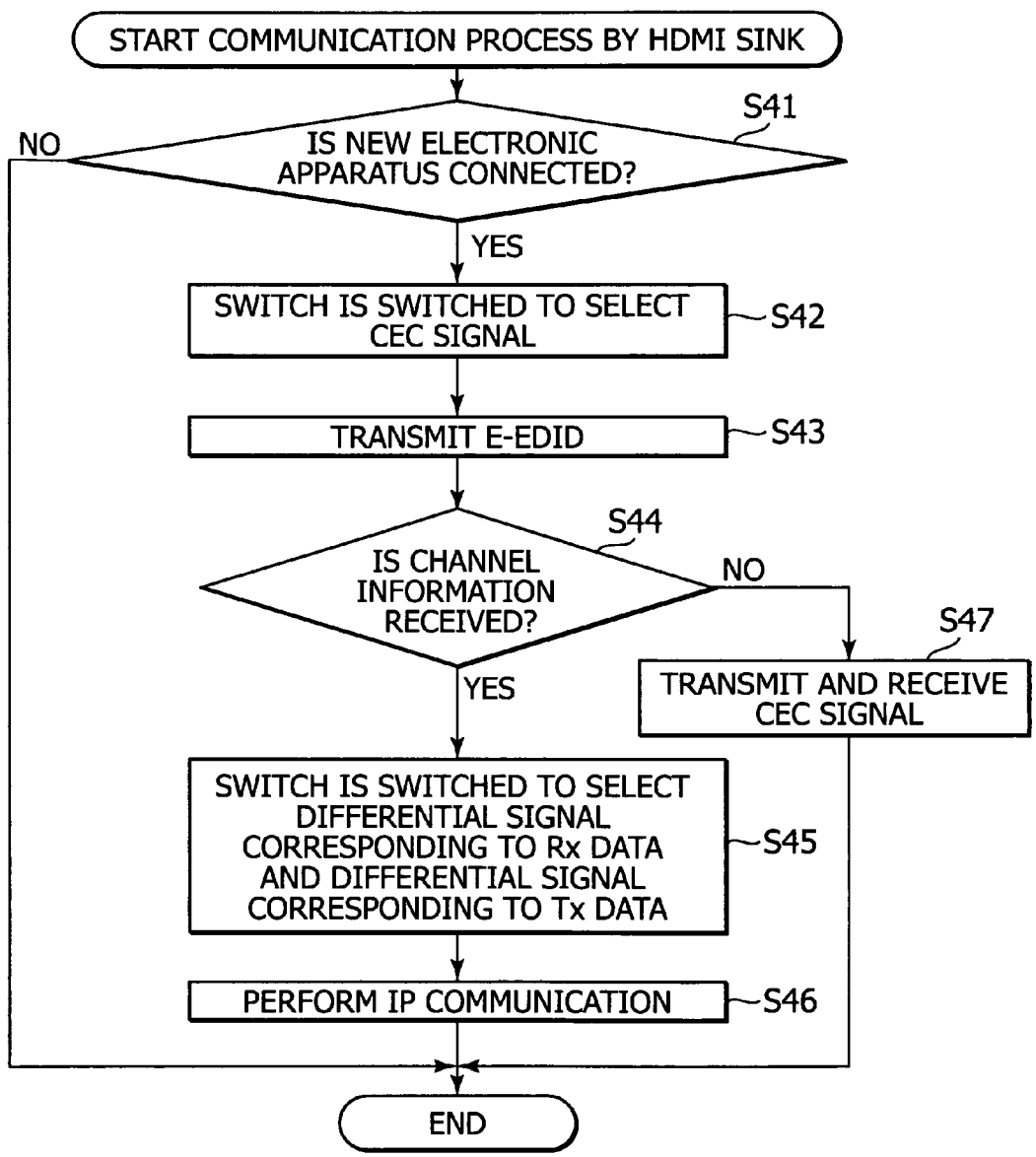
FIG. 18 is a flowchart for describing a communication process by the sink device.

Hereinafter, with reference to a flowchart in FIG. 18, the communication process by the sink device shown in FIG. 13 is described.

In step S41, the sink device determines whether the sink device is connected with a new electronic apparatus (source device). For example, the sink device determines whether the new electronic apparatus is connected on the basis of a magnitude of voltage added to a pin called a Hot Plug Detect connected with the HPD line 86.

In the step S41, if it is determined that the new electronic apparatus is not connected, no communication is performed, and thus, the communication process is ended. On the other hand, when it is determined, in the step S41, that the new electronic apparatus is connected, the switching control unit 124 controls the switch 135, in step S42, to switch so that at a data transmission, the CEC signal from the control unit (CPU) of the sink device is selected, and at a data reception, the CEC signal from the source device is selected.

In step S43, the sink device reads out the E-EDID from the EDIDROM 85, and transmits the read E-EDID to the source device via the DDC 83.

In step S44, the sink device determines whether the channel information transmitted from the source device is received.

That is, the channel information indicating a channel of the two-way communication is transmitted from the source device, according to a function provided in the source device and the sink device. For example, when the source device is configured as shown in FIG. 13, the source device and the sink device are capable of performing the half-duplex communication by using the CEC line 84 and the reserve line 88. As a result, the channel information indicating that IP communication using the CEC line 84 and the reserve line 88 is performed is transmitted from the source device to the sink device. The sink device receives the channel information transmitted from the source device via the switch 135 and the CEC line 84, and determines that the channel information has been received.

On the other hand, when the source device does not have a function for performing the half-duplex communication, the channel information is not transmitted from the source device to the sink device, and thus, the sink device determines that the channel information has not been received.

In the step S44, if it is determined that the channel information is received, the process proceeds to step S45. That is, the switching control unit 124 controls the switch 135 so that, at the data transmission, the differential signal corresponding to the Rx data from the converting unit 134 is selected, and, at the data reception, the differential signal corresponding to the Tx data from the source device is selected.

In step S46, the sink device performs the two-way IP communication with the source device according to the half duplex mode, and the communication process is ended. That is, at the data transmission, the converting unit 134 converts the Rx data supplied from the control unit (CPU) of the sink device into the differential signal, on the basis of the control of the timing control unit 123, supplies one partial signal constituting the differential signal obtained by the conversion to the switch 135, and transmits the other partial signal to the source device via the reserve line 88. The switch 135 transmits the partial signal supplied from the converting unit 134 to the source device via the CEC line 84. Thus, the differential signal corresponding to the Rx data is transmitted from the sink device to the source device.

At the data reception, the decoding unit 136 receives the differential signal corresponding to Tx data transmitted from the source device. That is, the switch 135 receives the partial signal of the differential signal which is transmitted from the source device via the CEC line 84 and which corresponds to the Tx data, and supplies the received partial signal to the decoding unit 136. The decoding unit 136 decodes the differential signal composed of the partial signal supplied from the switch 135 and the partial signal supplied from the source device via the reserve line 88, into the TX data which is the original data, and outputs the Tx data to the control unit (CPU).

Thus, the sink device transmits/receives various data such as the control data, the pixel data, and the audio data to/from the source device.

In the step S44, if it is determined that the channel information is not received, the sink device transmits and receives the CEC signal to perform the two-way communication with the source device in step S47, and the communication process is ended.

That is, at the data transmission, the sink device transmits the CEC signal to the source device via the switch 135 and the CEC line 84. At the data reception, the sink device receives the CEC signal transmitted from the source device via the switch 135 and the CEC line 84 to transmit/receive the control data to/from the source device.

In this way, upon receiving the channel information, the sink device performs the half-duplex communication with the sink device by using the CEC line 84 and the reserve line 88.

Thus, when the sink device switches the switch 135 to select the transmitted data and the received data, and thereby performing the half-duplex communication using the CEC line 84 and the reserve line 88, with the source device. As a result, a high-speed bi-directional communication can be performed while maintaining compatibility with the existing HDMI.

If the source device is configured as shown in FIG. 14, the source device determines, in the communication process, whether the sink device has the function for performing the full-duplex communication on the basis of the full duplex flag included in the E-EDID, and performs a two-way communication corresponding to the determination result.

Figure 19:
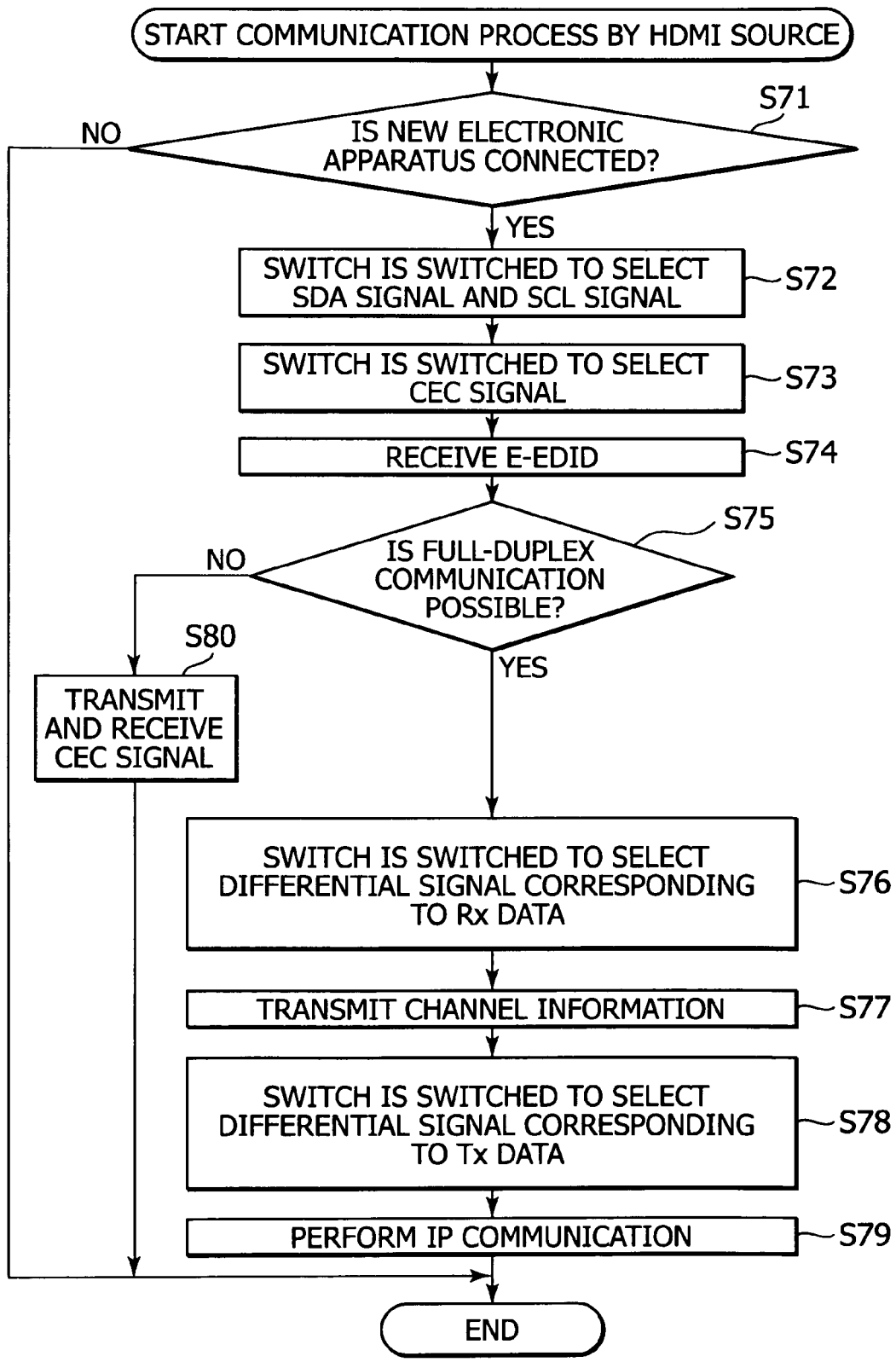
FIG. 19 is a flowchart for describing a communication process by the source device.

Hereinafter, with reference to a flowchart in FIG. 19, the communication process by the source device shown in FIG. 14 is described.

In step S71, the source device determines whether a new electronic apparatus is connected to the source device. In the step S71, if it is determined that the new electronic apparatus is not connected, no communication is performed, and thus, the communication process is ended.

On the other hand, if it is determined, in the step S71, that the new electronic apparatus is connected, the switching control unit 171 controls the switch 181 and the switch 182 in step S72 so that, at the data transmission, the SDA signal from the control unit (CPU) of the source device is selected by the switch 181 and the SCL signal from the control unit (CPU) of the source device is selected by the switch 182, and at the data reception, the SDA signal from the sink device is selected by the switch 181.

In step S73, the switching control unit 121 controls the switch 133 so that, at the data transmission, the CEC signal from the control unit (CPU) of the source device is selected, and, at the data reception, the CEC signal from the sink device is selected.

In step S74, the source device receives the E-EDID transmitted from the sink device via the SDA line 191 of the DDC 83. That is, upon detection of the connection of the source device, the sink device reads out the E-EDID from EDIDROM 85 and transmits the read E-EDID to the source device via the SDA line 191 of the DDC 83, and thus, the source device receives the E-EDID transmitted from the sink device.

In step S75, the source device determines whether the full-duplex communication with the sink device is possible. That is, the source device refers to the E-EDID received from the sink device to determine whether the full duplex flag "Full Duplex" in FIG. 26 is set, and for example, when the full duplex flag is set, the source device determines that the two-way IP communication according to the full duplex mode, i.e., the full-duplex communication, is possible.

If it is determined in the step S75 that the full-duplex communication is possible, the switching control unit 171 controls the switch 181 and the switch 182 in step S76 so that the differential signal corresponding to the Rx data from the sink device is selected at the data reception.

That is, at the data reception, the switching control unit 171 switches the switch 181 and the switch 182 so that, out of the partial signal constituting the differential signal which is transmitted from the sink device and which corresponds to the Rx data, the partial signal transmitted via the SDA line 191 is selected by the switch 181 and the partial signal transmitted via the SCL line 192 is selected by the switch 182.

The SDA line 191 and the SCL line 192 constituting the DDC 83 are not utilized after the E-EDID is transmitted from the sink device to the source device, i.e., transmitting/receiving the SDA signal and the SCL signal via the SDA line 191 and the SCL line 192 is not performed. Thus, the switch 181 and the switch 182 are switched, so that the SDA line 191 and the SCL line 192 can be utilized as a transmission path of the Rx data according to the full-duplex communication.

In step S77, the source device transmits a signal, as the channel information indicating the two-way communication channel, indicating that the IP communication according to the full-duplex communication mode by using the CEC line 84 and the reserve line 88, together with the SDA line 191 and the SCL line 192, is performed, to the sink device via the switch 133 and the CEC line 84.

Figure 24:
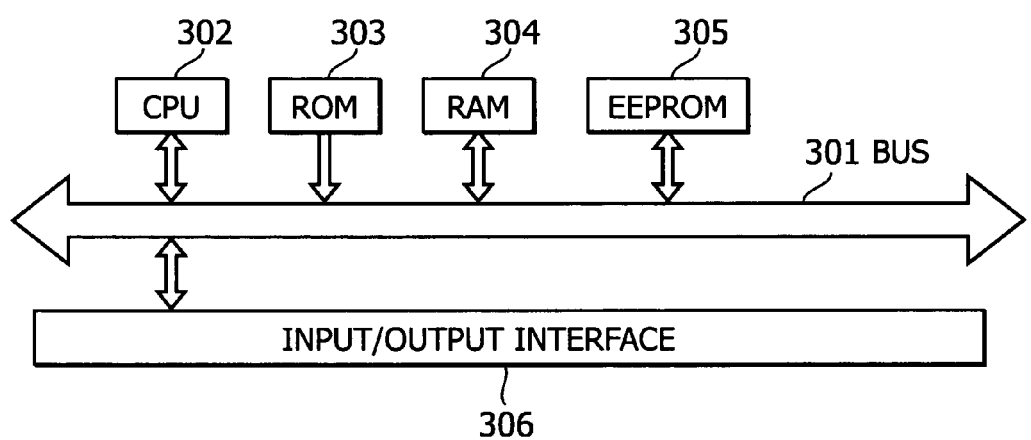
FIG. 24 is a block diagram showing a configuration example of a computer in which the present invention is applied.

That is, if the full duplex flag is set, the source device is able to recognize that the sink device is configured as shown in FIG. 24 and the full-duplex communication by using the CEC line 84 and the reserve line 88, together with the SDA line 191 and the SCL line 192, is possible. Thus, the source device transmits the channel information to the sink device to notify that the full-duplex communication is performed.

In step S78, the switching control unit 121 controls the switch 133 so that the differential signal corresponding to the Tx data from the converting unit 131 is selected in a data transmission. That is, the switching control unit 121 switches the switch 133 so that the partial signal of the differential signal which is supplied from the converting unit 131 to the switch 133 and which corresponds to the Tx data is selected.

In step S79, the source device performs the two-way IP communication with the sink device according to the full duplex mode, and the communicating process is ended. That is, at the data transmission, the converting unit 131 converts the Tx data supplied from the control unit (CPU) of the source device into the differential signal, supplies the switch 133 with one partial signal constituting the differential signal obtained by the conversion, and transmits the other partial signal to the sink device via the reserve line 88. The switch 133 transmits the partial signal supplied from the converting unit 131 to the sink device via the CEC line 84. Thus, the differential signal corresponding to the Tx data is transmitted from the source device to the sink device.

At a data reception, the decoding unit 183 receives the differential signal corresponding to the Rx data transmitted from the sink device. That is, the switch 181 receives the partial signal of the differential signal which is transmitted from the sink device via the SDA line 191 and which corresponds to the Rx data, and supplies the received partial signal to the decoding unit 183. The switch 182 receives the other partial signal of the differential signal which is transmitted from the sink device via the SCL line 192 and which corresponds to the Rx data, and supplies the received partial signal to the decoding unit 183. The decoding unit 183 decodes the differential signal formed of the partial signals supplied from the switch 181 and the switch 182 into the Rx data which is the original data, and outputs the Rx data to the control unit (CPU).

Thus, the source device transmits/receives various data such as the control data, the pixel data, and the audio data to/from the sink device.

If it is determined in the step S75 that the full-duplex communication is not possible, the source device transmits/receives the CEC signal in step S80 to perform the two-way communication with the sink device, and then, the communicating process is ended.

That is, at the data transmission, the source device transmits the CEC signal to the sink device via the switch 133 and the CEC line 84. At the data reception, the source device receives the CEC signal transmitted from the sink device via the switch 133 and the CEC line 84 to transmit/receive the control data to/from the sink device.

In this way, the source device refers to the full duplex flag to perform the full-duplex communication by using the CEC line 84 and the reserve line 88, together with the SDA line 191 and the SCL line 192, with the sink device capable of performing the full-duplex communication.

Thus, the switch 133, the switch 181, and the switch 182 are switched to select the transmitted data and the received data, thereby performing the full-duplex communication using the CEC line 84 and the reserve line 88, together with the SDA line 191 and the SCL line 192, with the sink device. In this way, a high-speed bi-directional communication can be performed while maintaining compatibility with the existing HDMI.

Also when the sink device is configured as shown in FIG. 14, similar to a case of the sink device shown in FIG. 13, the sink device performs the communication process to perform the two-way communication with the source device.

Figure 20:
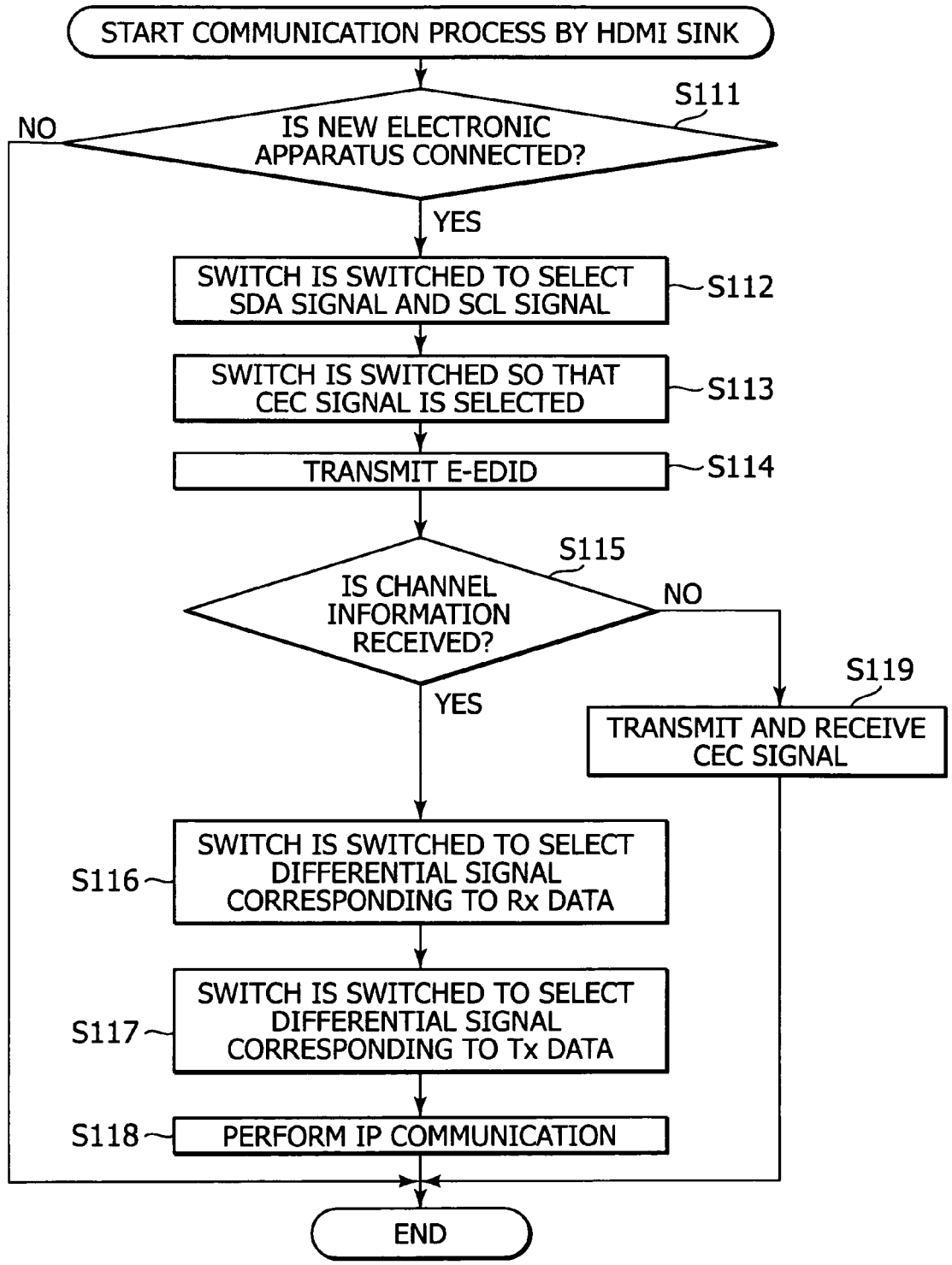
FIG. 20 is a flowchart for describing a communication process by the sink device.

Hereinafter, with reference to a flowchart in FIG. 20, the communication process by the sink device shown in FIG. 14 is described.

In step S111, the sink device determines whether the sink device is connected with a new electronic apparatus (source device). In the step S111, if it is determined that the new electronic apparatus is not connected, no communication is performed, and thus, the communication process is ended.

On the other hand, if it is determined, in the step S111, that the new electronic apparatus is connected, the switching control unit 172 controls the switch 185 and the switch 186 in step S112 so that, at the data transmission, the SDA signal from the control unit (CPU) of the sink device is selected by the switch 185, and, at the data reception, the SDA signal from the source device is selected by the switch 185 and the SCL signal from the source device is selected by the switch 186.

In step S113, the switching control unit 124 controls the switch 135 so that, at the data transmission, the CEC signal from the control unit (CPU) of the sink device is selected, and, at the data reception, the CEC signal from the source device is selected.

In step S114, the sink device reads out the E-EDID from the EDIDROM 85, and transmits the read E-EDID to the source device via the switch 185 and the SDA line 191 of the DDC 83.

In step S115, the sink device determines whether the channel information transmitted from the source device is received.

That is, the channel information indicating a channel of the two-way communication is transmitted from the source device, according to a function provided in the source device and the sink device. For example, when the source device is configured as shown in FIG. 14, the source device and the sink device are capable of performing the full-duplex communication, and thus, the channel information indicating that the IP communication according to the full duplex mode, by using the CEC line 84 and the reserve line 88, together with the SDA line 191 and the SCL line 192, is performed is transmitted from the source device to the sink device. As a result, the sink device receives the channel information transmitted from the source device via the switch 135 and the CEC line 84, and determines that the channel information has been received.

On the other hand, when the source device does not have a function for performing the full-duplex communication, the channel information is not transmitted from the source device to the sink device, and thus, the sink device determines that the channel information has not been received.

If it is determined, in step S115, that the channel information is received, the process proceeds to step S116. That is, the switching control unit 172 controls the switch 185 and the switch 186 so that, at the data transmission, the differential signal corresponding to the Rx data from the converting unit 184 is selected.

In step S117, the switching control unit 124 controls the switch 135 so that, at the data reception, the differential signal corresponding to the Tx data from the source device is selected.

In step S118, the sink device performs the two-way IP communication according to the full duplex mode, with the source device, and thus, the communication process is ended. That is, at the data transmission, the converting unit 184 converts the Rx data supplied from the control unit (CPU) of the sink device into the differential signal, supplies one partial signal constituting the differential signal obtained by the conversion to the switch 185, and supplies the other partial signal to the switch 186. The switch 185 and the switch 186 transmit the partial signal supplied from the converting unit 184 to the source device via the SDA line 191 and the SCL line 192. Thus, the differential signal corresponding to the Rx data is transmitted from the sink device to the source device.

At the data reception, the decoding unit 136 receives the differential signal which is transmitted from the source device and which corresponds to Tx data. That is, the switch 135 receives the partial signal of the differential signal which is transmitted from the source device via the CEC line 84 and which corresponds to the Tx data, and supplies the received partial signal to the decoding unit 136. The decoding unit 136 decodes the differential signal composed of the partial signal supplied from the switch 135 and the partial signal supplied from the source device via the reserve line 88, into the TX data which is the original data, and outputs the Tx data to the control unit (CPU).

Thus, the sink device transmits/receives various data such as the control data, the pixel data, and the audio data to/from the source device.

When it is determined in the step S115 that the channel information is not received, the sink device transmits/receives the CEC signal to perform the two-way communication with the source device in step S119, and the communication process is ended.

In this way, upon receipt of the channel information, the sink device uses the CEC line 84 and the reserve line 88, together with the SDA line 191 and the SCL line 192, to perform the full-duplex communication with the sink device.

Thus, if the sink device switches the switch 135, the switch 185, and the switch 186 to select the transmitted data and the received data, thereby performing the full-duplex communication using the CEC line 84 and the reserve line 88, together with the SDA line 191 and the SCL line 192, with the source device. In this way, a high-speed bi-directional communication can be performed while maintaining compatibility with the existing HDMI.

In an example in FIG. 14, the source device is configured so that the CEC line 84 and the reserve line 88 are connected with the converting unit 131, and the SDA line 191 and the SCL line 192 are connected with the decoding unit 183. However, the source device may be configured so that the CEC line 84 and the reserve line 88 are connected with the decoding unit 183, and the SDA line 191 and the SCL line 192 are connected with the converting unit 131.

In such a case, the switch 181 and the switch 182 are connected to the CEC line 84 and the reserve line 88, and also connected to the decoding unit 183. The switch 131 is connected to the SDA line 191, and also connected to the converting unit 131.

Likewise, the sink device in FIG. 14 may also be configured that the CEC line 84 and the reserve line 88 are connected with the converting unit 184, and the SDA line 191 and SCL line 192 are connected with the decoding unit 136. In such a case, the switch 185 and the switch 186 are connected to the CEC line 84 and the reserve line 88, and also connected to the converting unit 184. The switch 135 is connected to the SDA line 191, and also connected to the decoding unit 136.

Further, in FIG. 13, the CEC line 84 and the reserve line 88 may be the SDA line 191 and the SCL line 192. That is, the converting unit 131 and the decoding unit 132 of the source device, and the converting unit 134 and the decoding unit 136 of the sink device may be connected to the SDA line 191 and the SCL line 192, so that the source device and the sink device may perform the IP communication according to the half duplex mode. Further, in this case, the reserve line 88 may be used to detect the connection of the electronic apparatus.

Further, each of the source device and the sink device may have both functions for performing the half-duplex communication and for performing the full-duplex communication. In such a case, according to the function provided in the connected electronic apparatus, the source device and the sink device may perform the IP communication according to either the half-duplex mode or the full-duplex mode.

Figure 21:
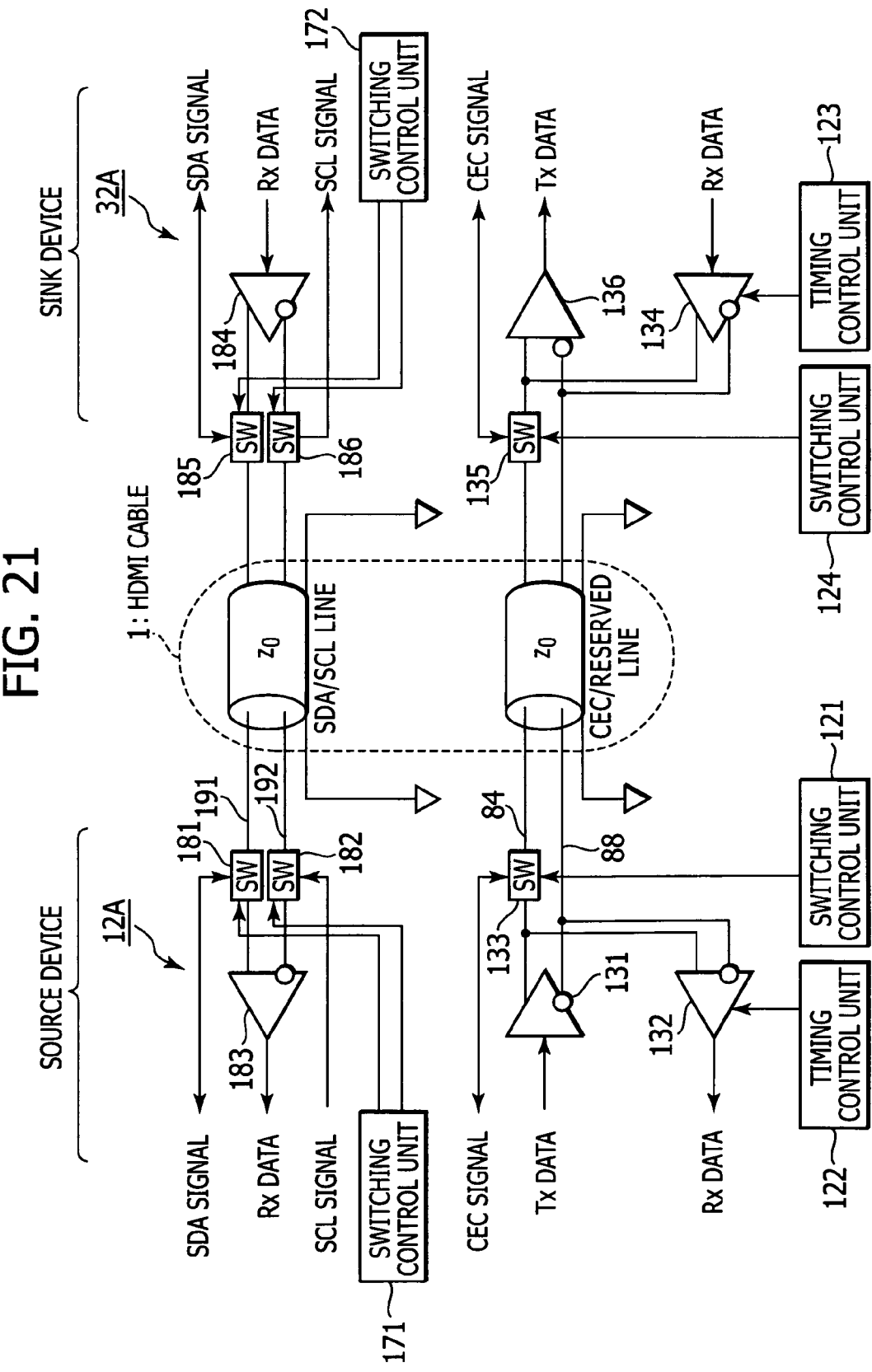
FIG. 21 is a connection diagram showing another configuration example of the high-speed data line interface between the personal computer and the television receiver.

If each of the source device and the sink device has both functions for performing the half-duplex communication and for performing the full-duplex communication, the source device and the sink device are configured as shown in FIG. 21, for example. In FIG. 21, portions corresponding to those in FIG. 13 and FIG. 14 are designated by the same numerals, and the description is omitted, as needed.

The high-speed data line interface 12A of the source device includes: the converting unit 131; the decoding unit 132; the switch 133; the switch 181; the switch 182; the decoding unit 183; the switching control unit 121; the timing control unit 122; and the switching control unit 171. That is, the high-speed data line interface 12A in the source device in FIG. 21 is configured so that the high-speed data line interface 12A in the source device shown in FIG. 14 is further added with the timing control unit 122 and the decoding unit 132 in FIG. 13.

The high-speed data line interface 32A in the sink device shown in FIG. 21 includes: the converting unit 134; the switch 135; the decoding unit 136; the converting unit 184; the switch 185; the switch 186; the timing control unit 123; the switching control unit 124; and a switching control unit 172. That is, the sink device in FIG. 21 is configured so that the sink device shown in FIG. 14 is further added with the timing control unit 123 and the converting unit 134 in FIG. 13.

Subsequently, a communication process by the source device and the sink device shown in FIG. 21 is described.

Figure 22:
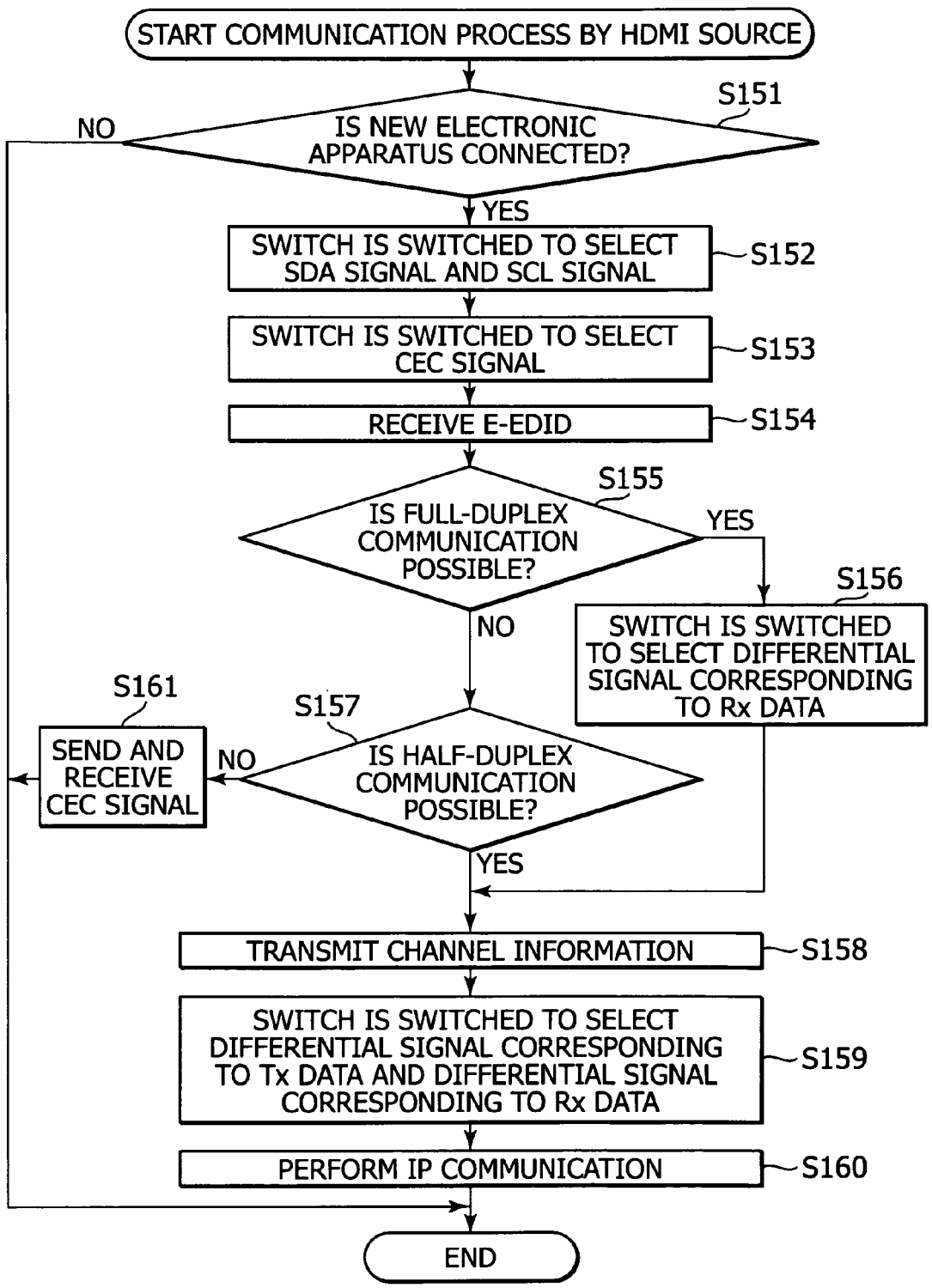
FIG. 22 is a flowchart for describing a communication process by the source device.

Firstly, with reference to a flowchart in FIG. 22, the communication process by the source device in FIG. 21 is described. Processes from the step S151 to the step S154 are the same as those from the step S71 to the step S74 in FIG. 19, respectively, and thus, the description is omitted.

In step S155, the source device determines whether the full-duplex communication with the sink device is possible. That is, the source device refers to the E-EDID received from the sink device to determine whether the full duplex flag "Full Duplex" in FIG. 16 is set.

If it is determined, in the step S155, that the full-duplex communication is possible, i.e., when the sink device shown in FIG. 21 or FIG. 14 is connected to the source device, the switching control unit 171 controls the switch 181 and the switch 182 in step S156 so that, at the data reception, the differential signal corresponding to the Rx data from the sink device is selected.

On the other hand, if it is determined, in the step S155, that the full-duplex communication is not possible, the source device determines, in step S157, whether the half-duplex communication is possible. That is, the source device refers to the received E-EDID to determine whether the half duplex flag "Half Duplex" in FIG. 16 is set. In other words, the source device determines whether the sink device shown in FIG. 13 is connected to the source device.

If it is determined, in the step S157, that the half-duplex communication is possible, or if the switch 181 and the switch 182 are switched in the step S156, the source device transmits the channel information to the sink device via the switch 131 and the CEC line 84 in step S158.

Herein, if it is determined, in the step S155, that the full-duplex communication is possible, since the sink device has the function for performing the full-duplex communication, the source device transmits, as the channel information, the signal indicating that the IP communication using the CEC line 84 and the reserve line 88, together with the SDA line 191 and the SCL line 192, is performed, to the sink device via the switch 133 and the CEC line 84.

If it is determined, in the step S157, that the half-duplex communication is possible, since the sink device does not have the function for performing the full-duplex communication but has the function for performing the half-duplex communication, the source device transmits, as the channel information, the signal indicating that the IP communication using the CEC line 84 and the reserve line 88 is performed, to the sink device via the switch 133 and the CEC line 84.

In step S159, the switching control unit 121 controls the switch 133 so that, at the data transmission, the differential signal corresponding to the Tx data from the converting unit 131 is selected, and, at the data reception, the differential signal corresponding to the Rx data transmitted from the sink device is selected. When the source device and the sink device perform the full-duplex communication, at the data reception in the source device, the differential signal corresponding to the Rx data is not transmitted via the CEC line 84 and the reserve line 88 from the sink device. Thus, the differential signal corresponding to the Rx data is not supplied to the decoding unit 131.

In step S160, the source device performs the two-way IP communication with the sink device, and the communicating process is ended.

That is, when the source device and the sink device perform the full-duplex communication and the half-duplex communication, the converting unit 131 converts the Tx data supplied from the control unit (CPU) of the source device into the differential signal at a data transmission, transmits one partial signal constituting the differential signal obtained by the conversion to the sink device via the switch 133 and the CEC line 84, and transmits the other partial signal to the sink device via the reserve line 88.

When the source device performs the full-duplex communication with the sink device, the decoding unit 183 receives the differential signal corresponding to the Rx data transmitted from the sink device at the data reception, decodes the received differential signal into the Rx data which is the original data, and outputs the Rx data to the control unit (CPU).

On the other hand, when the source device performs the half-duplex communication with the sink device, the decoding unit 132 receives the differential signal corresponding to the Rx data transmitted from the sink device at the data reception, on the basis of the control of the timing control unit 122, decodes the received differential signal into the Rx data which is the original data, and outputs the Rx data to the control unit (CPU).

Thus, the source device transmits/receives various data such as the control data, the pixel data, and the audio data to/from the sink device.

If it is determined in the step S157 that the half-duplex communication is not possible, the source device transmits and receives the CEC signal via the CEC line 84 in step S161 to perform the two-way communication with the sink device, and then, the communicating process is ended.

In this way, the source device refers to the full duplex flag and the half duplex flag to perform either the full-duplex communication or the half-duplex communication in response to the function provided in the sink device which is a communication partner.

Thus, according to the function provided in the sink device which is the communication partner, the switch 133, the switch 181, and the switch 182 are switched to select the transmitted data and the received data, thereby performing either the full-duplex communication or the half-duplex communication. As a result, a more appropriate communicating method is selected while maintaining compatibility with the existing HDMI, and a high-speed bi-directional communication can be performed.

Figure 23:
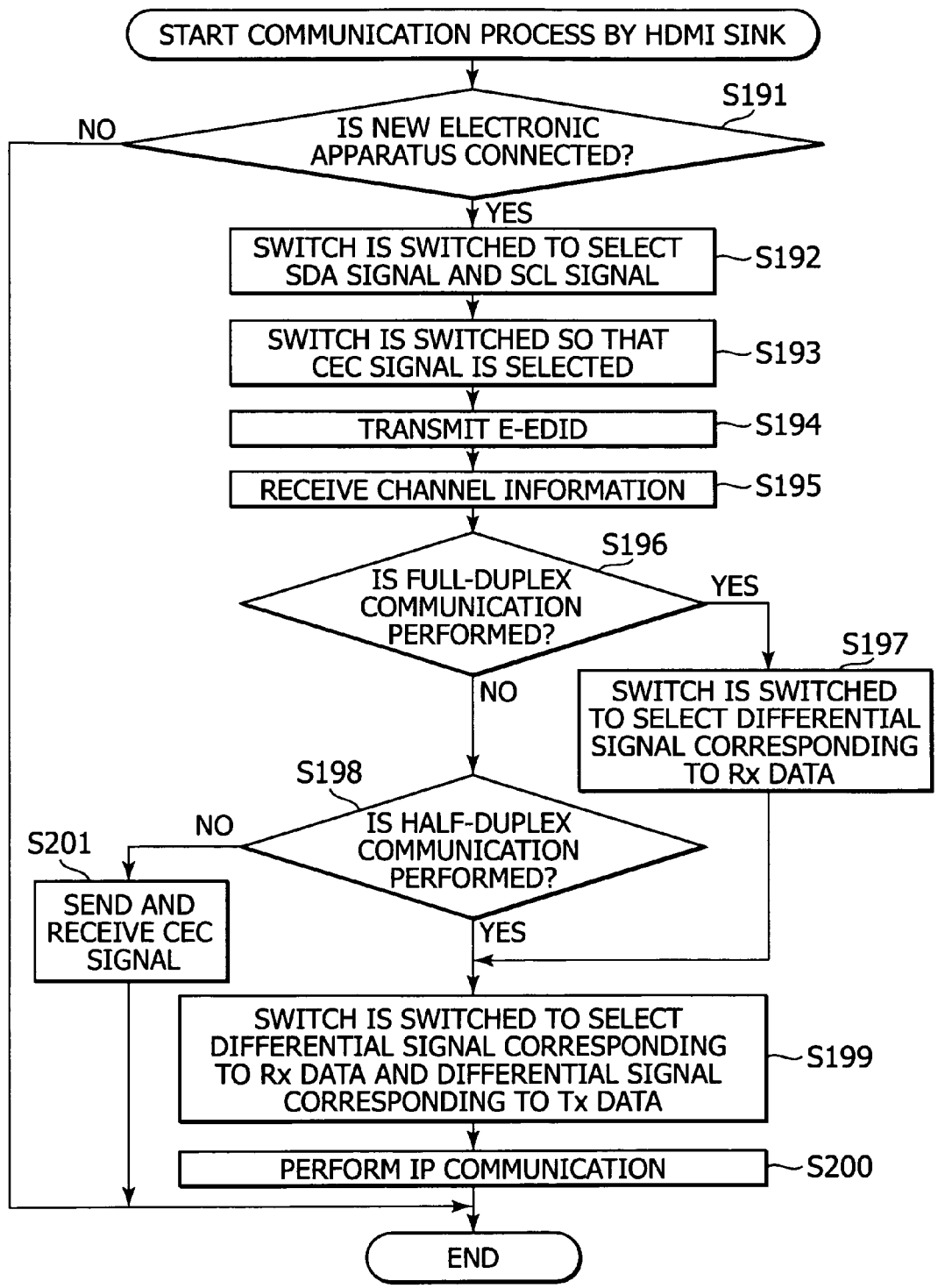
FIG. 23 is a flowchart for describing a communication process by the sink device.

Subsequently, with reference to a flowchart in FIG. 23, the communication process by the sink device in FIG. 21 is described. Processes from the step S191 to the step S194 are the same as those from the step S111 to the step S114 in FIG. 20, respectively, and thus, the description is omitted.

In step S195, the sink device receives the channel information transmitted from the source device via the switch 135 and the CEC line 84. If the source device connected to the sink device has neither the functions for performing the full-duplex communication nor for performing the half-duplex communication, no channel information is transmitted from the source device to the sink device, so that the sink device does not receive the channel information.

In step S196, the sink device determines whether to perform the full-duplex communication on the basis of the received channel information. For example, upon receipt of the channel information indicating that the IP communication by using the CEC line 84 and the reserve line 88, together with the SDA line 191 and the SCL line 192, is performed, the sink device determines that the full-duplex communication is performed.

When it is determined in the step S196 that the full-duplex communication is performed, the switching control unit 172 controls, in the step S197, the switch 185 and the switch 186 so that the differential signal corresponding to the Rx data from the converting unit 184 is selected at a data transmission.

When it is determined in the step S196 that the full-duplex communication is not performed, the sink device determines whether to perform the half-duplex communication on the basis of the received channel information in step S198. For example, upon receipt of the channel information indicating that the IP communication by using the CEC line 84 and the reserve line 88 is performed, the sink device determines that the half-duplex communication is performed.

When it is determined in the step S198 that the half-duplex communication is performed or when the switch 185 and the switch 186 are switched in the step S197, the switching control unit 124 controls the switch 135 in step S199 so that the differential signal corresponding to the Rx data from the converting unit 134 is selected at the data transmission, and the differential signal corresponding to Tx data from the source device is selected at the data reception.

When the source device and the sink device perform the full-duplex communication, the differential signal corresponding to the Rx data is not transmitted from the converting unit 134 to the transmitter 81 at the data transmission in the sink device, so that the differential signal corresponding to the Rx data is not supplied to the switch 135.

In step S200, the sink device performs the two-way IP communication with the source device, and thus, the communication process is ended.

That is, when the sink device performs the full-duplex communication with the source device, at the data transmission, the converting unit 184 converts the Rx data supplied from the control unit (CPU) of the sink device into the differential signal, transmits one partial signal constituting the differential signal obtained by the conversion to the source device via the switch 185 and the SDA line 191, and transmits the other partial signal to the source device via the switch 186 and the SCL line 192.

When the sink device performs the half-duplex communication with the source device, at the data transmission, the converting unit 134 converts the Rx data supplied from the control unit (CPU) of the sink device into the differential signal, transmits one partial signal constituting the differential signal obtained by the conversion to the transmitter 81 via the switch 135 and the CEC line 84, and transmits the other partial signal to the source device via the reserve line 88.

When the sink device performs the full-duplex communication with the source device and performs the half-duplex communication, at the data reception, the decoding unit 136 receives the differential signal corresponding to the Tx data transmitted from the source device, decodes the received differential signal into the Tx data which is the original data, and outputs the Tx data to the control unit (CPU).

When it is determined, in the step S198, that the half-duplex communication is not performed, i.e., when the channel information is not transmitted, for example, the sink device transmits and receives the CEC signal in step S201 to perform the two-way communication with the source device, and then, the communication process is ended.

In this way, the sink device performs either the full-duplex communication or the half-duplex communication according to the received channel information, i.e., according to the function provided in the source device which is a communication partner.

Thus, according to the function provided in the source device which is the communication partner, the switch 135, the switch 185, and the switch 186 are switched to select the transmitted data and the received data, thereby performing either the full-duplex communication or the half-duplex communication. As a result, a more appropriate communicating method is selected while maintaining compatibility with the conventional HDMI (R), and a high-speed bi-directional communication can be performed.

When the source device and the sink device are connected by the HDMI cable 1 including the CEC line 84 and the reserve line 88, each of which lines is shielded through differential-twist-pair coupling with each other and connected to a grounding line, and the SDA line 191 and the SCL line 192, each of which lines is shielded through differential-twist-pair coupling with each other and connected to a grounding line, it can perform the high-speed two-way IP communication according to either the half duplex mode or the full duplex mode while maintaining compatibility with the existing HDMI cable.

Subsequently, a series of above-described processes may be performed not only by dedicated hardware but also by software. When the series of processes are performed by the software, a program configuring the software is installed to a microcomputer, etc., which controls the source device and the sink device, for example.

FIG. 24 shows a configuration example of one embodiment of a computer in which the program for executing a series of above-described processes is installed.

The program may be previously recorded in an electrically erasable programmable read-only memory (EEPROM) 305 or a ROM 303, as a recording medium contained in the computer.

Alternately, the program may be stored (recorded) temporarily or eternally in a removable recording medium such as a flexible disk, a CD-ROM (Compact Disc Read Only Memory), an MO (Magneto Optical) disc, a DVD (Digital Versatile Disc), a magnetic disk, and a semiconductor memory. Such a removable recording medium may be provided as so-called "packaged software".

The program may not only be installed from the above-described removable recording medium into the computer but also be installed as follows: from a download site via an artificial satellite for a digital satellite broadcast, the program is wirelessly transferred to the computer, or the program is transferred to the computer by wire via a network such as an LAN and the Internet, and in this state, the computer receives the program thus transferred by the input/output interface 360 so that the program may be installed in the internal EEPROM 305.

The computer includes the central processing unit (CPU) 302. The CPU 302 is connected with the input/output interface 306 via a bus 301, and the CPU 302 loads the program stored in the ROM 303 or the EEPROM 305 into the RAM 304, and executes the loaded program. Thus, the CPU 302 performs the process according to the above-described flowchart, and alternatively, the process performed by the configuration shown in the above-described block diagram.

Processing steps setting forth a program for causing the computer to perform various kinds of processes is not always required to be carried out in a time sequential order set forth in the flowchart in the present specification. The processing steps may be carried out in a parallel manner or separately (for example, they may include parallel processing or processing using objects). Furthermore, the program may be processed by means of a single computer, and alternatively, implemented as distributed processing by means of a plurality of computers.

Figure 25:
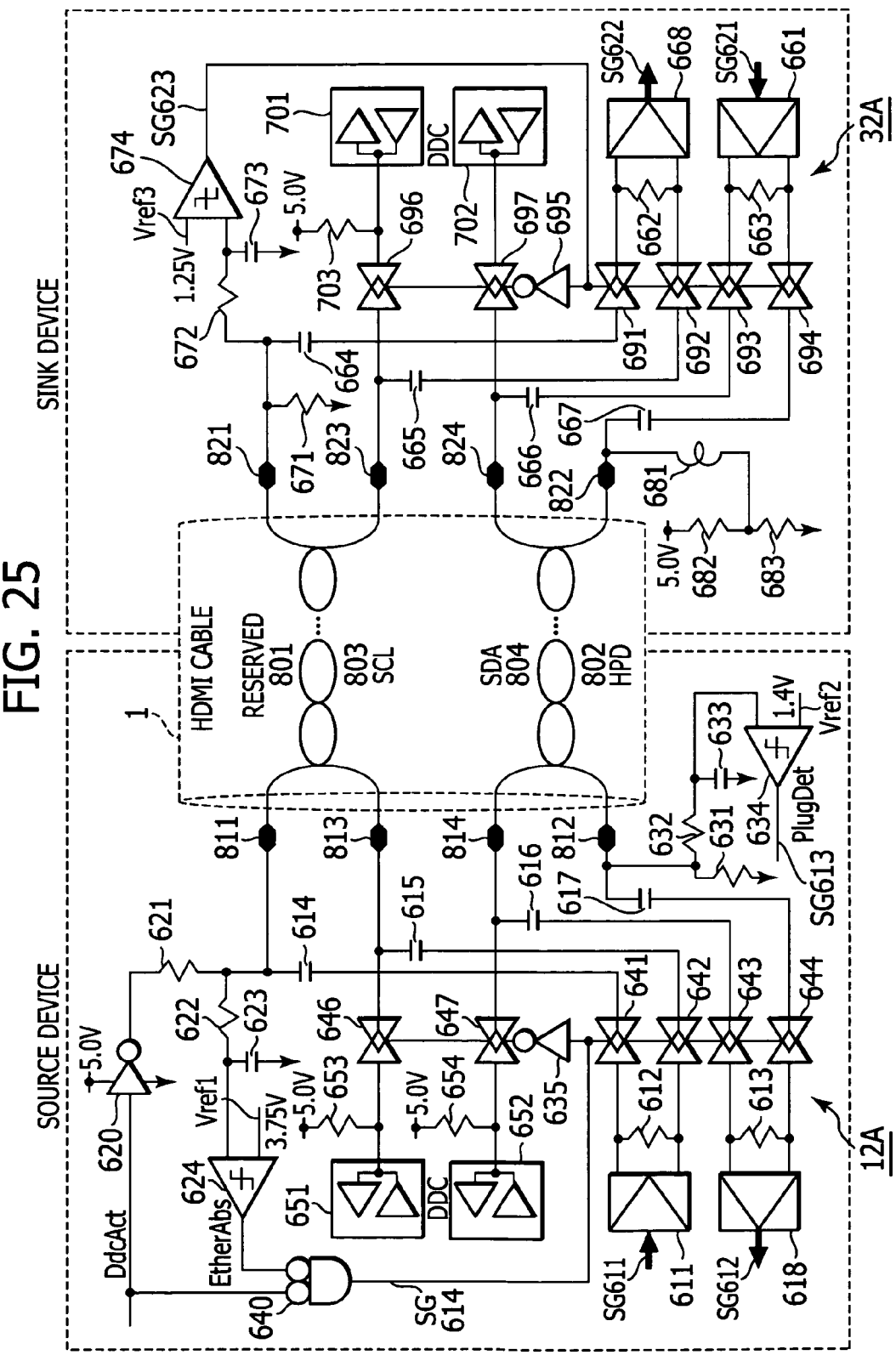
FIG. 25 is a connection diagram showing still another configuration example of the high-speed data line interface between the personal computer and the television receiver.

In the configuration example shown in FIG. 8, it may form a circuit for the LAN communication irrespective of an electrical mode regulated about the DDC. However, FIG. 25 shows another configuration example having a similar effect.

This example shows an interface for performing a data transmission of video and audio, an exchange and authentication of connected apparatus information, a communication of apparatus control data, and a LAN communication, by a single cable. The interface is characterized in that: the LAN communication is performed by a single-direction communication via two pairs of differential transmission paths; there is provided a configuration such that a connection state of the interface is notified by at least one DC bias potential of the transmission path; and at least two transmission paths are used for a communication for exchanging and authenticating the connected apparatus information in a time division manner with the LAN communication.

The source device includes: a LAN signal transmitting circuit 611; terminal resistances 612 and 613; AC coupling capacitances 614 to 617; a LAN signal receiving circuit 618; an inverter 620; a resistance 621; a resistance 622 and capacitance 623 forming a low-pulse filter; a comparator 624; a pull-down resistance 631; a low-path filter composed of resistance 632 and a capacitance 633; a comparator 634; a NOR gate 640; analog switches 641 to 644; an inverter 645; analog switches 646 and 747; DDC transceivers 651 and 652; and pull-up resistances 653 and 654.

The sink device 602 includes: a LAN signal transmitting circuit 661; terminal resistances 662 and 663; AC-coupling capacitances 664 to 667; a LAN signal receiving circuit 668; a pull-down resistance 671; a low-pass filter composed of resistance 672 and a capacitance 673; a comparator 674; a choke coil 681; resistances 682 and 683 connected in series between a power supply potential and a reference potential; analog switches 691 to 694; an inverter 695; analog switches 696 and 697; DDC transceivers 701 and 702; and pull-up resistances 703 and 704.

Within the HDMI cable 1, there are a differential transmission path including a reserve line 801 and an SCL line 803 and a differential transmission path including an SDA line 804 and an HPD line 802, the source-side terminals 811 to 814 and sink-side terminals 821 to 824 are formed.

The reserve line 801 and the SCL line 803, together with the SDA line 804 and the HPD line 802, are coupled as a differential twisted pair.

In the source device, the terminals 811 and 813 are connected, via the AC-coupling capacitances 614 and 615 and the analog switches 641 and 642, to a transmitting circuit 611 for transmitting a LAN transmission signal SG611 to the sink device and the terminal resistance 612. The terminals 814 and 812 are connected, via the AC-coupling capacitances 616 and 617 and the analog switches 643 and 644, to a receiving circuit 618 for receiving the LAN signal from the sink device and the terminal resistance 613.

In the sink device, the terminals 821 to 824 are connected, via the AC-coupling capacitances 664, 665, 666, an 667 and the analog switches 691 to 694, to the transmitting circuit 661, the receiving circuit 668, and the terminal resistances 662 and 663. When the LAN communication is performed, the analog switches 641 to 644 and 691 to 694 are conductive. When the DDC communication is performed, these switches are opened.

In the source device, the terminal 813 and the terminal 814 are connected, via the other analog switches 646 and 647, to the DDC transceivers 651 and 652 and the pull-up resistances 653 and 654.

In the sink device, the terminal 823 and the terminal 824 are connected, via the analog switches 696 and 697, to the DDC transceivers 701 and 702 and the pull-up resistance 703. When the DDC communication is performed, the analog switches 646 and 647 are conductive. When the LAN communication is performed, these switches are opened.

An authentication system of the e-HDMI compatible apparatus by the potential of the reserve line 801 is basically similar to the example shown in FIG. 8 except that the resistance 62 of the source device 601 is driven to the inverter 620.

When an input of the inverter 620 is HIGH, the resistance 621 becomes a pull-down resistance, and thus, as viewed from the sink device, a 0-V state similar to a case that the e-HDMI non-compatible apparatus is connected is established. As a result, a signal SG623 indicating an e-HDMI compatible distinguishing result of the sink device becomes LOW, and thus, the analog switches 691 to 694 controlled by the signal SG623 are opened, and the analog switches 696 and 697 controlled by a signal obtained by inverting the signal SG623 by the inverter 695 are conductive. As a result, the sink device 602 keeps the SCL line 803 and the SDA line 804 apart from a LAN transmitting and receiving device, thereby establishing a state of being connected to a DDC transmitting/receiving device.

On the other hand, in the source device, an input of the inverter 620 is inputted also to the NOR gates 640, and an output SG614 thereof is rendered LOW. The analog switches 641 to 644 controlled by the output signal SG614 of the NOR gates 640 are opened, and the analog switches 646 and 647 controlled by a signal obtained by inverting the signal SG614 by the inverter 645 are conductive. As a result, also the source device 601 keeps the SCL line 803 and the SDA line 804 apart from the LAN transmitting and receiving device, thereby establishing a state of being connected to the DDC transmitting/receiving device.

In contrary, when the input of the inverter 620 is LOW, both the source device and the sink device keep the SCL line 803 and the SDA line 804 apart from the DDC transmitting/receiving device, thereby establishing a state of being connected to the LAN transmitting/receiving device.

The circuits 631 to 634 and 681 to 683 for verifying the connection by a DC bias potential of the HPD line 802 have a function similar to that in the example shown in FIG. 8. That is, the HPD line 802 notifies the source device of a connection of the cable 1 to the sink device by a DC bias level, besides the above-described LAN communication. When the cable 1 is connected to the sink device, the resistances 682 and 683 and the choke coil 681 within the sink device bias the HPD line 802 to about 4V via the terminal 822.

The source device extracts the DC bias of the HPD line 802 by the low-pass filter composed of the resistance 632 and the capacitance 633, and compares the extracted DC bias with a reference potential Vref2 (for example, 1.4V) in the comparator 634. Unless the cable 1 is connected to the sink device, the potential of the terminal 812 is lower than the reference potential Vref2 because of the pull-down resistance 631. When the cable 1 is connected, the potential is higher than the reference potential Vref2. Accordingly, when an output signal SG613 of the comparator 634 is HIGH, it indicates that the cable 1 and the sink device are connected. On the other hand, when the output signal SG613 of the comparator 634 is LOW, it indicates that the cable 1 and the sink device are not connected.

Thus, according to the configuration example shown in FIG. 25, in an interface for performing a data transmission of video and audio, an exchange and authentication of connected apparatus information, a communication of apparatus control data, and a LAN communication, by a single cable, in which the interface is configured so that: the LAN communication is performed by a single-direction communication via two pairs of differential transmission paths; there is provided a configuration such that by at least one DC bias potential of the transmission path, a connection state of the interface is notified; and at least two transmission paths are used for a communication for exchanging and authenticating the connected apparatus information in a time division manner with the LAN communication. Thus, a time division for dividing into a time zone in which the SCL line and the SDA line are connected to the LAN communication circuit by the switch and a time zone in which these lines are connected to the DDC circuit can be performed. This division allows the circuit for the LAN communication to be formed irrespective of an electrical mode regulated about the DDC, and thus, a stable and ensured LAN communication can be achieved with a reasonable price.

The SDA and the SCL are pull-down lines in which H is a 1.5-KΩ pull-up and L is a low impedance. The CEC also controls to perform a pull-down communication in which H is a 27-KΩ pull-up and L is a low impedance. When these functions are held to maintain compatibility with the existing HDMI, it may become difficult to share a function of the LAN for performing a high-speed data communication in which end terminals of a transmission line need to be matched and terminated.

In the configuration examples in FIG. 8 and FIG. 25, such a problem can be avoided. That is, the configuration example in FIG. 8 is configured so that the use of the SDA, SCL, and CEC lines is avoided, and the reserve line and the HPD line are used as a differential pair to perform the full-duplex communication according to one-to-bi-directional communication. The configuration example in FIG. 25 is configured to perform a two-to-full-duplex communication in which the HPD line and the SDA line, together with the SCL line and the reserve line, are used to form two sets of differentials pairs, and a single-direction communication is performed in each of the sets.

FIGS. 26A to 26E show bi-directional communication waveforms in the configuration example in FIG. 8 and FIG. 25.

FIG. 26A shows a waveform of a signal transmitted from the source device; FIG. 26B shows a waveform of a signal received by the sink device; FIG. 26C shows a waveform of a signal passing through a cable; FIG. 26D shows a waveform of a signal received by the source device; and FIG. 26E shows a waveform of a signal transmitted from the source device. As is apparent from FIG. 26, according to the configuration example in FIG. 8 or FIG. 25, a good bi-directional communication may be achieved.

In the embodiment, for the transmission path that connects the personal computer (source device) and the television receiver (sink device), the description is made on assumption of the interface that complies with an HDMI standard. However, the present invention may be applicable to other similar transmission standards. In the description, for the source device, the personal computer 10 is used, and for the sink device, the television receiver 30 is used as an example. However, an embodiment of the preset invention is similarly applicable to an AV system configured by using other transmitting devices and display devices.

In the embodiment, between the source device and the sink device, the two-way IP communication is performed. However, the two-way communication may be performed according to a protocol other than IP. In the embodiment, the electronic apparatuses are connected by the HDMI cable. However, the present invention is similarly applicable to a case that the electronic apparatuses are wirelessly connected.

One embodiment of the present invention is intended to simplify the connection among the respective devices to implement miniaturization and reduction in cost. For example, the present invention may be applicable to an AV system, etc., in which a television receiver and a personal computer are connected by an HDMI cable.

It should be understood by those skilled in the art that various modifications, combinations, sub-combinations and alternations may occur depending on design requirements and other factors insofar as they are within the scope of the appended claims or equivalents thereof.

What is claimed is:

1. A display device comprising:
   a signal receiving unit configured to receive a video signal by a differential signal through a plurality of channels from an external apparatus via a transmission path;
   an image display unit configured to process the video signal received in the signal receiving unit to display an image;
   a communicating unit configured to perform a bi-directional communication by using a predetermined line which constitutes the transmission path;
   a position designating unit for designating a position on a display screen of the image display unit; and
   an information transmitting unit configured to transmit, by the communicating unit, coordinate information on the position designated by the position designating unit to the external apparatus,
   wherein the predetermined line is an HDMI cable including a reserve line and an HPD line, and
   wherein the coordinate information is supplied to the predetermined line via an Ethernet interface and a high-speed data line interface.

2. The display device according to claim 1, wherein the position designating unit includes a touch panel placed on the display screen.

3. The display device according to claim 1, wherein the position designating unit is configured by using a remote control transmitter and receiver.

4. The display device according to claim 1, further comprising:
   an imaging unit for capturing an object to obtain a video signal corresponding to the object; and
   a signal transmitting unit configured to transmit, by the communicating unit, the video signal obtained in the imaging unit to the external apparatus.

5. The display device according to claim 4, wherein the signal transmitting unit transmits, by the communicating unit, the video signal obtained by the imaging unit to the external apparatus when a transmission request command is sent from the external apparatus by either a control data line or the communicating unit, the control data line constituting the transmission path.

6. The display device according to claim 1, further comprising:
- a remote control receiving unit for receiving a remote control signal; and
- a signal transmitting unit for transmitting, by the communicating unit, the remote control signal received in the remote control receiving unit to the external apparatus.

7. A transmitting device comprising:
- a signal transmitting unit configured to transmit a video signal by a differential signal through a plurality of channels to an external apparatus via a transmission path;
- a communicating unit configured to perform a bi-directional communication by using a predetermined line which constitutes the transmission path;
- a video signal obtaining unit configured to obtain the video signal transmitted by the signal transmitting unit;
- an information receiving unit configured to receive, by the communicating unit, coordinate information about a screen position, the coordinate information being transmitted from the external apparatus; and
- a controller for controlling the video signal obtained by the video signal obtaining unit on the basis of the coordinate information about the screen position, the coordinate information being received in the information receiving unit,
- wherein the predetermined line is an HDMI cable including a reserve line and an HPD line, and
- wherein the coordinate information is supplied to the predetermined line via an Ethernet interface and a high-speed data line interface.

8. The transmitting device according to claim 7, wherein:
- the video signal obtaining unit is a video signal reproducing unit for reproducing a video signal from a recording medium, and
- the controller controls a reproduction operation of the video signal reproducing unit on the basis of the coordinate information about the screen position.

9. The transmitting device according to claim 7, wherein:
- the video signal obtaining unit is a Web browser for obtaining an image file from Internet to generate a video signal for displaying a Web page, and
- the controller controls the Web browser to update the Web page on the basis of the coordinate information about the screen position.

10. The transmitting device according to claim 7, further comprising a signal transmitting unit for transmitting the video signal obtained by the video signal obtaining unit to another device via a network, and
- wherein the controller combines a video signal transmitted to another device by the signal transmitting unit, with a display signal for displaying a mark on the screen position indicated by the coordinate information about the screen position.

11. The transmitting device according to claim 7, further comprising a signal processing unit for combining a video signal received by the communicating unit from the external apparatus, with the video signal obtained by the video signal obtaining unit.

12. The transmitting device according to claim 11, wherein:
- the video signal obtaining unit is a video signal reproducing unit for reproducing a video signal from a recording medium, and
- the signal processing unit combines the video signal transmitted by the communicating unit from the external apparatus, with the video signal reproduced by the video signal reproducing unit.

13. The transmitting device according to claim 11, wherein:
- the video signal obtaining unit is a Web browser for obtaining an image file from Internet to generate a video signal for displaying a Web page, and
- the signal processing unit combines the video signal transmitted by the communicating unit from the external apparatus, with the video signal generated by the Web browser.

14. The transmitting device according to claim 11, wherein:
- the video signal obtaining unit is a signal receiving unit for receiving a video signal transmitted from another device via a network, and
- the signal processing unit combines the video signal transmitted by the communicating unit from the external apparatus, with the video signal received by the signal receiving unit.

15. The transmitting device according to claim 7, further comprising:
- a signal receiving unit for receiving, by the communicating unit, a remote control signal transmitted from the external apparatus; and
- a controller for controlling an operation of the video signal obtaining unit on the basis of the remote control signal received by the signal receiving unit.

16. The transmitting device according to claim 15, further comprising a table indicating a corresponding relationship between each remote control signal received by the communicating unit and a control content, for each type of the video signal, and
- wherein the controller recognizes the control content indicated by the remote control signal received by the communicating unit, by using the table corresponding to the type of the video signal obtained by the video signal obtaining unit, and controls the operation of the video signal obtaining unit on the basis of the recognized control content.

* * * * *